(12) United States Patent
Bishop et al.

(10) Patent No.: US 10,127,569 B2
(45) Date of Patent: Nov. 13, 2018

(54) SERVICE DESIGN AND ORDER FULFILLMENT SYSTEM WITH SERVICE ORDER DESIGN AND ASSIGN PROVIDER FUNCTION

(71) Applicant: Oracle International Corporation, Redwood Shores, CA (US)

(72) Inventors: Paul Hugh Wilkie Bishop, Dallas, TX (US); Valentin Paul Mihu, Lyons (FR); Kenneth Benner, Frisco, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 954 days.

(21) Appl. No.: 13/936,686

(22) Filed: Jul. 8, 2013

(65) Prior Publication Data

US 2014/0012713 A1    Jan. 9, 2014

Related U.S. Application Data

(60) Provisional application No. 61/668,946, filed on Jul. 6, 2012.

(51) Int. Cl.
*G06Q 30/00* (2012.01)
*G06F 17/30* (2006.01)
(Continued)

(52) U.S. Cl.
CPC ... *G06Q 30/0202* (2013.01); *G06F 17/30598* (2013.01); *G06Q 10/087* (2013.01); *G06Q 30/0621* (2013.01); *G06Q 30/0635* (2013.01)

(58) Field of Classification Search
CPC .......... G06Q 10/087; G06Q 30/0601–30/0645
(Continued)

(56) References Cited

U.S. PATENT DOCUMENTS

| | | | |
|---|---|---|---|
| 5,666,493 A | 9/1997 | Wojcik et al. | |
| 5,721,832 A | 2/1998 | Westrope et al. | |

(Continued)

FOREIGN PATENT DOCUMENTS

| EP | 1892966 A1 | 2/2008 |
|---|---|---|
| WO | 01/06430 A1 | 1/2001 |

OTHER PUBLICATIONS

Oracle, Oracle; Application Integration Architecture Siebel CRM Integration Pack for Oracle Order Management: Order to Cash Implementation Guide, Release 3.1.1 Part No. E20515-, dated Feb. 1, 2011.*

(Continued)

*Primary Examiner* — Kathleen Palavecino
(74) *Attorney, Agent, or Firm* — Potomac Law Group, PLLC

(57) ABSTRACT

A system that creates a service instance is provided. The system receives a service order including an entity, where the entity includes metadata that defines a capability that is provided, and where the entity includes child entities. The system further designs a configuration for the entity, where the configuration includes the entity, the child entities, and relationships between the entity and the child entities. The system further creates, for each child entity, a design context, where each child entity is a subject for the design context. The system further designs, for each child context, an instance of the child entity using the design context.

20 Claims, 58 Drawing Sheets

(51) Int. Cl.
*G06Q 30/02* (2012.01)
*G06Q 30/06* (2012.01)
*G06Q 10/08* (2012.01)

(58) Field of Classification Search
USPC .............................................. 705/26.1–27.2
See application file for complete search history.

(56) References Cited

U.S. PATENT DOCUMENTS

| | | | |
|---|---|---|---|
| 5,737,498 | A | 4/1998 | Murray |
| 5,745,687 | A | 4/1998 | Randell |
| 5,848,141 | A | 12/1998 | Beck et al. |
| 6,058,373 | A | 5/2000 | Blinn et al. |
| 6,539,386 | B1 | 3/2003 | Athavale et al. |
| 7,024,423 | B1 | 4/2006 | Aboujaoude et al. |
| 7,096,189 | B1 | 8/2006 | Srinivasan |
| 7,185,016 | B1 | 2/2007 | Rasmussen |
| 7,356,679 | B1 | 4/2008 | Le et al. |
| 7,379,909 | B1 | 5/2008 | Cruz et al. |
| 7,448,046 | B2 | 11/2008 | Navani et al. |
| 7,469,219 | B2 | 12/2008 | Goldberg |
| 7,571,123 | B1 | 8/2009 | Hill et al. |
| 7,640,213 | B2 | 12/2009 | Reunert et al. |
| 7,693,791 | B2 | 4/2010 | Hahn-Carlson et al. |
| 7,707,055 | B2 | 4/2010 | Behmoiras et al. |
| 7,765,291 | B1 | 7/2010 | Khan et al. |
| 7,769,769 | B2 | 8/2010 | Rasmussen |
| 7,774,699 | B2 | 8/2010 | Lin |
| 8,332,806 | B2 | 12/2012 | Patrascu et al. |
| 9,391,825 | B1* | 7/2016 | Beal ................... H04L 67/325 |
| 2001/0047372 | A1 | 11/2001 | Gorelik et al. |
| 2002/0111848 | A1 | 8/2002 | White |
| 2002/0129016 | A1 | 9/2002 | Christfort |
| 2002/0188486 | A1 | 12/2002 | Gil et al. |
| 2003/0103602 | A1 | 6/2003 | Pence et al. |
| 2003/0204511 | A1 | 10/2003 | Brundage et al. |
| 2003/0221168 | A1 | 11/2003 | Kozlov |
| 2004/0015366 | A1 | 1/2004 | Wiseman et al. |
| 2004/0049481 | A1 | 3/2004 | Blevins |
| 2004/0083194 | A1 | 4/2004 | Wu et al. |
| 2004/0083199 | A1 | 4/2004 | Govindugari et al. |
| 2004/0128204 | A1 | 7/2004 | Cihla et al. |
| 2004/0205613 | A1 | 10/2004 | Li et al. |
| 2005/0289013 | A1* | 12/2005 | Goldberg ......... G06Q 10/06311 705/7.13 |
| 2006/0046717 | A1 | 3/2006 | Bovell et al. |
| 2006/0184516 | A1 | 8/2006 | Ellis |
| 2007/0088766 | A1 | 4/2007 | Bodge et al. |
| 2007/0097996 | A1 | 5/2007 | Millefiorini et al. |
| 2007/0100892 | A1 | 5/2007 | Kephart et al. |
| 2007/0214170 | A1 | 9/2007 | Lin |
| 2008/0120189 | A1 | 5/2008 | Singh et al. |
| 2008/0140696 | A1 | 6/2008 | Mathuria |
| 2009/0012828 | A1 | 1/2009 | Brower, Jr. et al. |
| 2009/0094112 | A1 | 4/2009 | Cesarini et al. |
| 2009/0094453 | A1 | 4/2009 | Bradley et al. |
| 2009/0193433 | A1 | 7/2009 | Maes |
| 2009/0249360 | A1 | 10/2009 | Wiseman et al. |
| 2010/0121740 | A1 | 5/2010 | Reed et al. |
| 2010/0281456 | A1 | 11/2010 | Eizenman et al. |
| 2011/0082926 | A1 | 4/2011 | Triano et al. |
| 2011/0112885 | A1 | 5/2011 | Rijhsinghani et al. |
| 2012/0150582 | A1 | 6/2012 | Dueck |
| 2012/0150583 | A1 | 6/2012 | Dueck et al. |
| 2012/0150676 | A1 | 6/2012 | Dueck |
| 2012/0150692 | A1 | 6/2012 | Dueck |
| 2012/0150693 | A1* | 6/2012 | Dueck ............... G06Q 10/06312 705/26.81 |
| 2012/0251113 | A1 | 10/2012 | Hajduczenia et al. |
| 2012/0311111 | A1 | 12/2012 | Frew et al. |
| 2013/0061249 | A1 | 3/2013 | Schwartz, Jr. |
| 2013/0090971 | A1 | 4/2013 | Morris et al. |

OTHER PUBLICATIONS

Siebel Order Management—An Overview; Siebel Expert Services; http://siebeloracle.wordpress.com/2009/06/20/siebel-order-management-the-order-management-life-cycle; Jun. 20, 2009.

"Rapid Offer Design and Order Delivery"; Oracle Communications; An Oracle White Paper, May 2010; http://www.oracle.com/us/industries/communications/049176.pdf.

HP Operations Orchestration Software; https://h10078.www1.hp.com/cda/hpms/display/main/hpms_content.jsp?zn=bto&cp=1-11-271-273%5E14694-4000-100; © 2010 Hewlett-Packard Development Company, L.P.

Daniel L. Moody et al.; "A Decomposition Method for Entity Relationship Models: A Systems Theoretic Approach"; 1st International Conference on Systems Thinking in Management; 2000; pp. 462-469; http://citeseerx.ist.psu.edu/viewdoc/summary?doi=10.1.1.142.8729&rep=rep1&type-pdf.

Vitria: Order Accelerator TM, Integrated Order Management; Vitria Telecommunications; © 2004 Vitria Technology, Inc.; http:www.eaibrasil.com.br/documents/ingles/download.php?file=vitria_voa_brochure.pdf.

H.J. Pels et al.; "Decomposition of Information Systems for Production Management"; North Holland Computers in Industry 6 (1985); 435-452; pp. 25-38; http://alexandria.tue.nl/repository/freearticles/612129.pdf.

Daniela Wunsch et al.; "Multilevel Order Decomposition in Distributed Production"; http://www.iiss.oeaw.ac.at/files/pub/2007-ETFA-Multilevel-Order-Decomposition-in-Distributed-Production.pdf; 2007.

Martin Owen et al.; BPMN and Business Process Management Introduction to the New Business Process Modeling Standard; © Pokin Software 2003; http://www.omg.org/bpmn/Documents/6AD5D16960.BPMN_and_BPM.pdf.

Oracle Data Sheet, "Oracle communications Rapid Offer Design and Order Delivery Solution"; Copyright 2009, Oracle; http://www.oracle.com/us/industries/communications/rapid-offer-design-order-wp-077276.pdf.

Gera A. Welker et al., "Formalisation of the Ordering Process"; SOM-theme A: Primary processes within firms; 2002; http://www.som.eldoc.ub.rug.nl/FILES/reports/themeA/2002/02A08/02A08.pdf.

NetCracker Order Management; the Order Management Challenge; NetCracker Technology Corp.; Waltham, MA; http://www.netcracker.com/common/img/uploaded/products/NetCracker_Order_Management.pdf; downloaded Dec. 15, 2010.

Svetlana Mansmann et al.; "Hierarchy-driven Visual Exploration of Multidimensional Data Cubes"; University of Konstanz, Germany, Department of Computer & Information Science; pp. 96-111; 2007; http://www.inf.uni-konstanz.de/gk/pubsys/publishedFiles/MaMaSc07.pdf.

TIBCO, "Order Management," http://www.tibco.com/industries/telecommunications/fulfillment-orchestration/order-management/default.jsp (last visited Mar. 2, 2012).

Amdocs, "Service Order Management," http://www.amdocs.com/products/oss/service-management/Pages/Service-Management.aspx (last visited Mar. 2, 2012).

TeleManagement (TM) Forum, "High-Level Guide for Managers: The Information Framework," Mar. 2010, TMFManager_Guides_InformationFramework.pdf, http://www.tmforum.org/BestPractices-Standards/InformationFramework/1684/Home.html (last visited Mar. 2, 2012).

Oracle Communications, "Guidelines for Building an Order to Activate Integrated Business Process Using AIA for Communications Foundation Pack 2.4," An Oracle White Paper; Jun. 2009.

John P. Reilly, "Implementing the TM Forum Information Framework (SID)", A Practitioner's Guide, Sep. 2011.

Oracle, Oracle Application Integration Architecture Siebel CRM Integration Pack for Oracle Order Management: Order to Cash Implementation Guide, Release 3.1.1 Part No. E20515-, dated Feb. 1, 2001.

* cited by examiner

Service Order

Order Number = 123456, Revision = 1
Fulfillment Mode = DELIVER

| L.P. | Service Action | Subject Name | F.I.C. | C.I.ID | Network ID | Other Attributes |
|---|---|---|---|---|---|---|
| 1.1 | ADD | Broadband Service | Broadband Internet Access CFSS | AI-123456-1.1 | | Technology = Default<br>Download Speed = 3096<br>Upload Speed = 1024<br>QoS = Data |
| 2.2 | ADD | Email Service | Email Service CFSS | AI-123456-3.1 | | Admin Account = admin<br>Max Number of Accounts = 5 |

L.P = Line.Parent | F.I.C = Fulfillment Item Code | C.I.ID = Commercial Inventory ID
Gray attributes are defaulted from CFS Specification definition | Black attributes are produced by applying transformation rules

Fig. 22

| Transformation Rule Type | Product Specification | CFS Specification | Attribute Value Transformation Rules (bi-directional) |
|---|---|---|---|
| Primary | Broadband PS | Broadband Internet Access CFSS | CFS.AAA Account = PS.AAA Account |
| Auxiliary | Bandwidth PS | Broadband Internet Access CFSS | CFS.Download Speed.3072 = PS.Download Speed.3Mbps<br>CFS.Download Speed.5120 = PS.Download Speed.5Mbps<br>CFS.Download Speed.15360 = PS.Download Speed.15Mbps<br>CFS.Upload Speed.1024 = PS.Upload Speed.1Mbps |
| Primary | Email Service PS | Email CFSS | CFS.Maximum Number of Accounts = PS.Maximum Number of Accounts |

Fig. 42

SERVICE DESIGN AND ORDER FULFILLMENT SYSTEM WITH SERVICE ORDER DESIGN AND ASSIGN PROVIDER FUNCTION

CROSS-REFERENCE TO RELATED APPLICATIONS

This application claims priority of U.S. Provisional Patent Application Ser. No. 61/668,946, filed on Jul. 6, 2012, the subject matter of which is hereby incorporated by reference.

FIELD

One embodiment is directed to a computer system, and more particularly, to computer systems that provision services, such as communication services.

BACKGROUND

Certain computer systems are used in a number of industries, such as the communications industry, for order entry and order fulfillment. Order entry is the process of electronically receiving orders and entering the orders into the computer system, where the orders are stored as one or more entities within the computer system, so that the orders can be electronically fulfilled. Orders can contain data regarding one or more products, the pricing of one or more products, and one or more offers related to the one or more products. Orders can be received from any type of customer, such as businesses and individual consumers. Order fulfillment is the process of electronically fulfilling the orders, once the orders have been entered into the computer system. Order fulfillment generally entails one or more of the following steps: validating the order, interfacing the order to a billing system or subsystem, shipping physical goods, scheduling installation of equipment, installing equipment, and activating services. Order fulfillment can also entail other steps not listed that are part of a process of electronically fulfilling an order.

Faced with industry dynamics that prioritize agility in implementing both superficial and fundamental changes, the communications industry has struggled to deploy order fulfillment solutions that support versatility in a manageable way. Common industry approaches typically start with fulfillment solutions that are fundamentally architected to address a narrow set of products/services/technologies and incrementally broaden their capabilities. Getting beyond the limitations of this typically leads service providers to add entirely new solution stacks to address new domains.

SUMMARY

Service design is a process of defining all entities, artifacts, and metadata used to allow for presenting, browsing, selling, order capture, and order fulfillment of service-based and physical good-based product offerings. In part, service design is about populating a technical catalog with entities and metadata used to enable service order fulfillment.

One embodiment is a system that creates a service instance. The system receives a service order including an entity, where the entity includes metadata that defines a capability that is provided, and where the entity includes child entities. The system further designs a configuration for the entity, where the configuration includes the entity, the child entities, and relationships between the entity and the child entities. The system further creates, for each child entity, a design context, where each child entity is a subject for the design context. The system further designs, for each child context, an instance of the child entity using the design context.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 22 illustrates an example of a plurality of service lines of a service order, according to an embodiment of the invention.

FIG. 42 illustrates an example transformation rule set, according to an embodiment of the invention.

DETAILED DESCRIPTION

According to an embodiment, a service design and order fulfillment system is provided that can flexibly fulfill a wide range of orders, such as communication/information service orders. The system utilizes an architectural approach and methodology that includes a technical catalog and a fulfillment solution blueprint. The technical catalog can feature a design for a content, structure, and usage of a technical catalog (i.e., a metadata catalog), where the metadata of the technical catalog can configure a behavior of a service design and order fulfillment system. The metadata of the technical catalog can drive operational behavior following a pattern-driven fulfillment model. The technical catalog can include definitions associated with a specification, such as an action or a fulfillment pattern. The fulfillment solution blueprint can feature: (a) a separation between a commercial layer and a service layer; (b) a separation between a service layer and a technical layer; and (c) an orchestration decoupled from a fulfillment topology. The fulfillment solution blueprint can be defined in terms of: (a) processes and provider functions that follow a pattern-driven fulfillment model, where specific provider functions can include: (1) a provider function for calculating a service order; (2) a provider function for calculating a technical order; and (3) a provider function for designing a service by selecting and assembling supporting components; and (b) interfaces, where specific interfaces can include (1) a service order; and (2) a technical order.

Figure 1:
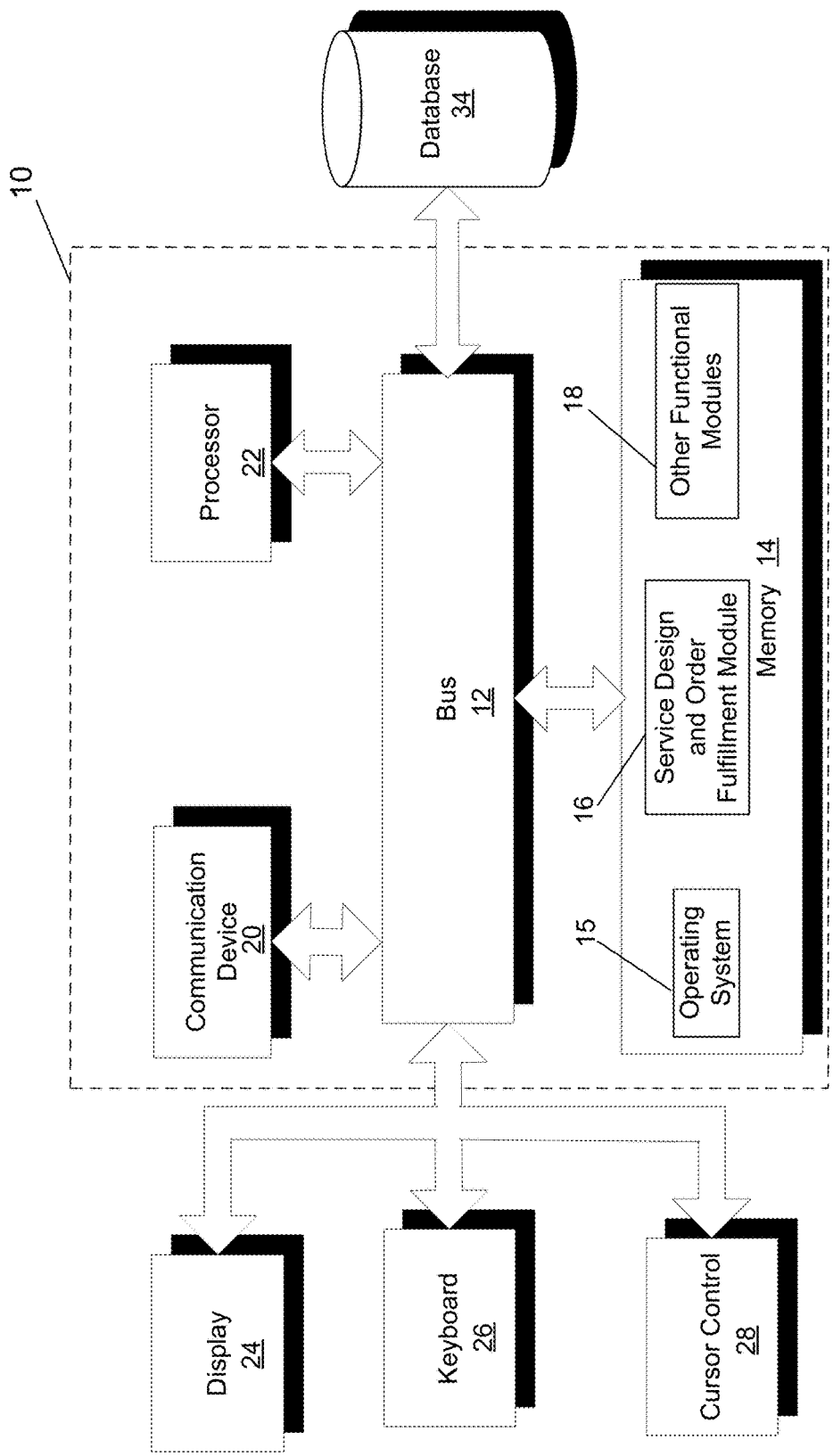
FIG. 1 illustrates a block diagram of a system that can implement an embodiment of the invention.

FIG. 1 illustrates a block diagram of a service design and order fulfillment system 10 that may implement one embodiment of the invention. Service design and order fulfillment system 10 includes a bus 12 or other communications mechanism for communicating information between components of service design and order fulfillment system 10. Service design and order fulfillment system 10 also includes a processor 22, operatively coupled to bus 12, for processing information and executing instructions or operations. Processor 22 may be any type of general or specific purpose processor. Service design and order fulfillment system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Service design and order fulfillment system 10 further includes a communication device 20, such as a network interface card or other communications interface, to provide access to a network. As a result, a user may interface with service design and order fulfillment system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with service design and order fulfillment system 10.

According to one embodiment, memory 14 can store software modules that may provide functionality when executed by processor 22. The modules can include an operating system 15, a service design and order fulfillment module 16, as well as other functional modules 18. Operating system 15 can provide an operating system functionality for service design and order fulfillment system 10. Service design and order fulfillment module 16 can provide functionality for designing one or more services and for fulfilling one or more orders using the one or more designed services, as is described in more detail below. In certain embodiments, service design and order fulfillment module 16 can comprise a plurality of modules that each provide specific individual functionality for designing one or more services and for fulfilling one or more orders using the designed services. Service design and order fulfillment system 10 can also be part of a larger system. Thus, service design and order fulfillment system 10 can include one or more additional functional modules 18 to include the additional functionality. For example, functional modules 18 may include modules that provide additional functionality, such as an "Oracle Communications Order and Service Management" product from Oracle Corporation. In another example, functional modules 18 may include enterprise resource planning ("ERP") modules of an ERP system, where an ERP system is a computer system that integrates several data sources and processes of an organization into a unified system.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

According to an embodiment, an order fulfillment process can include two components: a concept-to-market component, and an order-to-cash component. A concept-to-market component extends from the time commercial offers based on technical capabilities are conceived to the point of readiness to capture orders for such offers and to deliver such orders. An order-to-cash component supports the business process that extends from a time a quote or order is captured or generated to the time where the services and goods are delivered and properly billed.

A service design and order fulfillment system can offer standardized capabilities that facilitate easy solution adaptation, integration, and transformation. A service design and order fulfillment system can include the following business support systems ("BSS") components: a customer relationship management ("CRM") component; a central order management ("COM") component, a supply chain management ("SCM") component, and a workforce management ("WFM") component. A CRM component can host many front office capabilities, such as shared services (e.g., Sales Catalog, Customers, Customer Assets (Utilized Commercial Customer Inventor), Sales Quote and Order Capture, Agreements, and Customer Service) across several channels (e.g., call center, retail, web, social, partner, and messaging. A COM component can support customer order decomposition, orchestration, and order lifecycle management. A COM component can interface with one or more fulfillment systems in order to fulfill a customer order. A SCM component can provide fulfillment services, such as physical goods fulfillment and logistics. A WFM component can provide workforce services, such as appointment scheduling and field installation.

A service design and order fulfillment system can further include the following operations support systems ("OSS") components: a converged service order management ("SOM") component, a service and resource management ("SRM") component, and component. An SOM component can support service order decomposition, orchestration, and order lifecycle management. The SOM component can further orchestrate fulfillment of a service order across one or more SRM components, technical order management ("TOM") components, and/or SCM and WFM components. An SRM component supports "design and assign" functionality for a service order, service order transformation to a technology-specific technical order, and technical inventory lifecycle management. A TOM component orchestrates fulfillment of technical orders across several components, such as SCM components, WFM components, and activation components.

A service design and order fulfillment system can further include an enterprise catalog that can support a unified definition-time experience to define common commercial catalog items to support BSS components, and common technical catalog items to support OSS components. The commercial and technical catalogs can make up the enterprise catalog and include entities such as a product specification, a service specification, such as a customer-facing service specification and a resource-facing service specification, and a resource specification. Such entities can include metadata that can drive logic in BSS components and OSS components.

Capabilities of a service design and order fulfillment system can be organized into the following capabilities: product lifecycle management ("PLM"); order lifecycle management ("OLM"); inventory lifecycle management ("ILM"); and customer lifecycle management ("CLM"). Such capabilities are now further described in greater detail.

Service providers typically offering their customers services and physical goods of specific utility for a set price. Significant investment typically goes into building a service provider infrastructure (e.g., network and/or IT elements) before service become available to offer to customers. The process is often referred to as plan-and-build ("P&B"). To facilitate management of a provider's infrastructure, it can be modeled as a set of resources and resource facing services. An infrastructure can have affinity to a service domain, where a service domain is a set of closely related services that are used together and typically based on a common set of infrastructure elements. Examples of service domains can include mobile, fixed, cable, software-as-a-service ("SaaS"), and network-based business-to-business services. PLM capabilities can facilitate a variety of change scenarios that assume and build on the outcome of the P&B process. PLM can facilitate service commercialization and order fulfillment as well as the lifecycle of all associated entities.

A "resource" is a part of a provider's infrastructure, customer premise equipment ("CPE") utilized directly or indirectly by a service, or a good that may be procured by the market in the form of a product. A resource can be physical and it can be realized through the provider's infrastructure or as a CPE. Alternatively, a resource can be logical and it can be realized directly as a configuration (via software) of physical resources, or it may be used to facilitate the configuration of the network or the interactions with a third-party supplier or partner. Examples of resources include a provider edge router, a handset, an authentication, authorization, and accounting ("AAA") account, an internet protocol ("IP") address, a modem, a digital subscriber line access multiplexer ("DSLAM"), a digital subscriber line interface ("DSL interface"), and a virtual machine. A "resource specification" is an entity that represents a type of resource, and can be used to facilitate reuse of attributes and logic associated with one or more resources.

A "resource-facing service" is a technology-specific, vendor-agnostic abstraction of a capability from a perspective of a service provider (as opposed to a perspective of an end user). Thus, instead of directly exposing a resource to a customer, some sets of resources can be combined together in ways that provide a service. Thus, a resource-facing service represents a meaningful capability associated with one or more resources. A resource-facing service may also combine capabilities from other finer-grained resource facing services. Examples of resource-facing services include digital subscriber line ("DSL"), data over cable service interface specification ("DOCSIS"), global system for mobile communications ("GSM"), layer 3 virtual private network ("L3VPN") and e-mail. A "resource-facing service specification" is an entity that represents a type of resource-facing service, and can be used to facilitate reuse of attributes and logic associated with one or more resource-facing services.

A "customer-facing service" is a technology-agnostic abstraction of a holistic capability from a perspective of a service provider (as opposed to a perspective of an end user) that facilitates service commercialization, fulfillment and management. A customer-facing service can be realized through one or more technical solutions, where a technical solution is comprised of one or more resources and/or resource-facing services. Thus, a customer-facing service defines the service related features of commercial value that can be made available to a market through one or more product offerings. Examples of customer-facing services include broadband, mobile, VPN, and email. A "customer-facing service specification" is an entity that represents a type of customer-facing service, and can be used to facilitate reuse of attributes and logic associated with one or more customer-facing services.

A "product offering" is a representation of a definition and commercial attributes (e.g., pricing) associated with a sales catalog item (e.g., product, service), and a product offering is made available to sell to customers. Product offerings can be classified into the following types: simple product offering; bundled product offering; or promotional product offering. A "simple product offering" or "simple offering" is a commercially viable and commercially indivisible sales catalog item. A simple offering can establish a promise to a customer and can represent a variety of commercial items, such as physical goods, services, service features, discounts, or pricing items. Simple offerings can be made available to sell solo, within a bundled or promotional offering, or both. Examples of simple offerings can include "iPhone for $300 one-time charge," or "1000 Minutes Mobile Plan for $75 monthly charge." A "bundled product offering" or "bundled offering" is an aggregation of one or more simple offerings, other bundled offerings, and or commercialization logic to facilitate selling and contracts. An example of a bundled offering is "1000 Minutes iPhone Package" that includes the "iPhone" simple offering and the "1000 Minutes Mobile Plan" simple offering. A "promotional product offering" or "promotional offering" is a special type of bundled offering that offers reuse under different commercial and contractual terms. An example of a promotional offering is "Add an iPhone 50% discount and a two-year contract term." A "product specification" is an entity that represents a type of product offering, and can be used to facilitate reuse of attributes and logic associated with one or more product offerings. More specifically, a product specification represents all or a subset of the capabilities of a customer-facing service specification.

As previously described, a service design and fulfillment system can further include an enterprise catalog that can support a unified definition-time experience to define common commercial catalog items to support BSS components, and common technical catalog items to support OSS components. The enterprise catalog can include the definition, metadata, and logic associated with items, such as products, services, and resources. The enterprise catalog can further include a commercial catalog for customer and supply chain perspectives and a technical catalog for OSS perspectives. Commercial catalog items can be deployed into operational time CRM sales catalogs, billing catalogs, SCM catalogs, and COM catalogs. Technical catalog items can be deployed into operational time service and resource catalogs, activation catalogs, and service order management catalogs.

Orders are a primary mechanism to do business and affect change in a provider's infrastructure. OLM covers a wide right of capabilities that relate to orders, and is now described in greater detail. Businesses can generate orders for many purposes, where "order intent" is defined as a purpose of the order. Orders can be named after their intent. For example, an order generated to purchase goods and services from a supplier is called a purchase order. An order generated to sell goods and services to a customer is called a sales order. An order generated to issue a quote to a customer is a quote order.

In certain embodiments, an order can be composed of an order header and one or more order lines (or order items). An "order header" is a component of an order that can capture information applicable to all order lines, such as an order number and customer type. An "order line" can represent an action and a subject that together represents a portion of the order intent. An action represents a request, such as "ADD," "DELETE," or "UPDATE" to apply to a subject. A subject refers to an entity that undergoes the action. An example of a subject is a product offering.

As part of fulfilling the order, the order can be decomposed into several sub-orders, where each sub-order can either have the same intent, or a different intent, as compared to the intent of the original order. In addition, the subject of the one or more order lines can be transformed to different granularities. In the context of the communications industry, an order subject can assume one of four granularities from an order subject name that are derived as follows: customer order, service order, or technical order. A "customer order" is an order with product offering order line subjects. A "service order" is an order with customer-facing service order line subjects. A "technical order" is an order with resource-facing service or resource order line subjects.

According to an embodiment, order fulfillment can utilize multiple order subject transformations via a set of one or more order layers. A first order layer can be a customer order layer (also identified as a "customer layer"). Within the customer order layer, a customer order, such as a sales customer order can be captured in a CRM component, or can be generated within a CRM component by a channel or a third-party. The customer order can be submitted to a COM component, where the customer order can be decomposed into a number of order components. Each order component is a customer order intended for a BSS or OSS fulfillment function. In fulfilling a customer order, the customer order can be transformed to a service order. Customer order to service order transformation can be performed by a service order calculation provider function identified as "Calculate Service Order."

A second order layer can be a service order layer (also identified as a "service layer"). A service order layer can start with the generation of a service order, where a service order can be generated in a COM component, an SOM component, or by a third party. The service order can be designed, and one or more technical orders can be generated by a technical order calculation provider function identified as "Calculate Technical Order."

A third order layer can be a technical order layer (also identified as a "technical layer"). The technical order can be decomposed into a number of technical order components, where the technical order components can be generated by a component, such as an activation component, a SCM component, or a WFM component.

Orders have a life cycle that governs their behavior from inception to exit. Lifecycles are governed by states, logic that determines lifecycle impacting events, valid transitions between states, and valid behavior while an order is in a given state. Further, orders are generated to affect change to an existing state. Based on a kind of context of change an order is generated for, an order can be classified as one or more order types. Specific order states and order types are not relevant to embodiments of this invention, and thus, specific order states and order types are not discussed in further detail.

In each order layer, each type of order is fulfilled by the service design and order fulfillment system. Order fulfillment topology is now described in greater detail. A "fulfillment topology" refers to a set of one or more fulfillment systems, where the fulfillment topology belongs to one or more fulfillment system types, and where the fulfillment topology includes one or more fulfillment providers, and one or more fulfillment functions. A "fulfillment system type" is a class of fulfillment systems that that can provide a single fulfillment function or a single class of fulfillment functions. A "fulfillment system" refers to a computer system that can provide one or more fulfillment functions. A "fulfillment provider" is an instance of a fulfillment system. A "fulfillment function" is a unit of fulfillment work provided by a fulfillment system. An "orchestration plan" is made of one or more fulfillment functions along with one or more dependencies. A "dependency" refers to when an execution of a fulfillment function depends on the execution of another fulfillment function. A "fulfillment flow" refers to an entity that includes a set of fulfillment patterns.

According to an embodiment, a COM component can decouple fulfillment topology from products and fulfillments flows, and a SOM component can decouple fulfillment topology from services, resources, and fulfillment flows. This can increase an agility of order fulfillment, reduce cost for maintaining fulfillment flows, and can decrease time to market when introducing new products. To keep COM fulfillment flows decoupled from fulfillment topology, the COM component can recognize fulfillment systems by type. For each fulfillment system type, the COM component can recognize fulfillment functions available for orchestration. When executing an orchestration plan, the COM component can deploy business rules that apply topology configurations to decompose the order and route fulfillment function requests to a relevant fulfillment system provider. The same concept can be applied to the SOM component and the TOM component, where either the SOM component or the TOM component can decouple fulfillment flow from fulfillment topology.

Order fulfillment is further described in U.S. Patent Application Publication No. 2012/0150676 (herein incorporated by reference), U.S. Patent Application Publication No. 2012/0150583 (herein incorporated by reference), U.S. Patent Application Publication No. 2012/0150692 (herein incorporated by reference), U.S. Patent Application Publication No. 2012/0150582 (herein incorporated by reference), and U.S. Patent Application Publication No. 2012/0150693 (herein incorporated by reference).

Figure 2:
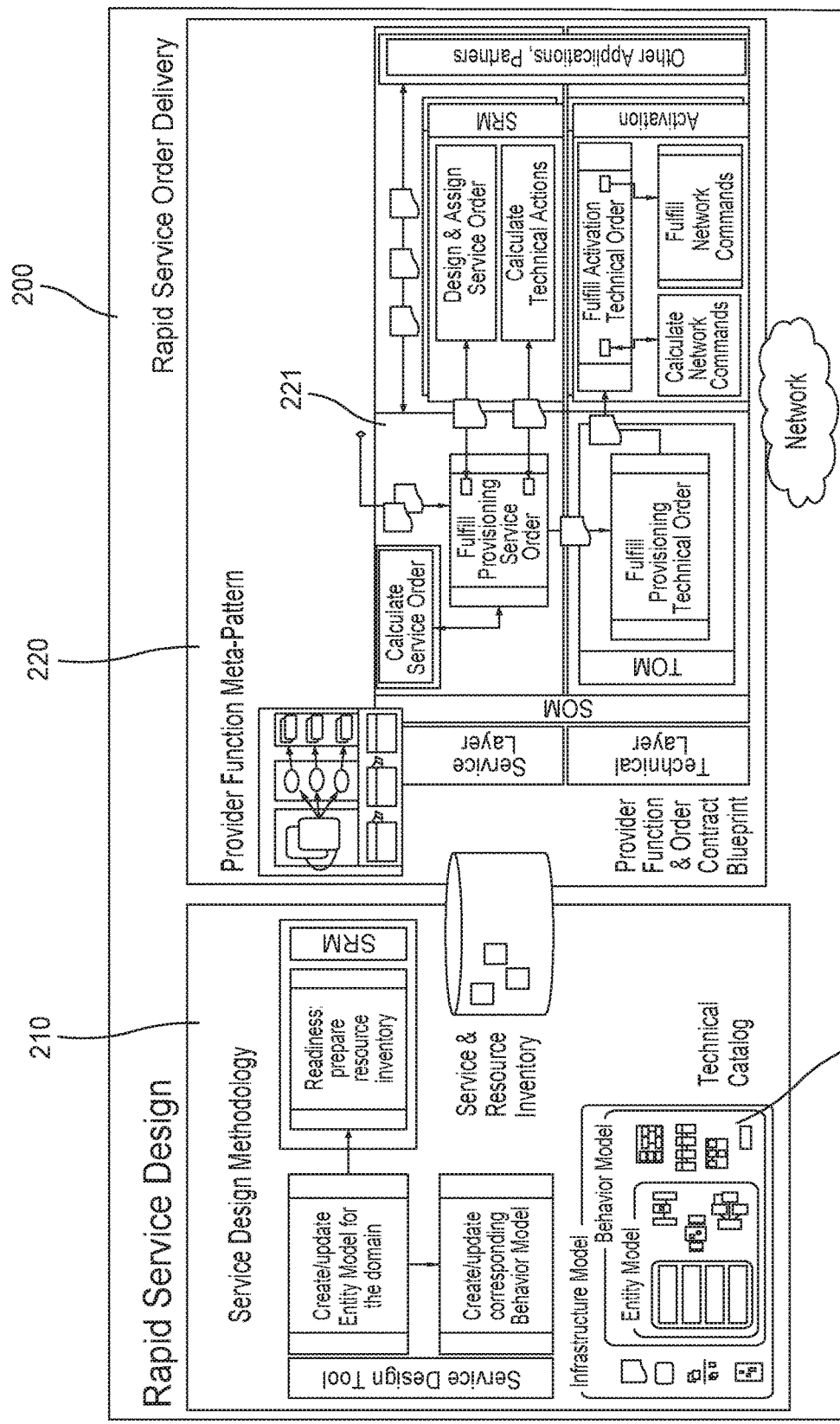
FIG. 2 illustrates a service design and order fulfillment system, according to an embodiment of the invention.

FIG. 2 illustrates a service design and order fulfillment system 200, according to an embodiment of the invention.

Service design and order fulfillment system 200 is a comprehensive system for service concept-to-market and service order to activate process automation composed of a number of capabilities that are separately described below. More specifically, service design and order fulfillment system 200 is configured to design and generate a fulfillment solution, where the fulfillment solution includes a plurality of provider functions, and where the fulfillment solution can fulfill an order. Service design and order fulfillment system 200 includes several components that are separately described below in greater detail.

According to the illustrated embodiment, service design and order fulfillment system 200 includes service design component 210. Service design component 210 can be configured to capture and store aspects of a business relevant to service fulfillment via metadata, where the metadata is defined and structured within a technical catalog 211. Technical catalog 211 can further populate and attribute resource instances in inventory by appropriately defining metadata, in readiness for use in order fulfillment. The metadata of technical catalog 211 can drive operational behavior following a pattern-driven fulfillment model. The technical catalog can include definitions associated with a specification, such as an action or a fulfillment pattern. Technical catalog 211 is further described below in greater detail. Thus, service design component 210 can support effective definition and management of domain information models structured according to a defined structure of technical catalog 211.

Service design and order fulfillment system 200 further includes service order delivery component 220. Service order delivery component 220 can be considered analogous to a group of manufacturing lines, where each line represents a process within a layer and composed of fulfillment providers driven by catalog-provided fulfillment providers. Service order delivery component 220 can be configured to design and generate fulfillment solutions, where fulfillment solutions implement specific provider functions and communicate via specific instances as described in a fulfillment solution blueprint 221. Fulfillment solution blueprint 221 can include: (a) a plurality of interlocking layers of order management; (2) a defined set of durable and domain-agnostic provider functions, built according to a meta-pattern; and (3) a set of interface contracts used between provider functions and order layers, defined around a unified request concept. Fulfillment solution blueprint 211 can further feature a separation between a commercial layer and a service layer. Fulfillment solution blueprint 211 can be defined in terms of: processes and provider functions that follow a pattern-driven fulfillment model (where specific provider functions can include: a provider function for calculating a service order; a provider function for calculating a technical order; and a provider function for designing a service by selecting and assembling supporting components); and interfaces (where specific interfaces can include: a service order; and a technical order). Fulfillment solution blueprint 221 is further described below in greater detail. Thus, service order delivery component 220 can leverage the domain information models structured within technical catalog 211, and provide a suite of software applications for service fulfillment, architected according to fulfillment solution blueprint 221.

Figure 3:
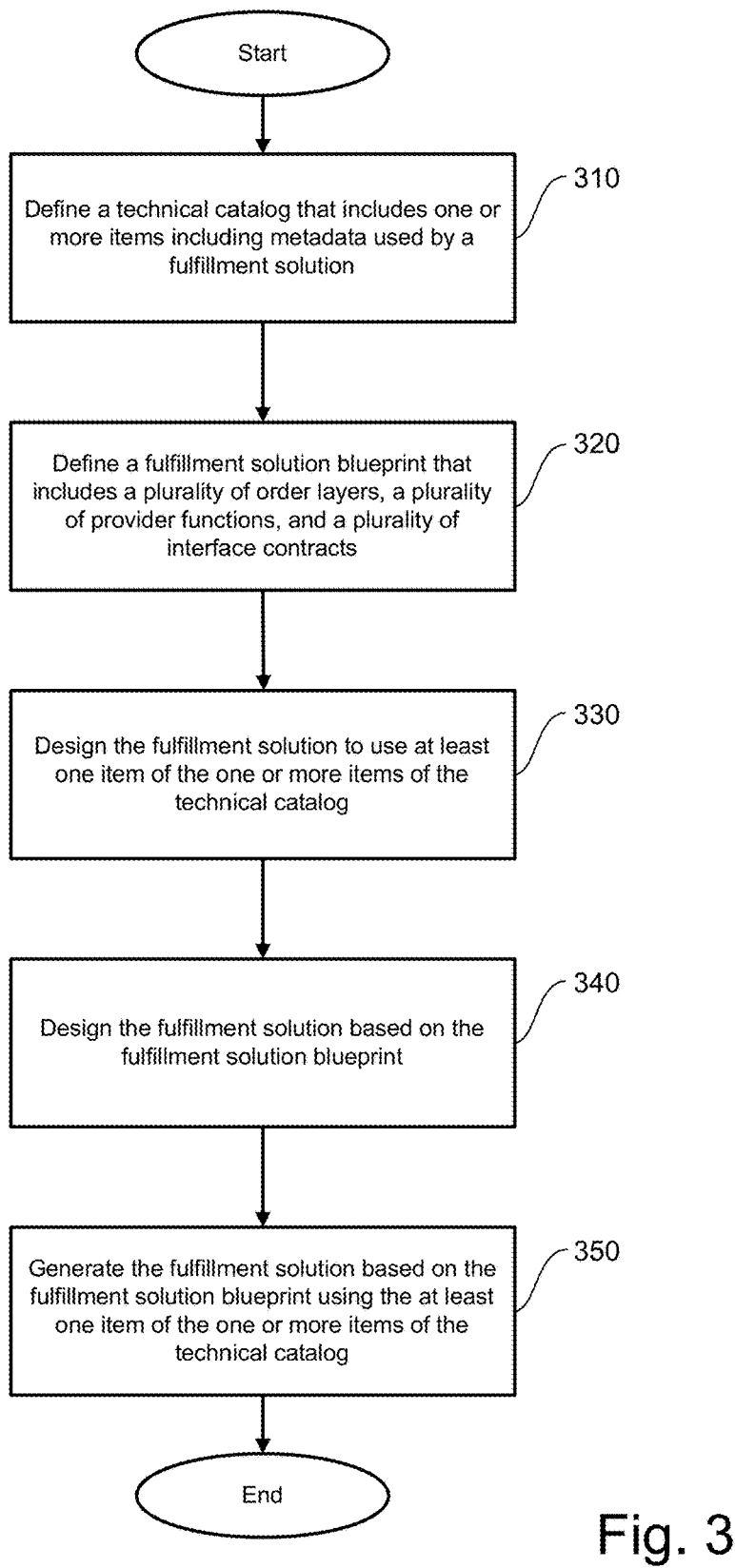
FIG. 3 illustrates a flow diagram of the functionality of a service design and order fulfillment module, according to an embodiment of the invention.

FIG. 3 illustrates a flow diagram of the functionality of a service design and order fulfillment module, according to an embodiment of the invention. In one embodiment, the functionality of the flow diagram of FIG. 3, and the functionality of the flow diagrams of FIGS. 9, 13, 20, 25, 30, 38, 43, 50, and 56, are each implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and proceeds to 310. At 310, a technical catalog is defined that includes one or more items including metadata used by a provider function of a fulfillment solution. In certain embodiments, the technical catalog can be defined by defining one or more entity model items including metadata that defines one of: an entity, or one or more attributes of an entity. In some of these embodiments, defining one or more entity model items can include defining at least one of: an entity including metadata that defines a capability that is provided; a relationship including metadata that defines an association between a first entity and a second entity; a mapping including metadata that defines an association between a first entity, one or more attributes of the first entity, or one or more attribute values of the first entity, and a second entity, one or more attributes of the second entity, or one or more attribute values of the second entity; or an action including metadata that defines a pattern of a structured request to perform work on a subject.

In certain embodiments, the technical catalog can further be defined by defining one or more behavior model items including metadata that defines a behavior of an entity. In some of these embodiments, defining one or more behavior model items can include defining at least one of: a fulfillment pattern including metadata that defines a set of one or more fulfillment functions and one or more dependencies; a transformation sequence including metadata that defines customizable process logic, where the customizable process logic is structured within one or more stages; or a static process including metadata that defines static process logic.

Further, in certain embodiments, the technical catalog can further be defined by defining one or more infrastructure model items including metadata that defines a fulfillment topology. In some of these embodiments, defining one or more infrastructure model items can include defining at least one of: an order specification including metadata that defines a structure of an order; a fulfillment function including metadata that defines a unit of fulfillment work provided by a fulfillment system; or a fulfillment topology including metadata that defines a set of one or more fulfillment systems. The flow proceeds to 320.

At 320, a fulfillment solution blueprint is defined that includes a plurality of order layers that define a plurality of layers of the fulfillment solution, a plurality of provider functions that are a plurality of components of the fulfillment solution, and a plurality of interface contracts defining a plurality of interactions between a plurality of provider functions.

In certain embodiments, the defining the fulfillment solution blueprint can include: defining a customer order layer configured to orchestrate a customer order and to transform the customer order into a service order; defining a service order layer configured to orchestrate the service order and to generate a technical order based on the service order; and defining a technical order layer configured to orchestrate the technical order.

Further, in certain embodiments, the defining the fulfillment solution blueprint can further include defining at least one of: a service order calculation provider function configured to transform a customer order into a service order; a service order orchestration provider function configured to receive a service order and generate an orchestration plan that fulfills the service order; a service order design and assign provider function configured to receive a service order and generate a service instance (including a configuration of resource-facing services and/or resources) based on the service order; a technical order calculation provider function configured to generate a technical order based on a configuration of resource-facing services and/or resources based on a service order; a technical order orchestration provider function configured to receive a technical order and generate an orchestration plan that fulfills the technical order; or a technical order activation provider function configured to receive a technical order and translate the technical order into one or more command sequences delivered to one or more infrastructure elements.

Further, in certain embodiments, the defining the fulfillment solution blueprint can further include defining at least one of: a customer order including one or more customer order lines, where each customer order line includes a product action on a product offering that is based on a product specification; a service order including one or more service order lines, where each service order line includes a service action on a customer-facing service that is based on a customer-facing service specification; or a technical order including one or more technical order lines, where each technical order line includes a technical action on a resource-facing service that is based on a resource-facing service specification, or a resource that is based on a resource specification. The defining the fulfillment solution blueprint can further include defining at least one service design and order fulfillment system component to implement at least one provider function of at least one order layer of the fulfillment solution blueprint. The flow proceeds to 330.

At 330, a fulfillment solution is designed to use at least one item of the one or more items of the technical catalog to fulfill an order. The flow proceeds to 340.

At 340, the fulfillment solution is further designed based on the fulfillment solution blueprint. In certain embodiments, the fulfillment solution is defined to include the one or more provider functions of the fulfillment solution blueprint. The flow proceeds to 350.

At 350, the fulfillment solution is generated based on the fulfillment solution blueprint using the at least one item of the one or more items of the technical catalog. The flow then ends.

Thus, an overall service design and order fulfillment system is provided that can utilize a technical catalog and a fulfillment solution blueprint to design services and fulfill service orders. The system can provide business agility by reducing the time and risk involved in defining a new service or redefining an existing service. The system can also reduce operational costs and improve customer experience by reducing processing exceptions and providing order status transparency. The system can further provide flexibility in how services may be commercialized, and can allow for a straightforward implementation of various business models through a use of interfaces. The system can further reduce a total cost of ownership of a fulfillment solution by enabling consolidation of software, hardware, and skills across multiple lines of products and services.

According to another embodiment, a service design and order fulfillment system can provide a technical catalog, where the technical catalog is a design for the content, structure, and usage of a metadata catalog, where the technical catalog can feature a design for a content, structure, and usage of a metadata catalog, and where the metadata of the technical catalog can configure a behavior of a service design and order fulfillment system. The metadata of the technical catalog can drive operational behavior following a pattern-driven fulfillment model. The technical catalog can include definitions associated with a specification, such as an action or a fulfillment pattern.

Figure 4:
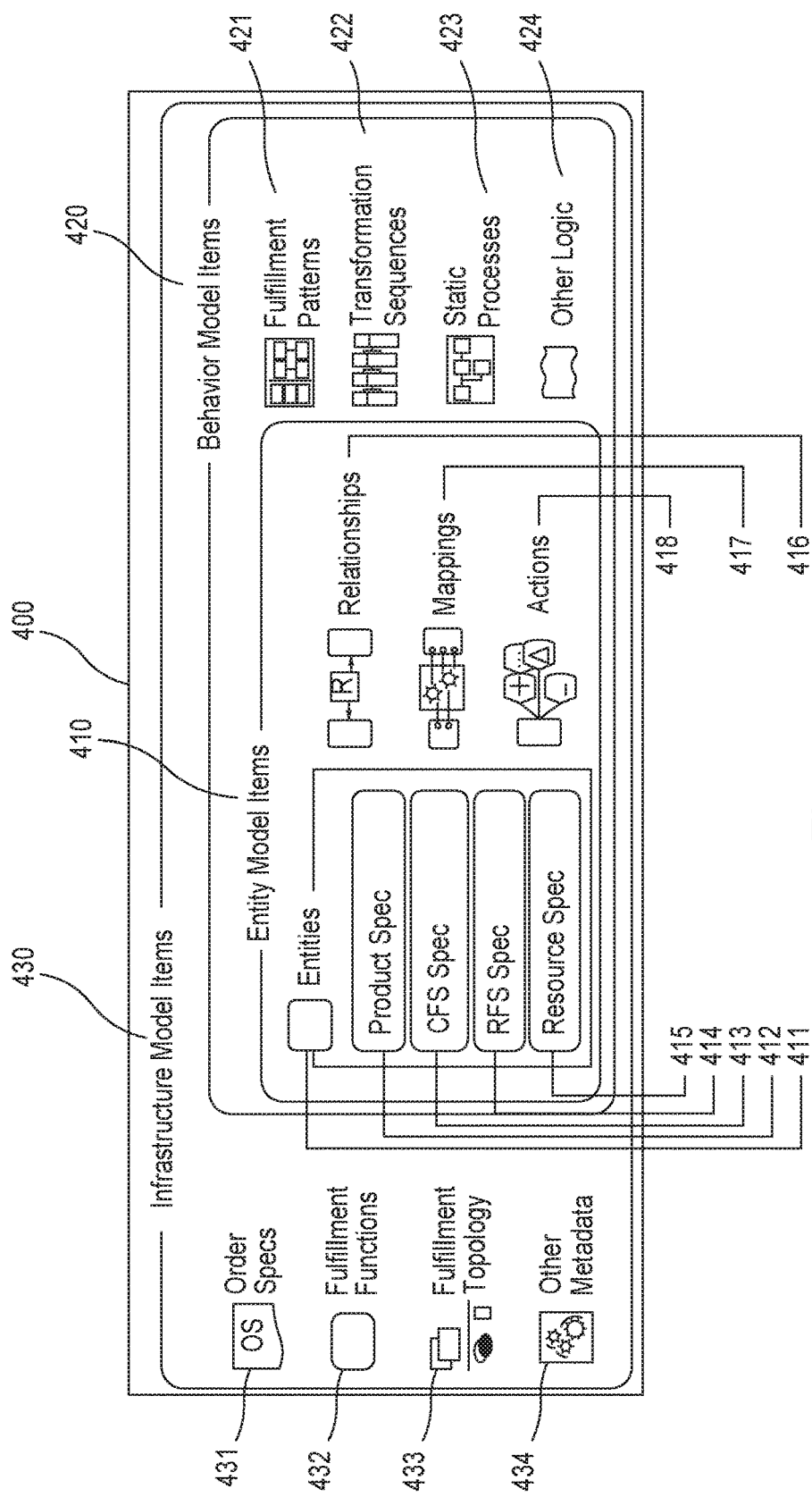
FIG. 4 illustrates an information model of a technical catalog, according to an embodiment of the invention.

FIG. 4 illustrates an information model 400 of a technical catalog, according to an embodiment of the invention. A technical catalog is a data store that can be part of a service design and order fulfillment system, and that can store metadata that is utilized by the service design and order fulfillment system. The technical catalog further includes information model 400, where information model 400 defines a structure, content, and pattern of usage of the metadata stored within the technical catalog. More specifically, information model 400 formats the metadata into one or more items, where an item is a unit of metadata. According to the illustrated embodiment, information model 400 categories each item as an item of one of the following categories: entity model items 410; behavior model items 420, or infrastructure model items 430.

Entity model items 410 are items based on an entity meta-model anchored on one or more specific entities adapted from an information/data model. More specifically, entity model items 410 are items that include metadata, where the metadata either defines one or more entities 411, or one or more attributes of entities 411.

Entities 411 are entities that include metadata that defines a capability that is provided by a fulfillment solution. In certain embodiments, entities 411 can include at least one of: a product specification 412, a customer-facing service specification 413, a resource-facing service specification 414, or a resource specification 415. According to the embodiment, product specification 412 includes metadata that defines a product that is provided by a fulfillment solution, customer-facing service specification 413 includes metadata that defines a customer-facing service that is provided by a fulfillment solution, resource-facing service specification 414 includes metadata that defines a resource-facing service that is provided by a fulfillment solution, and resource specification 414 includes metadata that defines a resource that is provided by a fulfillment solution.

Further, in certain embodiments where entity model items 410 include one or more items whose metadata defines one or more attributes of entities 411, the one or more items can include one or more relationships 416, one or more mappings 417, or one or more actions 418. A relationship includes metadata that defines an association between a first entity of entities 411 and a second entity of entities 411. In alternate embodiments, a relationship can include metadata that defines an association between a set of one or more entities of entities 411 and another set of one or more entities of entities 411. A mapping includes metadata that defines an association between a first entity of entities 411, one or more attributes of the first entity of entities 411, or one or more attribute values of the first entity of entities 411, and a second entity of entities 411, one or more attributes of the second entity of entities 411, or one or more attribute values of the second entity of entities 411, where the association can include a transformation or translation. An action includes metadata that defines a pattern of a structured request to perform work on a subject.

Behavior model items 420 are items that include metadata, where the metadata defines a behavior of an entity (such as an entity of entities 411). In certain embodiments, behavior model items 420 can include one or more fulfillment patterns 421, one or more transformation sequences 422, one or more static processes 423, or other logic 424. Each fulfillment pattern of fulfillment patterns 421 includes metadata that defines a set of one or more fulfillment functions and one or more dependencies. Each transformation sequence of transformation sequences 422 includes metadata that defines customizable process logic, where the customizable process logic is structured within one or more stages. Each static process of static processes 423 includes metadata that defines static process logic. Other logic 424 can include metadata that defines any other types of process or programming logic.

Infrastructure model items 430 are items that include metadata, where the metadata defines a fulfillment topology. In certain embodiments, infrastructure model items 430 can include one or more order specifications 431, one or more fulfillment functions 432, one or more fulfillment topologies 433, or other fulfillment metadata 434. Each order specification of order specifications 431 includes metadata that defines a structure of an order. Each fulfillment function of fulfillment functions 432 includes metadata that defines a unit of fulfillment work provided by a fulfillment system. Each fulfillment topology of fulfillment topologies 433 includes metadata that defines a set of one or more fulfillment systems, where the fulfillment topology belongs to one or more fulfillment system types, and where the fulfillment topology includes one or more fulfillment providers, and one or more fulfillment functions. Other fulfillment metadata 434 can include any other types of fulfillment metadata.

According to an embodiment, a technical catalog (such as the technical catalog illustrated in FIG. 4) can provide a set of one or more items, where the items can be used as building blocks to drive or tailor a behavior of one or more provider functions of one or more fulfillment solutions utilized by a service design and order fulfillment system. Each provider function can vary its behavior based on an execution context which may include one or more items within the technical catalog. Additionally, changes to one or more items within the technical catalog may cause changes to a behavior of one or more provider functions. Further, a technical catalog can provide a model for a particular domain (e.g., GSM, broadband, VPN, etc.). By using items of the technical catalog that may be service-domain-specific, domain-agnostic provider functions can tailor their behavior to match fulfillment requirements of a variety of service domains. Hence, one fulfillment solution is capable of support of any service domain. Thus, durability and stability can be added to an overall service design and order fulfillment system.

Figure 5:
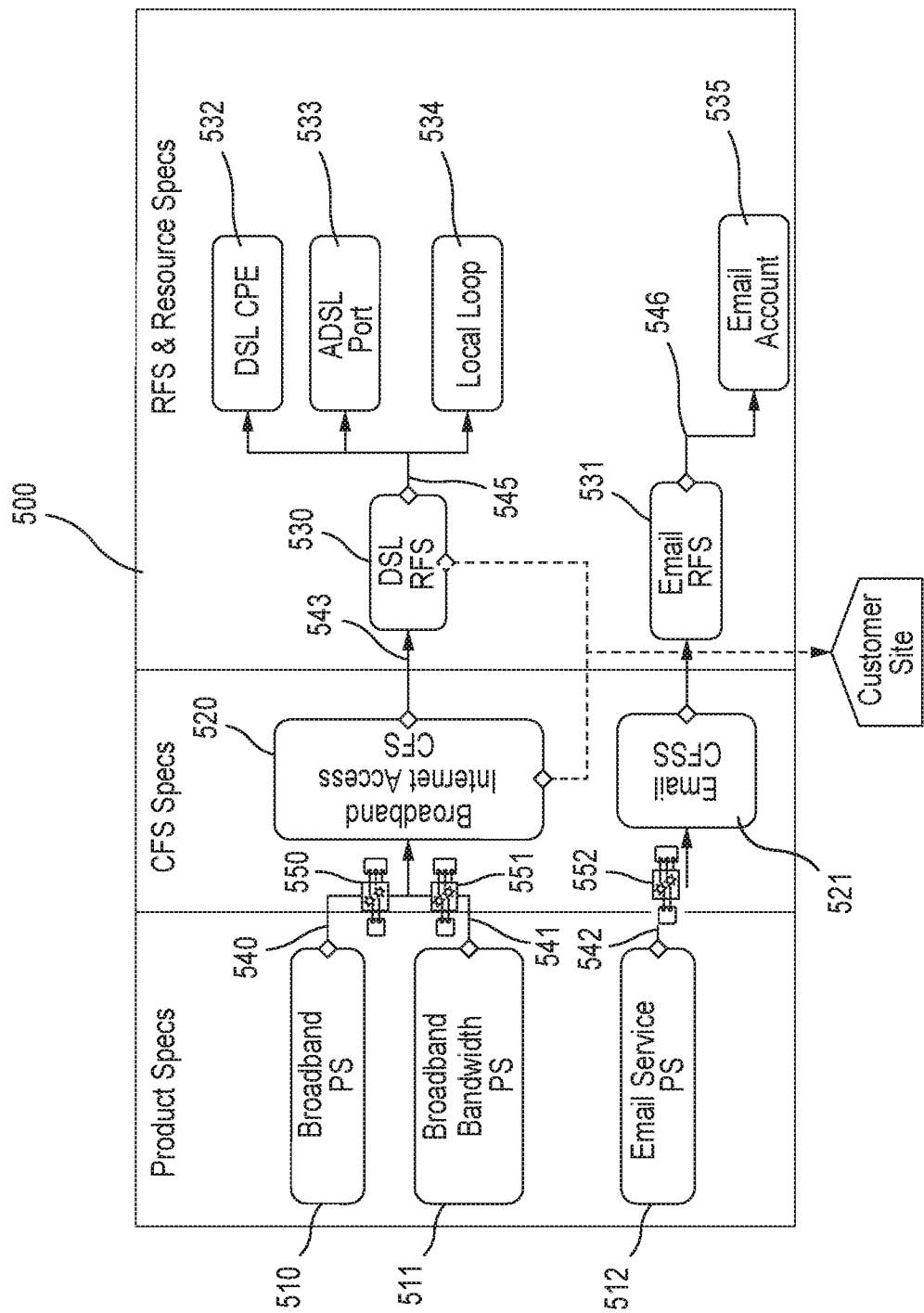
FIG. 5 illustrates a service design that includes a set of entity model items of a technical catalog, according to an embodiment of the invention.

FIG. 5 illustrates a service design 500 that includes an example set of entity model items of a technical catalog, according to an embodiment of the invention. By adding the set of entity model items to service design 500, a fulfillment solution generated from service design 500 can be enable to support new entities.

According to the embodiment, service design 500 includes product specifications 510, 511, and 512. Product specification 510 is a product specification for a broadband product. Product specification 511 is a product specification for a broadband bandwidth product. Product specification 512 is a product specification for an email service product. By designing service design 500 to include product specifications 510, 511, and 512, the subjects of a fulfillment solution generated from service design 500 can include a broadband product, a broadband bandwidth product, and an email service product.

Service design 500 further includes customer-facing service specifications 520 and 521. Customer-facing service specification 520 is a customer-facing service specification for a broadband internet access customer-facing service. Customer-facing service specification 521 is a customer-facing service specification for an email customer-facing service. By designing service design 500 to include customer-facing service specifications 520 and 521, the subjects of a fulfillment solution generated from service design 500 can include a broadband internet access customer-facing service and an email customer-facing service.

Service design 500 also includes resource-facing service specifications 530 and 531. Resource-facing service specification 530 is a resource-facing service specification for a DSL resource-facing service. Resource-facing service specification 531 is a resource-facing service specification for an email resource-facing service. By designing service design 500 to include resource-facing service specifications 530 and 531, the subjects of a fulfillment solution generated from service design 500 can include a DSL resource-facing service and an email resource-facing service.

Service design 500 further includes resource specifications 532, 533, 534, and 535. Resource specification 532 is a resource specification for a DSL CPE resource. Resource specification 533 is a resource specification for an asymmetrical digital subscriber line ("ADSL") port resource. Resource specification 534 is a resource specification for a local loop resource. Resource specification 535 is a resource specification for an email account resource. By designing service design 500 to include resource specifications 532, 533, 534, and 535, the subjects of a service that is generated from service design 500 can include a DSL CPE resource, an ADSL port resource, a local loop resource, and an email account resource.

Service design 500 further includes relationships 540, 541, 542, 543, 544, 545, and 546. Each relationship of relationships 540, 541, 542, 543, 544, 545, and 546 can be a type of relationship selected from a plurality of relationship types. Such relationship types can include: a correlation relationship (e.g., a relationship between a product specification and a customer-facing service specification, or a relationship between a customer-facing service specification and a resource-facing service specification), a composite relationship (e.g., a relationship between a resource-facing service specification and a resource specification), or a fulfillment target relationship that matches an entity to a fulfillment target where the entity is delivered from. In the illustrated embodiment, relationships 540, 541, 542, 543, and 544 are examples of a correlation relationship, and relationships 545 and 546 are examples of a composite relationship.

Relationship 540 is a relationship that defines an association between product specification 510 and customer-facing service specification 520. Relationship 541 is a relationship that defines an association between product specification 511 and customer-facing service specification 520. Relationship 542 is a relationship that defines an association between product specification 512 and customer-facing service specification 521. By designing service design 500 to include relationships 540, 541, and 542, a fulfillment solution generated from service design 500 can associate both a broadband product and a broadband bandwidth product with a broadband internet access customer-facing service, and can further associate an email service product with an email customer-facing service.

Further, relationship 543 is a relationship that defines an association between customer-facing service specification 520 and resource-facing service specification 530. Relationship 544 is a relationship that defines an association between customer-facing service specification 521 and resource-facing service specification 531. By designing service design 500 to include relationships 543 and 544, a fulfillment solution generated from service design 500 can associate a broadband internet access customer-facing service with a DSL resource-facing service, and can also associate an email customer-facing service with an email resource-facing service.

Further, relationship 545 is a relationship that defines an association between resource-facing service specification 530 and resources 532, 533, and 534. Relationship 546 is a relationship that defines an association between resource-facing service specification 531 and resource 535. By designing service design 500 include relationships 545 and 546, a fulfillment solution generated from service design 500 can associate a DSL resource-facing service with a DSL CPE resource, an ADSL port resource, and a local loop resource, and can also associate an email resource-facing service with an email account resource.

Service design 500 also includes mappings 550, 551, and 552. Mapping 550 is a mapping that defines an association between product specification 510, one or more attributes of product specification 510, or one or more attribute values of product specification 510, and customer facing service specification 520, one or more attributes of customer facing service specification 520, or one or more attribute values of customer facing service specification 520. Mapping 551 is a mapping that defines an association between product specification 511, one or more attributes of product specification 511, or one or more attribute values of product specification, and customer-facing service specification 520, one or more attributes of customer-facing service specification 520, or one or more attribute values of customer-facing service specification 520. Mapping 552 is a mapping that defines an association between product specification 512, one or more attributes of product specification 512, or one or more attribute values of product specification 512, and customer-facing service specification 521, one or more attributes of customer-facing service specification 521, or one or more attribute values of customer-facing service specification 521. By designing service design 500 to include mappings 550, 551, and 552, a fulfillment solution generated from service design 500 can associate one or more attributes of both a broadband product and a broadband bandwidth product with one or more attributes of a broadband internet access customer-facing service, and can further associate one or more attributes of an email service product with one or more attributes of an email customer-facing service.

Figure 6:
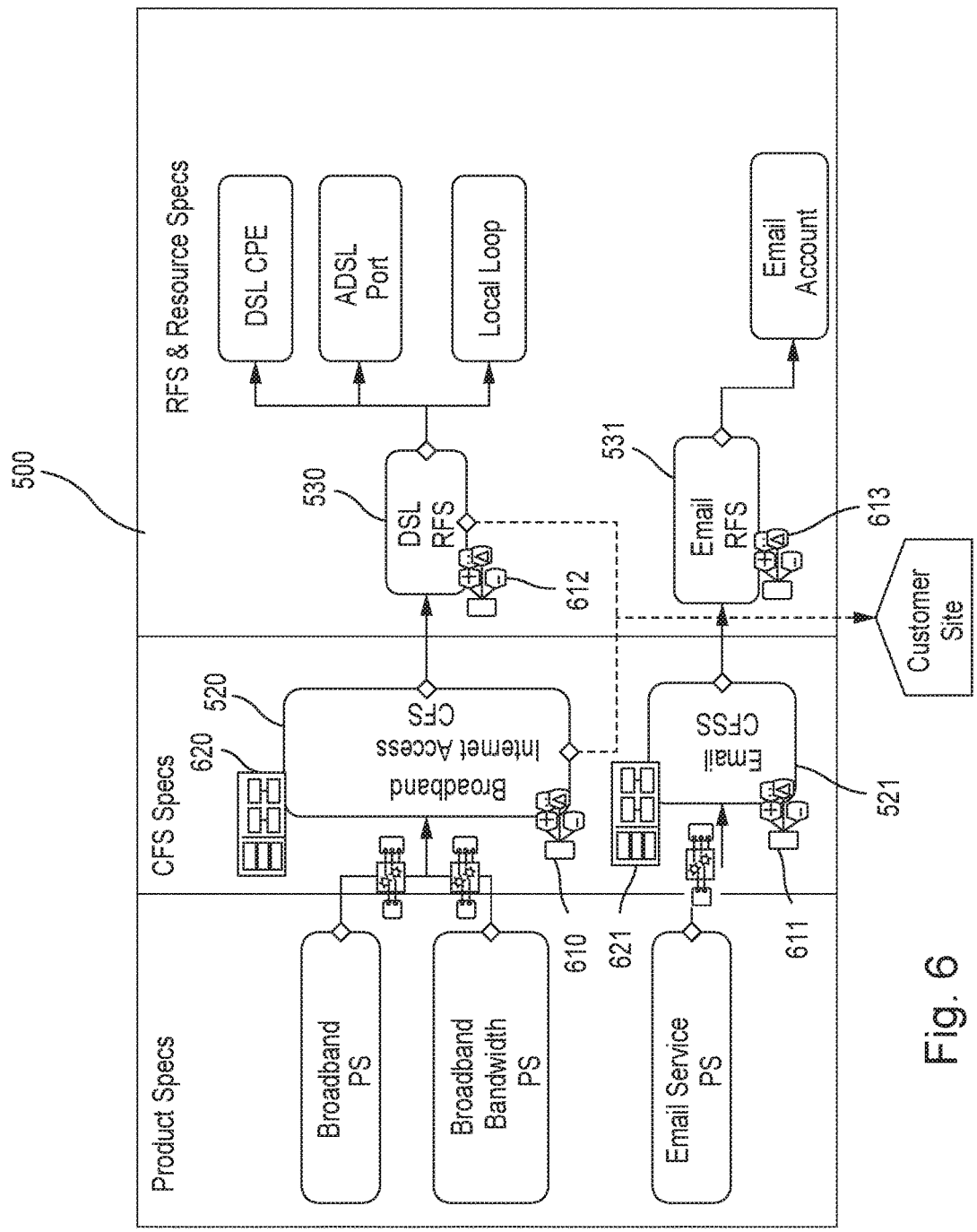
FIG. 6 illustrates a service design that includes an example set of entity model items and behavior model items of a technical catalog, according to an embodiment of the invention.

FIG. 6 illustrates a service design 500 that includes an example set of entity model items and behavior model items of a technical catalog, according to an embodiment of the invention. By adding the set of entity model items and behavior model items to service design 500, logic of a fulfillment solution generated from service design 500 can be further customized.

According to the embodiment, service design 500 includes actions 610, 611, 612, and 613. Action 610 defines a pattern of a structured request to perform work on a customer-facing service that is based on customer-facing service specification 520. Action 611 defines a pattern of a structured request to perform work on a customer-facing service that is based on customer-facing service specification 521. Action 612 defines a pattern of a structured request to perform work on a resource-facing service that is based on resource-facing service specification 530. Action 613 defines a pattern of a structured request to perform work on a resource-facing service that is based on resource-facing service specification 531. By designing service design 500 to include actions 610, 611, 612, and 613, a fulfillment solution generated from service design 500 can perform an action on a broadband internet access customer-facing service, an email customer-facing service, a DSL resource-facing service, and an email resource-facing service.

Service design 500 further includes fulfillment patterns 620 and 621. Fulfillment pattern 620 defines a set of one or more fulfillment functions and one or more dependencies for customer-facing service specification 520. Fulfillment pattern 621 defines a set of one or more fulfillment functions and one or more dependencies for customer-facing service specification 521. By designing service design 500 to include fulfillment patterns 620 and 621, a fulfillment solution generated from service design 500 can apply a fulfillment pattern to a broadband internet access customer-facing service and an email customer-facing service.

Figure 7:
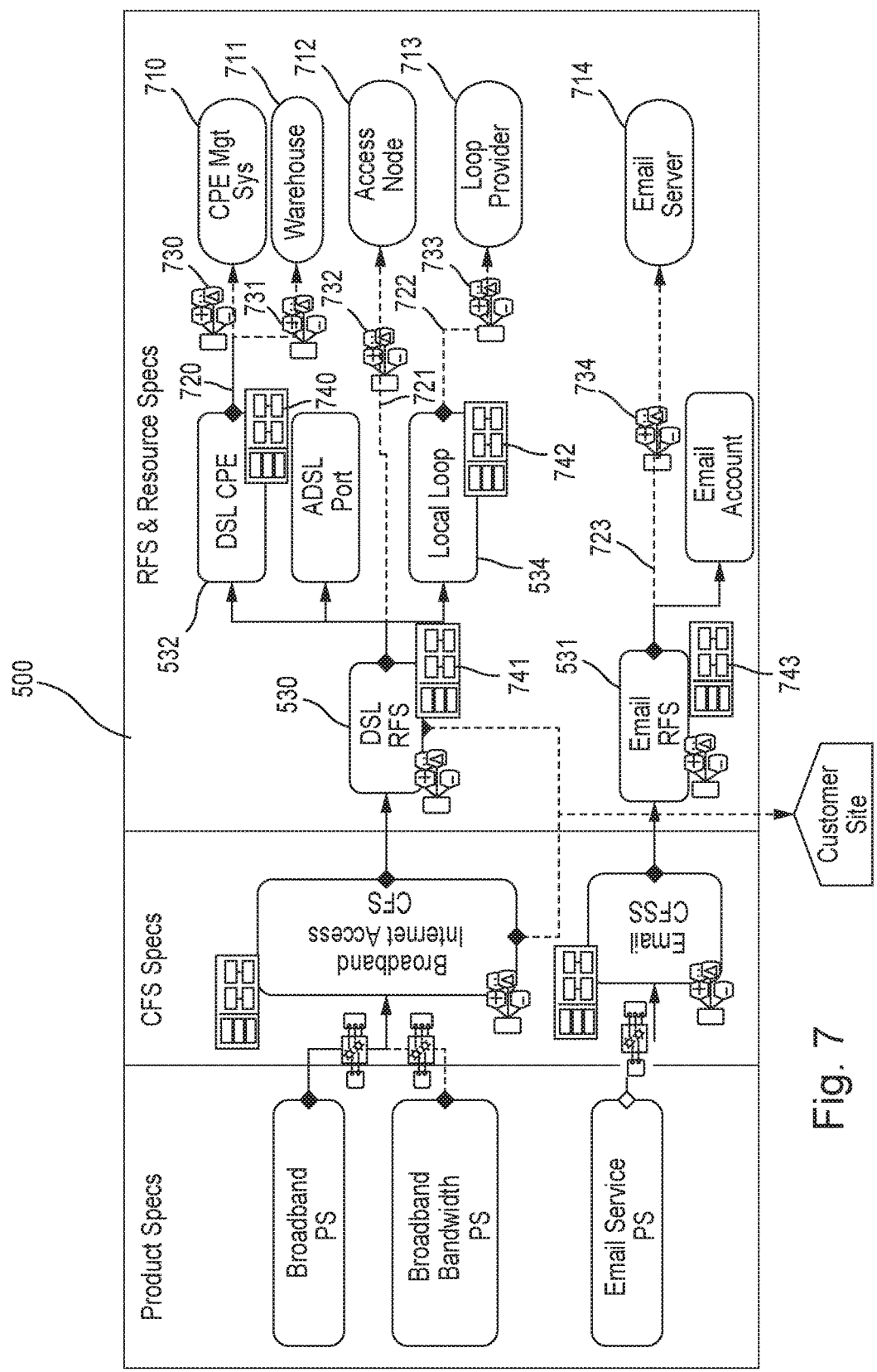
FIG. 7 illustrates a service design that includes another example set of entity model items and behavior model items of a technical catalog, according to an embodiment of the invention.

FIG. 7 illustrates a service design 500 that includes another example set of entity model items and behavior model items of a technical catalog, according to an embodiment of the invention. By adding the additional set of entity model items and behavior model items to service design 500, logic of a fulfillment solution generated from service design 500 can be further customized.

According to the embodiment, service design 500 includes resource specifications 710, 711, 712, 713, and 714. Resource specifications 710, 711, 712, 713, and 714 further represent fulfillment target types. Resource specification 710 is a resource specification for a CPE management system resource. Resource specification 711 is a resource specification for a warehouse resource. Resource specification 712 is a resource specification for an access node resource. Resource specification 713 is a resource specification for a loop provider resource. Resource specification 714 is a resource specification for an email server resource. By designing service design 500 to include resource specifications 710, 711, 712, 713, and 714, the targets of a service that is generated from service design 500 can include a CPE management system resource, a warehouse resource, an access node resource, a loop provider resource, and an email server resource.

Service design 500 further includes relationships 720, 721, 722, and 723. Relationships 720, 721, 722, and 723 are of a referential nature and identify a target for any action on a subject. Each relationship of relationships 720, 721, 722, and 733 can be a type of relationship selected from a plurality of relationship types. Such relationship types can include: a correlation relationship (e.g., a relationship between a product specification and a customer-facing service specification or a relationship between a customer-facing service specification and a resource-facing service specification), a composite relationship (e.g., a relationship between a resource-facing service specification and a resource specification), or a fulfillment target relationship that matches an entity to a fulfillment target where the entity is delivered from. In the illustrated embodiments, relationships 720, 721, 722, and 723 are each examples of a fulfillment target relationship.

Relationship 720 is a relationship that defines an association between resource specification 532 and resource specifications 710 and 711. Relationship 721 is a relationship that defines an association between resource-facing service specification 530 and resource specification 712. Relationship 722 is a relationship that defines an association between resource specification 534 and resource specification 713. Relationship 723 is a relationship that defines an association between resource-facing service specification 531 and resource 714. By designing service design 500 to include relationships 720, 721, 722, and 723, a fulfillment solution generated from service design 500 can associate a DSL CPE resource with both a CPE management system resource and a warehouse resource, can associate a DSL resource-facing service with an access node resource, can associate a local loop resource with a loop provider resource, and can further associate an email resource-facing service with an email server resource.

Service design 500 further includes actions 730, 731, 732, 733, and 734. Action 730 defines a pattern of a structured request to perform work on a resource that is based on resource specification 710. Action 731 defines a pattern of a structured request to perform work on a resource that is based on resource specification 711. Action 732 defines a pattern of a structured request to perform work on a resource that is based on resource specification 712. Action 733 defines a pattern of a structured request to perform work on a resource that is based on resource specification 713. Action 734 defines a pattern of a structured request to perform work on a resource that is based on resource specification 714. By designing service design 500 to include actions 730, 731, 732, 733, and 734, a fulfillment solution generated from service design 500 can perform an action on a CPE management system resource, a warehouse resource, an access node resource, a loop provider resource, and an email server resource. According to the embodiment, action 730 is performed on resource specification 532 as the subject and directed to resource specification 710 as the target, action 731 is performed on resource specification 532 as the subject and directed to resource specification 711 as the target, action 732 is performed on resource-facing service specification 530 as the subject and directed to resource specification 712 as the target, action 733 is performed on resource specification 534 as the subject and directed to resource specification 713 as the target, and action 734 is performed on resource-facing service specification 531 as the subject and directed to resource specification 714 as the target.

Service design 500 further includes fulfillment patterns 740, 741, 742, and 743. Fulfillment pattern 740 defines a set of one or more fulfillment functions and one or more dependencies for resource specification 720. Fulfillment pattern 741 defines a set of one or more fulfillment functions and one or more dependencies for resource-facing service specification 530. Fulfillment pattern 742 defines a set of one or more fulfillment functions and one or more dependencies for resource specification 534. Fulfillment pattern 743 defines a set of one or more fulfillment functions and one or more dependencies for resource-facing service specification 531. In certain embodiments, fulfillment patterns 740, 741, 742, and 743 are unique fulfillment patterns. In other alternate embodiments, one or more of fulfillment patterns 740, 741, 742, and 743 are identical to each other. By designing service design 500 to include fulfillment patterns 740, 741, 742, and 743, a fulfillment solution generated from service design 500 can apply a fulfillment pattern to a DSL CPE resource, a DSL resource-facing service, a local loop resource, and an email resource-facing service.

Figure 8:
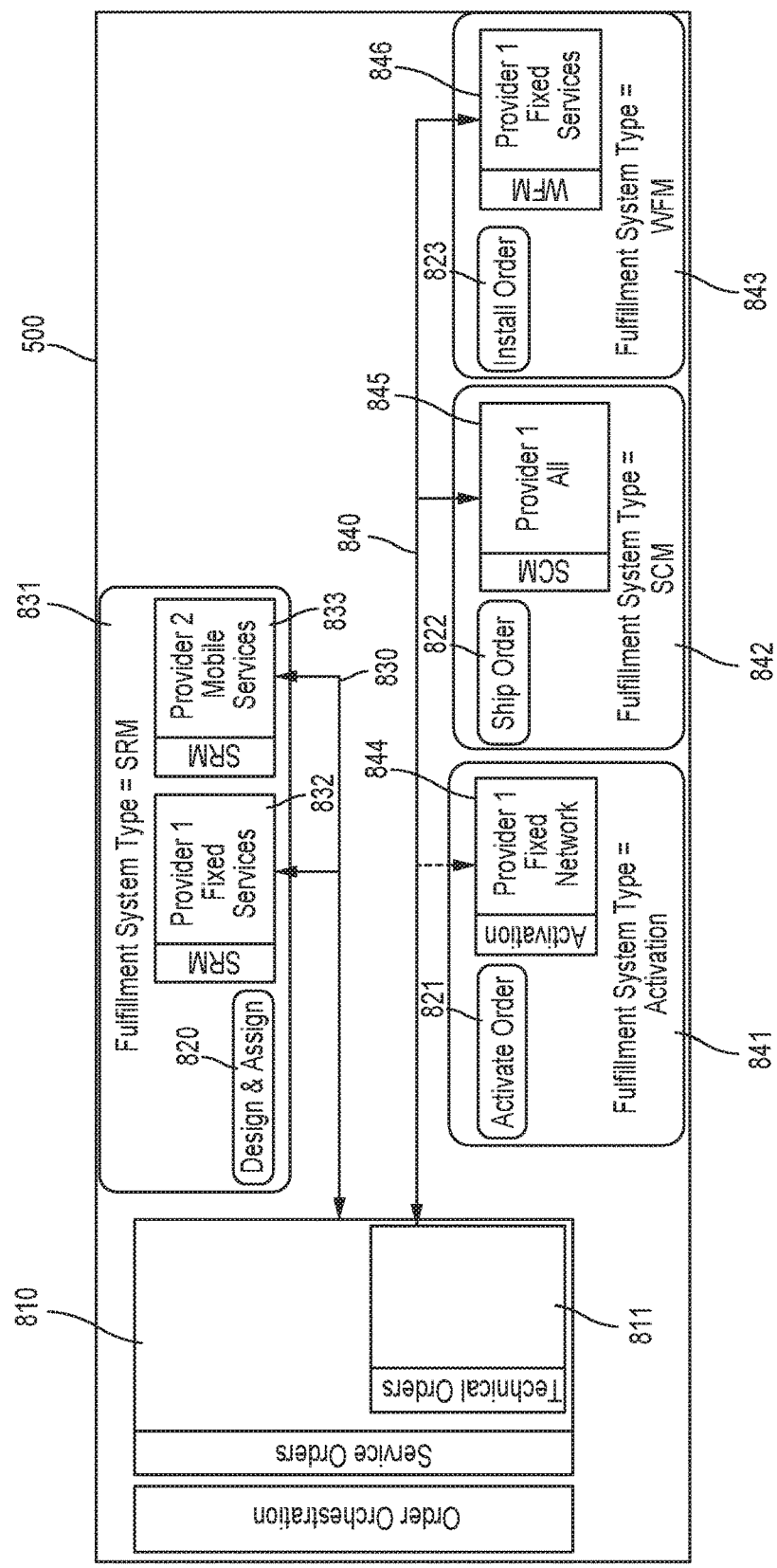
FIG. 8 illustrates an example set of infrastructure model items of a technical catalog, according to an embodiment of the invention.

FIG. 8 illustrates an example set of infrastructure model items of a technical catalog, according to an embodiment of the invention. By adding the set of infrastructure model items to service design 500, logic of a service that is generated from service design 500 can be further customized.

According to the embodiment, service design 500 includes order specifications 810 and 811. Order specification 810 is a service order specification that defines a structure of a service order. Order specification 811 is a technical order specification that defines a structure of a technical order. By designing service design 500 to include order specifications 810 and 811, a fulfillment solution generated from service design 500 can perform functionality on a service order as well as a technical order.

Service design 500 further includes fulfillment functions 820, 821, 822, and 823. Fulfillment function 820 is a design and assign (i.e. "Design and Assign") fulfillment function that can generate a service instance from a service order. Fulfillment function 821 is an order activation (i.e., "Activate Order") fulfillment function that can perform work associated with activating a technical order. Fulfillment function 822 is an order shipment (i.e., "Ship Order") function that can perform work associated with shipping a technical order. Fulfillment function 823 is an order install (i.e., "Install Order") fulfillment function that can perform work associated with installing a technical order. By designing service design 500 to include fulfillment functions 820, 821, 822, and 823, a fulfillment solution generated from service design 500 can generate a service instance from a service order, activate a technical order, ship a technical order, and install a technical order.

Service design 500 further includes fulfillment topologies 830 and 840. Fulfillment topology 830 is a set of fulfillment systems associated with order specification 810. More specifically, fulfillment topology 830 includes a fulfillment system that belongs to fulfillment system type 831, and that includes fulfillment function 820, and fulfillment providers 632 and 633. Fulfillment topology 840 is a set of fulfillment systems associated with order specification 820. More specifically, fulfillment topology 840 includes: a fulfillment system that belongs to fulfillment system type 841, and that includes fulfillment function 821, and fulfillment provider 844; a fulfillment system that belongs to fulfillment system type 842, and that includes fulfillment function 822, and fulfillment provider 845; and a fulfillment system that belongs to fulfillment system type 843, and that includes fulfillment function 823, and fulfillment provider 846. By designing service design 500 to include fulfillment topologies 830 and 840, a fulfillment solution generated from service design 500 can utilize different fulfillment topologies for fulfilling a service order and a technical order.

Figure 9:
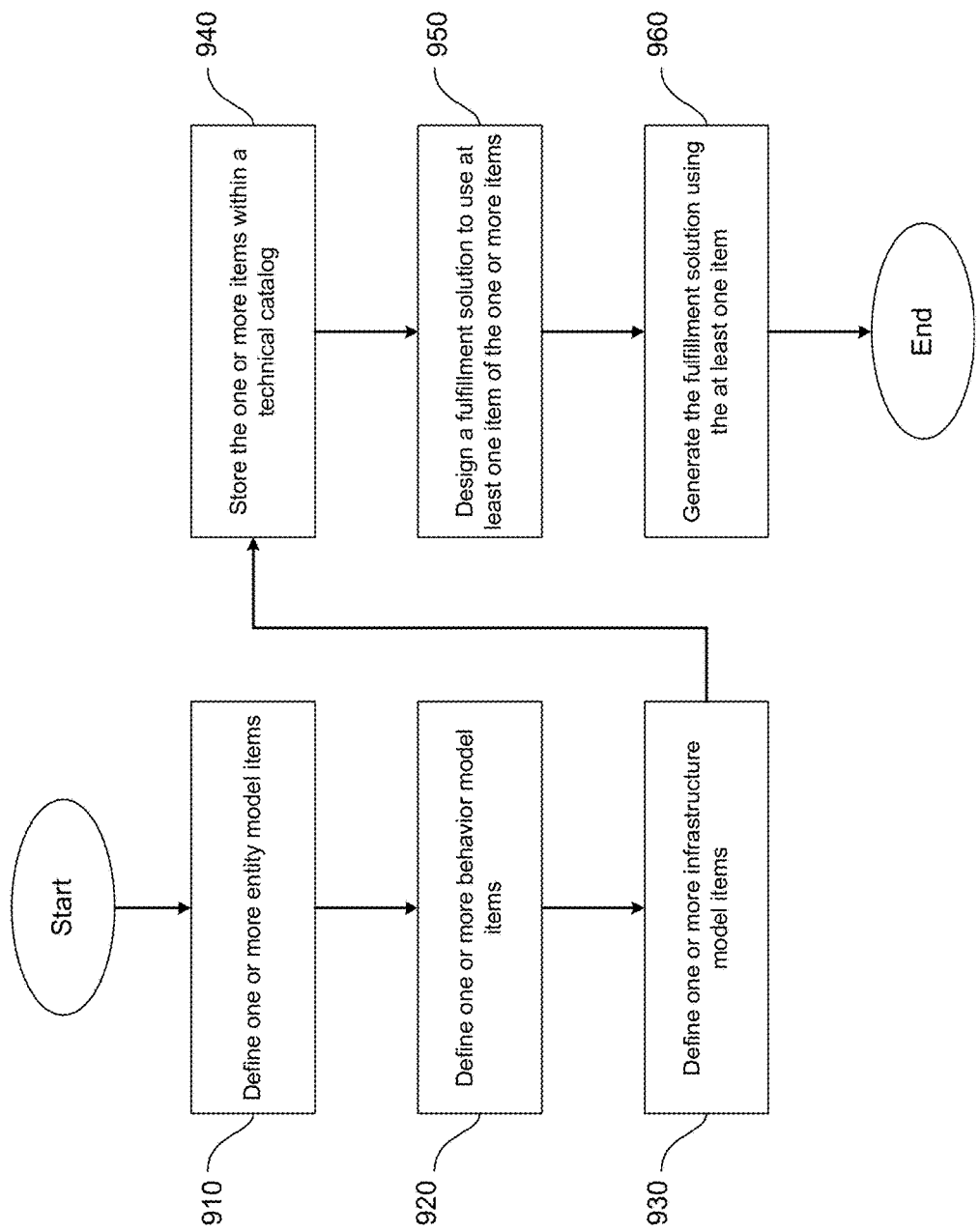
FIG. 9 illustrates another flow diagram of the functionality of a service design and order fulfillment module, according to another embodiment of the invention.

FIG. 9 illustrates another flow diagram of the functionality of a service design and order fulfillment module, according to another embodiment of the invention. The flow begins and proceeds to 910. At 910, one or more entity model items are defined. Each entity model item includes metadata that defines one of: an entity; or one or more attributes of an entity. The metadata can be used by a fulfillment solution, and each entity model item can be used by the fulfillment solution to fulfill an order. In certain embodiments, at least one of the following is defined: an entity including metadata that that defines a capability that is provided; a relationship including metadata that defines an association between a first entity and a second entity; a mapping including metadata that defines an association between a first entity, one or more attributes of the first entity, or one or more attribute values of the first entity, and a second entity, one or more attributes of the second entity, or one or more attribute values of the second entity; or an action including metadata that defines a pattern of a structured request to perform work on a subject. In embodiments where an entity is defined, at least one of the following is defined: a product specification including metadata that defines a product that is provided; a customer-facing service specification including metadata that defines a customer-facing service that is provided; a resource-facing service specification including metadata that defines a resource-facing service that is provided; or a resource specification including metadata that defines a resource that is provided. The flow then proceeds to 920.

At 920, one or more behavior model items are defined. Each behavior model item includes metadata that defines a behavior of an entity. The metadata can be used by a fulfillment solution, and each behavior model item can be used by the fulfillment solution to fulfill an order. In certain embodiments, at least one of the following is defined: a fulfillment pattern including metadata that defines a set of one or more fulfillment functions and one or more dependencies; a transformation sequence including metadata that defines customizable process logic, where the customized process logic is structured within one or more stages; or a static process including metadata that defines static process logic. The flow then proceeds to 930.

At 930, one or more infrastructure model items are defined. Each infrastructure model item includes metadata that defines a fulfillment topology. The metadata can be used by a fulfillment solution, and each infrastructure model item can be used by the fulfillment solution to fulfill an order. In certain embodiments, at least one of the following is defined: an order specification including metadata that describes a structure of an order; a fulfillment function including metadata that defines a unit of fulfillment work provided by a fulfillment system; or a fulfillment topology including metadata that defines a set of fulfillment systems. The flow then proceeds to 940.

At 940, the one or more items (i.e., the one or more entity model items, the one or more behavior model items, and the one or more infrastructure model items), are stored within a technical catalog. The technical catalog is a data store that stores metadata. The technical catalog further defines a structure of the one or more items. The flow then proceeds to 950.

At 950, a fulfillment solution is designed to use at least one item of the one or more items (i.e., the one or more entity model items, the one or more behavior model items, and the one or more infrastructure model items) to fulfill an order. In certain embodiments, the fulfillment solution is designed to include one or more provider functions, where each provider function uses at least one item of the one or more items. In some of these embodiments, the provider function includes a logical component of the fulfillment solution configured to provide a capability, and the provider function is configured to act upon a defined input and generate a defined output. Further, in certain embodiments, the fulfillment solution includes a metadata-driven executable process that fulfills an order. By fulfilling an order, the fulfillment solution can generate an orchestration plan that fulfills the order. In some of these embodiments, the order is an order for communication services. The flow then proceeds to 960.

At 960, the fulfillment solution is generated using the at least one item of the one or more items (i.e., the one or more entity model items, the one or more behavior model items, and the one or more infrastructure model items). The flow then ends. In alternate embodiments, the flow can proceed according to an alternate sequence that is different from the sequence illustrated in FIG. 9.

Thus, in one embodiment, a service design and order fulfillment system can provide a technical catalog that provides a particular structure, content, and usage. Aspects of the business that are relevant to a fulfillment system can be captured in the technical catalog, in a form that is coherent, comprehensive, and meaningful to business users.

Further, the technical catalog can utilize patterns that enable scalability of behavior variations, based on compact and manageable sets of metadata. This can result in a versatile fulfillment system. The technical catalog can be structured and used in ways that enable rapid adaptation of a service fulfillment solution to business changes and opportunities. The technical catalog can facilitate rapid communication between a technical community and a commercial community, using a common model and vocabulary to describe service behavior in a service fulfillment context. An information model structured in this way can be straightforward to analyze and use without requiring significant technical knowledge of specific operational support system software. Changes to such an information model can be transparently correlated to business impacts, which can enable adaption work to be localized and planned. Further, due to localization of changes to the technical catalog, reliable and efficient fulfillment operations can be maintained, thus minimizing the possibility of change-induced errors resulting in the service fulfillment solution.

According to another embodiment, a service design and order fulfillment system can provide a fulfillment solution blueprint, where the fulfillment solution blueprint is an organizational schema for the service design and order fulfillment system that can support a wide range of services, such as communications/information services, with minimal reconfiguration. The fulfillment solution blueprint can define a set of contract interfaces and provider functions that are all independent of any service domain, allowing a single service design and order fulfillment system to support multiple domains, and for new domains to be easily introduced. The fulfillment solution blueprint can feature: (a) a separation between a commercial layer and a service layer; (b) a separation between a service layer and a technical layer; and (c) an orchestration decoupled from a fulfillment topology. The fulfillment solution blueprint can be defined in terms of: (a) processes and provider functions that follow a pattern-driven fulfillment model, where specific provider functions can include: (1) a provider function for calculating a service order; (2) a provider function for calculating a technical order; and (3) a provider function for designing a service by selecting and assembling supporting components; and (b) interfaces, where specific interfaces can include (1) a service order; and (2) a technical order.

Further, according to the embodiment, a fulfillment solution blueprint can be an organizational schema for a fulfillment solution that can provide a logical ordering of provider functions within a logical ordering of order layers. For example, a fulfillment solution may receive a customer request via an order, where the customer request is to perform an action on an infrastructure or network element. The fulfillment solution blueprint can provide an organizational breakdown of a fulfillment solution, where the fulfillment solution is broken down into a plurality of order layers, and each order layer is broken down into a plurality of provider functions. The fulfillment solution blueprint can be used by a service design and order fulfillment solution to design and generate a fulfillment solution that can transform the order, through various order layers, into an action on an infrastructure or network element. Thus, the fulfillment solution blueprint is a documented expression of a partitioning of fulfillment functionality into one or more order layers, where each order layer is partitioned into one or more provider functions.

Figure 10:
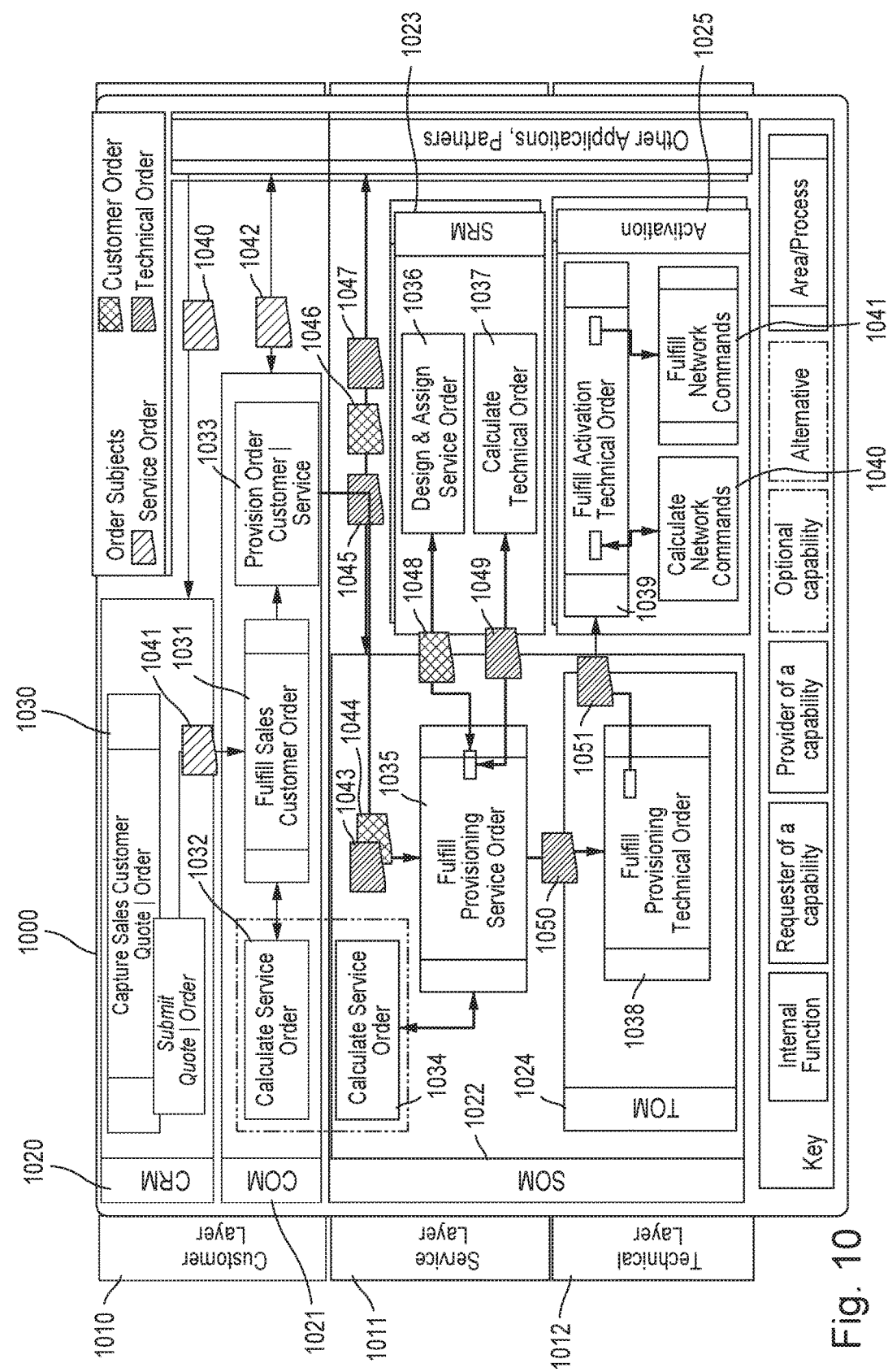
FIG. 10 illustrates an example fulfillment solution blueprint, according to an embodiment of the invention.

FIG. 10 illustrates an example fulfillment solution blueprint 1000, according to an embodiment of the invention. According to the embodiment, fulfillment solution blueprint 1000 includes three order layers: customer order layer (i.e., customer layer) 1010, service order layer (i.e., service layer) 1011, and technical order layer (i.e., technical layer) 1012. Each order layer defines a layer of an overall fulfillment solution, and each order layer is configured to fulfill a type of order among multiple provider functions, fulfillment system types, and fulfillment providers. By fulfilling a type of order, each order layer can generate an orchestration plan that fulfills the type of order. More specifically, customer layer 1010 is configured to fulfill a customer order, which can involve transforming a customer order into a service order. Service layer 1011 is configured to fulfill a service order, which can involve generating a technical order based on a service instance (including a configuration of resource-facing services and/or resources). Technical layer 1012 is configured to fulfill a technical order. The number and layout of order layers for fulfillment solution blueprint 1000 is an example number and layout of order layers according to an example embodiment. In alternate embodiments, a fulfillment solution blueprint can have any number and layout of order layers.

Further, customer layer 1010 is decoupled from service layer 1011, and service layer 1011 is decoupled from technical layer 1012. In other words, the three order layers are separated and ordered, where customer layer 1010 is the first layer of the fulfillment solution blueprint, service layer 1011 is the second layer of the fulfillment solution blueprint, and technical order layer 1012 is the third layer of the fulfillment solution blueprint. Decoupling of a customer layer from a service layer is further described below in greater detail. Decoupling of a service layer from a technical layer is further described in U.S. Patent Application Publication No. 2012/0150676, U.S. Patent Application Publication No. 2012/0150583, U.S. Patent Application Publication No. 2012/0150692, U.S. Patent Application Publication No. 2012/0150582, and U.S. Patent Application Publication No. 2012/0150693. Additionally, customer layer 1010, service layer 1011, and technical layer 1012, are each decoupled from a specific fulfillment topology, where the specific fulfillment topology is utilized to fulfill the respective order according to an orchestration plan generated by the respective order layer. Decoupling of a fulfillment flow, such as an orchestration plan, from a fulfillment topology is further described in U.S. Patent Application Publication No. 2012/0150676, U.S. Patent Application Publication No. 2012/0150583, U.S. Patent Application Publication No. 2012/0150692, U.S. Patent Application Publication No. 2012/0150582, and U.S. Patent Application Publication No. 2012/0150693.

According to the embodiment, fulfillment solution blueprint 1000 includes six service design and order fulfillment system components: a CRM component 1020, a COM component 1021, a SOM component 1022, a SRM component 1023, a TOM component 1024, and an activation component 1025. Each service design and order fulfillment system component can be assigned to an order layer and defined to implement one or more provider functions and/or one or more interface contracts.

In the illustrated embodiment, CRM component 1020 can capture one or more customer orders. COM component 1021 can receive one or more customer orders and orchestrate them among various fulfillment system components, such as a billing component, a service fulfillment component, a supply chain management component, and a workforce management component. COM component 1021 can further transform the one or more customer orders into one or more service orders. SOM component 1022 can receive one or more service orders from COM component 1021, and orchestrate the one or more service orders among SRM component 1023 and TOM component 1024. SOM component 1022 can optionally pre-process a customer order to derive a service order. SOM component 1022 can further generate one or more technical orders based on the one or more service orders. SRM component 1023 can receive one or more service order lines of one or more service orders and perform a service order design and assign function, as well as a technical order calculation function. TOM component 1024 can receive one or more technical orders from SOM component 1022, and orchestrate the one or more technical orders among various service design and order fulfillment system components, such as an activation component, a supply chain management component, and a workforce management component. Activation component 1025 can receive one or more technical order lines and perform a technical order activation fulfillment function.

Fulfillment solution blueprint 1000 further includes eleven provider functions: a customer order capture provider function 1030, a customer order orchestration provider function 1031, a service order calculation provider function 1032 (for customer layer 1010), a customer order provisioning provider function 1033, a service order calculation provider function 1034 (for service layer 1011), a service order orchestration provider function 1035, a service order design and assign provider function 1036, a technical order calculation provider function 1037, a technical order orchestration provider function 1038, a technical order activation orchestration provider function 1039, an activation command calculation provider function 1040, and an activation command fulfillment provider function 1041. Each provider function is a durable and domain-agnostic provider function, which can interact with another provider function according to a specific topological configuration via stable interfaces. Further, each provider function is a component of an overall fulfillment solution, where each provider function is configured to provide a capability and is configured to act upon a defined input and generate a defined output. In certain embodiments, each provider function includes one or more items of a technical catalog, wherein each item defines metadata for the provider function. Also, in certain embodiments, each provider function can be created based on a dynamic pattern-driven fulfillment model.

In the illustrated embodiment, service order orchestration provider function 1035 is a provider function configured to generate an orchestration plan that fulfills the service order. Service order orchestration provider function 1035 is further capable of invoking, as needed, service order calculation provider function 1034, where service order calculation provider function 1034 is a provider function configured to transform a customer order into a service order. Service order design and assign provider function 1036 is a provider function configured to receive a service order and generate a service instance (including a configuration of resource-facing services and/or resources) based on the service order. Technical order calculation provider function 1037 is a provider function configured to generate a technical order based on a change to a configuration of resource-facing services and/or resources. Technical order orchestration provider function 1038 is a provider function configured to receive a technical order and generate an orchestration plan that fulfills the technical order. Technical order activation orchestration provider function 1039 is a provider function configured to receive a technical order and translate the technical order into one or more command sequences delivered to one or more infrastructure elements.

Regarding customer layer 1010, CRM component 1020 and customer order capture provider function 1030 can be assigned to customer layer 1010, where CRM component 1020 can be defined to implement customer order capture provider function 1030. COM component 1030, customer order orchestration provider function 1031, service order calculation provider function 1032, and customer order provisioning provider function 1033 can also be assigned to customer layer 1010, where COM component 1021 can be defined to implement customer order orchestration provider function 1031, service order calculation provider function 1032, and customer order provisioning provider function 1033.

Regarding service layer 1011, SOM component 1022, service order calculation provider function 1034, and service order orchestration provider function 1035 can be assigned to service layer 1011, where SOM component 1022 can be defined to implement service order calculation provider function 1034, and service order orchestration provider function 1035. SRM component 1023, service order design and assign provider function 1036, and technical order calculation provider function 1037 can also be assigned to service layer 1011, where SRM component 1023 can be defined to implement service order design and assign provider function 1036, and technical order calculation provider function 1037.

Regarding technical layer 1012, TOM component 1024 and technical order orchestration provider function 1038 can be assigned to technical layer 1012, where TOM component 1024 can be defined to implement technical order orchestration provider function 1038. Activation component 1025, technical order activation orchestration provider function 1039, activation command calculation provider function 1040, and activation command fulfillment provider function 1041 can also be assigned to technical layer 1012, where activation component 1025 can be defined to implement technical order activation orchestration provider function 1039, activation command calculation provider function 1040, and activation command fulfillment provider function 1041.

The number and layout of service design and order fulfillment system components for fulfillment solution blueprint 1000 is an example number and layout of service design and order fulfillment system components according to an example embodiment. In alternate embodiments, a fulfillment solution blueprint can have any number of number and layout of service design and order fulfillment system components. Similarly, the number and layout of provider functions for fulfillment solution blueprint 1000 is an example number and layout of provider functions according to an example embodiment. In alternate embodiments, a fulfillment solution blueprint can have any number and layout of provider functions.

Fulfillment solution blueprint 1000 further includes twelve interface contracts: customer orders 1040, 1041, 1042, 1043, and 1045, service orders 1044, 1046, and 1048, and technical orders 1047, 1049, 1050, and 1051. Each interface contract defines an interaction between two provider functions, where each interface contract defines either an input or an output of a provider function. Each interface contract can also define an interaction between two order layers, and can use a pattern that is independent of specific products or services. Further, a customer order is an order that includes one or more product offering order lines. A service order is an order that includes one or more customer-facing service order lines. A technical order is an order that includes one or more resource-facing service order lines or one or more resource order lines. Further, fulfillment solution blueprint 1000 allows for orders to be input into any layer without necessarily going through prior order layers, provided that the order adheres to the interface contract.

In the illustrated embodiment, customer order 1040 is an input to customer order capture provider function 1030. Customer order 1041 is an output of customer order capture provider function 1030, and an input to customer order orchestration provider function 1031. Customer order 1042 is an input to, and an output of, customer order provisioning provider function 1033. Customer order 1043 and service order 1044 are each an input to service order orchestration provider function 1035. Customer order 1045, service order 1046, and technical order 1047 are each an output of service order orchestration provider function 1035. Service orders 1048 and 1049 are an input to, and an output of, both service order design and assign provider function 1036, technical order calculation provider function 1037. Technical order 1050 is an output of service order orchestration provider function 1035, and an input to technical order orchestration provider function 1038. Technical order is an output of technical order orchestration provider function 1038, and an input to technical order activation orchestration provider function 1039.

Figure 11:
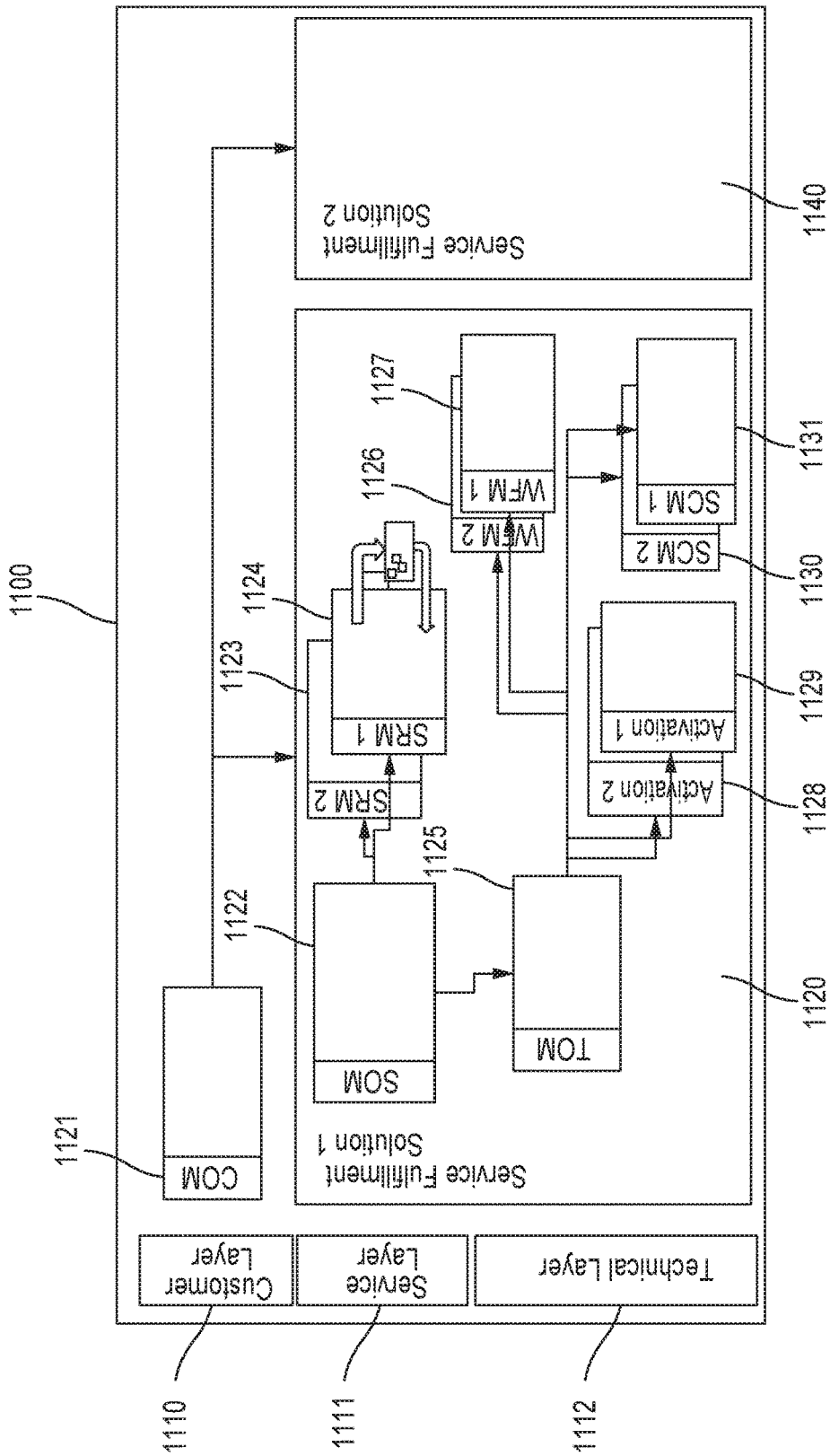
FIG. 11 illustrates an example definition of order layers and topology for a fulfillment solution blueprint, according to an embodiment of the invention.

FIG. 11 illustrates an example definition of order layers and topology for a fulfillment solution blueprint 1100, according to an embodiment of the invention. According to the embodiment, fulfillment solution blueprint 1100 includes customer order layer (i.e., customer layer) 1110, service order layer (i.e., service layer) 1111, and technical order layer (i.e., technical layer) 1112. Customer layer 1110 is similar to customer layer 1010 of FIG. 10, service layer 1111 is similar to service layer 1011 of FIG. 10, and technical layer 1112 is similar to technical layer 1012 of FIG. 10.

According to the embodiment, customer layer 1110 includes COM component 1121. COM component 1121 is similar to COM component 1021 of FIG. 10. Further, according to the topology defined for fulfillment solution blueprint 1100, COM component 1121 can produce an output and can sent the output to either fulfillment solution 1120 or fulfillment solution 1140. Fulfillment solution 1120 and fulfillment solution 1140 are each a collection of provider functions, service design and order fulfillment components, and contract interfaces that collectively comprise a component of an overall fulfillment solution. Further, each provider function, service design and order fulfillment component, and contract interface, can be assigned to either service layer 1111 or technical layer 1112. The specifics of fulfillment solution 1120 are now described in greater detail. The specifics of fulfillment solution 1140 are not described in greater detail, but fulfillment solution 1140 is illustrated in FIG. 11 to highlight that fulfillment solution 1140 is distinct from fulfillment solution 1120, and COM component 1121 can be designed to send an output to either fulfillment solution 1120 or fulfillment solution 1140.

According to the embodiment, fulfillment solution 1120 includes SOM component 1122, SRM components 1123 and 1124, TOM component 1125, WFM components 1126 and 1127, activation components 1128 and 1129, and SCM components 1130 and 1131. SOM component 1122 and SRM components 1123 and 1124 are assigned to service layer 1111. TOM component 1125, WFM components 1126 and 1127, activation components 1128 and 1129, and SCM components 1130 and 1131 are assigned to technical layer 1112. Further, SOM component 1122 is designed to send an output to SRM components 1123 and 1124, and to TOM component 1125. TOM component 1125 is also designed to send an output to WFM components 1126 and 1127, activation components 1128 and 1129, and SCM components 1130 and 1131.

Figure 12:
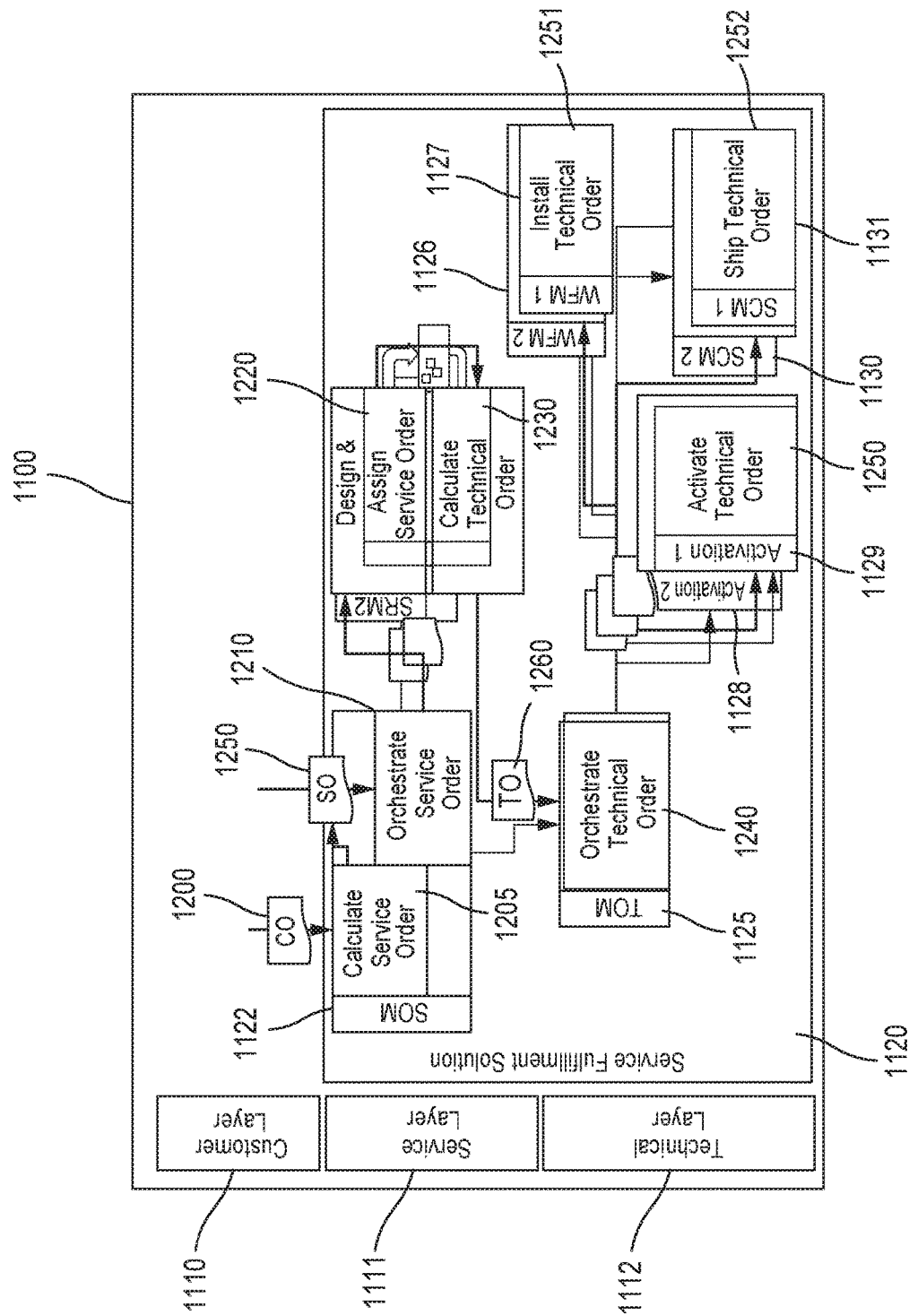
FIG. 12 illustrates an example definition of provider functions and contract interfaces for a fulfillment solution blueprint, according to an embodiment of the invention.

FIG. 12 illustrates an example definition of provider functions and contract interfaces for a fulfillment solution blueprint 1100, according to an embodiment of the invention. According to the embodiment, fulfillment solution 1120 includes a service order calculation provider function 1205 which can optionally pre-process a customer order to derive a service order. Service order calculation provider function 1205 is assigned to service layer 1111, and SOM component 1122 is defined to implement service order calculation provider function 1205. Fulfillment solution 1120 further includes a service order orchestration provider function 1210 which can generate an orchestration plan that fulfills the service order. Service order orchestration provider function 1210 is assigned to service layer 1111, and SOM component 1122 is defined to implement service order orchestration provider function 1210. Fulfillment solution 1120 further includes a service order design and assign provider function 1220, which can receive a service order and generate a service instance (including a configuration of resource-facing services and/or resources) based on the service order, and a technical order calculation provider function 1230, which can generate a technical order based on a change to a configuration of resource-facing services and/or resources. Service order design and assign provider function 1220 and technical order calculation provider function 1230 are assigned to service layer 1111, and SRM components 1123 and 1124 are defined to implement service order design and assign provider function 1220 and technical order calculation provider function 1230. Fulfillment solution 1120 further includes a technical order orchestration provider function 1240, which can receive a technical order and generate an orchestration plan that fulfills the technical order. Technical order orchestration provider function 1240 is assigned to technical layer 1112, and TOM component 1125 is defined to implement technical order orchestration provider function 1240. Fulfillment solution 1120 further includes a technical order activation provider function 1250, which can receive a technical order and translate the technical order into one or more command sequences delivered to one or more infrastructure elements. Technical order activation provider function 1250 is assigned to technical layer 1112, and activation components 1128 and 1128 are defined to implement technical order activation provider function 1250. Fulfillment solution 1120 further includes a technical order installation provider function 1260, which can implement an installation command sequence. Technical order installation provider function 1260 is assigned to technical layer 1112, and WFM components 1126 and 1127 are defined to implement technical order installation provider function 1260. Fulfillment solution 1120 further includes a technical order shipping provider function 1270, which can implement a shipping command sequence. Technical order shipping provider function 1270 is assigned to technical layer 1112, and SCM components 1130 and 1131 are defined to implement technical order shipping provider function 1270.

Also according to the embodiment, fulfillment solution 1120 includes service order 1250 and technical order 1260, where service order 1250 and technical order 1250 are each type of a contract interface. Service order 1250 is assigned to provider functions 1210, where service order 1250 is defined as an input to provider functions 1210. Thus, service order 1250 structures an interaction between customer layer 1110 and service layer 1111. Further, technical order 1260 is assigned to provider functions 1230 and provider functions 1240, where technical order 1260 is defined as an output of provider functions 1230 and defined as an input to provider functions 1240. Thus, technical order 1260 structures an interaction between service layer 1111 and technical layer 1112.

Figure 13:
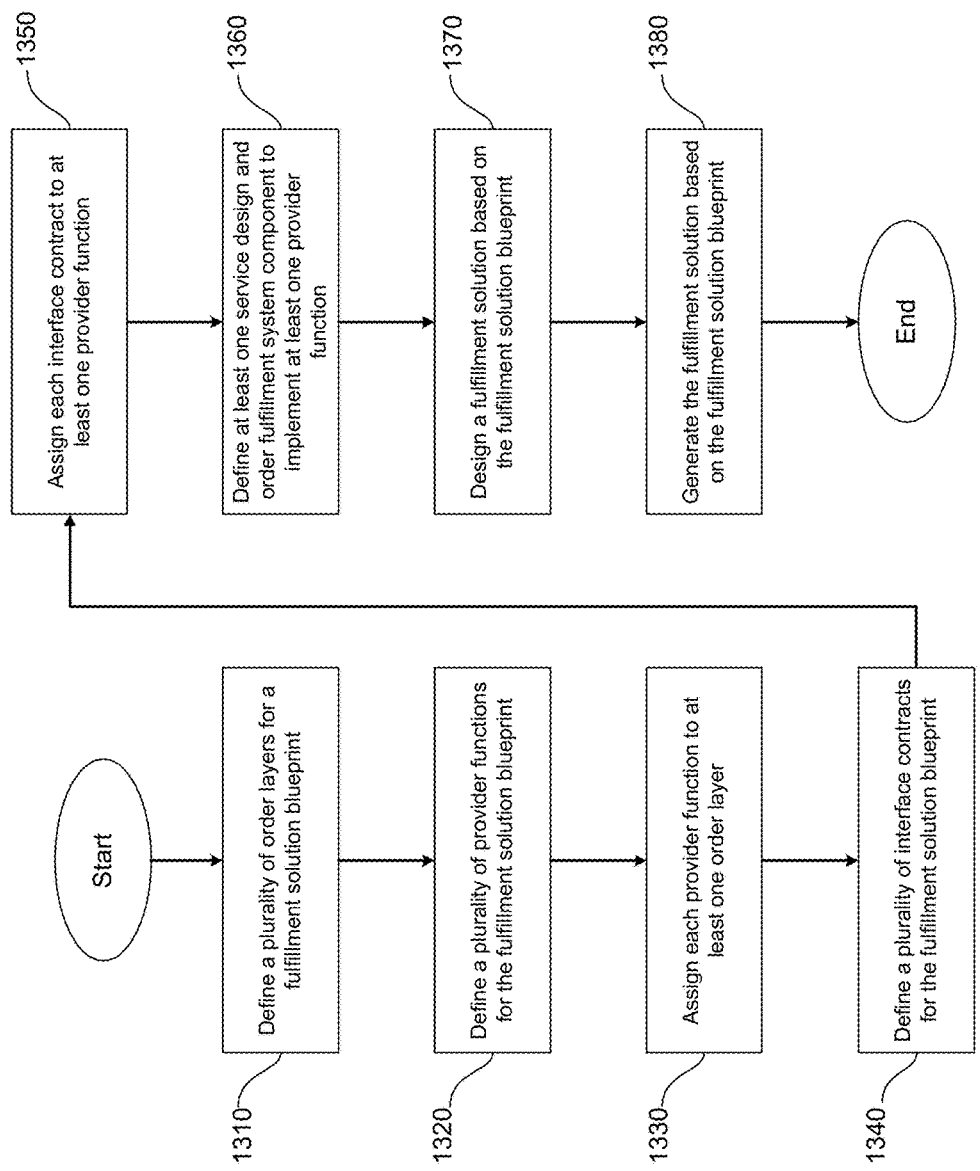
FIG. 13 illustrates another flow diagram of the functionality of a service design and order fulfillment module, according to another embodiment of the invention.

FIG. 13 illustrates another flow diagram of the functionality of a service design and order fulfillment module, according to another embodiment of the invention. The flow begins and proceeds to 1310. At 1310, a plurality of order layers is defined for a fulfillment solution blueprint. Each order layer defines a layer of a fulfillment solution, and the plurality of order layers are ordered within the fulfillment solution blueprint. In certain embodiments, the fulfillment solution blueprint is an organizational schema of the fulfillment solution. Further, in certain embodiments, the fulfillment solution is a metadata-driven executable process that fulfills an order. In some of these embodiments, the order is an order for communication services.

In certain embodiments, in defining a plurality of order layers, a customer order layer can be defined for the fulfillment solution blueprint, where the customer order layer is configured to orchestrate a customer order and to transform the customer order into a service order. A service order layer can also be defined for the fulfillment solution blueprint, where the service order layer is configured to orchestrate the service order and to generate a technical order based on the service order. A technical order layer can also be defined for the fulfillment solution blueprint, where the technical order layer is configured to orchestrate the technical order. The flow then proceeds to 1320.

At 1320, a plurality of provider functions is defined for a fulfillment solution blueprint. Each provider function is a component of the fulfillment solution that is configured to provide a capability, and each provider function is configured to act upon a defined input and generate a defined output. In certain embodiments, each provider function includes one or more items of a technical catalog, where each item defines metadata for the provider function.

In certain embodiments, in defining a plurality of provider functions, a service order calculation provider function can be defined that is configured to transform a customer order into a service order. A service order orchestration provider function can also be defined that is configured to receive a service order and generate an orchestration plan that fulfills the service order. A service order design and assign provider function can also be defined that is configured to receive a service order and generate a service instance (including a configuration of resource-facing services and/or resources) based on the service order. A technical order calculation provider function can also be defined that is configured to generate a technical order based on a configuration of resource-facing services and/or resources. A technical order orchestration provider function can also be defined that is configured to receive a technical order and generate an orchestration plan that fulfills the technical order. A technical order activation provider function can also be defined that is configured to receive a technical order and translate the technical order into one or more command sequences delivered to one or more infrastructure elements. The flow then proceeds to 1330.

At 1330, each provider function is assigned to at least one order layer. Each provider function can define a component of the fulfillment solution. Further, the plurality of provider functions are ordered within the fulfillment solution blueprint. The flow then proceeds to 1340.

At 1340, a plurality of interface contracts is defined for the fulfillment solution blueprint. Each interface contract defines an interaction between two provider functions. Further, each interface contract defines either an input or an output of a provider function. In certain embodiments, in defining a plurality of interface contracts, a customer order can be defined that includes one or more customer order lines, where each customer order line includes a product action and a product offering based on a product specification. A service order can also be defined that includes one or more service order lines, where each service order line includes a service action and a customer-facing service based on a customer-facing service specification. A technical order can also be defined that includes one or more technical order lines, where each technical order line includes a technical action and a resource-facing service based on a resource-facing service specification or a resource based on a resource specification. The flow then proceeds to 1350.

At 1350, each interface contract is assigned to at least one provider function. Each interface contract defines an interaction of the fulfillment solution. Further, the plurality of interface contracts are ordered within the fulfillment solution blueprint. The flow then proceeds to 1360.

At 1360, at least one service design and order fulfillment system component is defined to implement at least one provider function of at least one order layer of the fulfillment solution blueprint. The flow then proceeds to 1370.

At 1370, the fulfillment solution is designed based on the fulfillment solution blueprint. The flow then proceeds to 1380.

At 1380, the fulfillment solution is generated based on the fulfillment solution blueprint. The flow then ends.

Thus, in one embodiment, a service design and order fulfillment system can provide an organizational schema that can be used to design and generate a fulfillment solution, where the organization schema can include a configuration of order layers, provider functions, and interfaces. Such a configuration can support business agility by enabling: (a) end-to-end fulfillment of orders for a wide variety of products and services; (b) comprehensive order lifecycle management, including revision cancellations and fallout management, as well as transparent order and status visibility; and (c) decoupling of various layers of a service design and order fulfillment system, which can localize an impact of business changes and can reduce a scope of both reconfiguration and testing following a change, and which has a positive side effect of reducing an incidence of change-induced order fallout.

According to another embodiment, a service design and order fulfillment system can provide commercial decoupling, where one or more product offerings are separated from fulfillment processes and associated only indirectly with a set of building blocks, such as product specifications. Associating fulfillment logic with product specifications can allow a desirable proliferation of commercial offerings while minimizing changes to a fulfillment process. One of the primary mechanisms of the decoupling is a use of an intermediary service order. Further, a fulfillment solution blueprint can be designed in part to enable commercial decoupling, as well as other types of decoupling.

Figure 14:
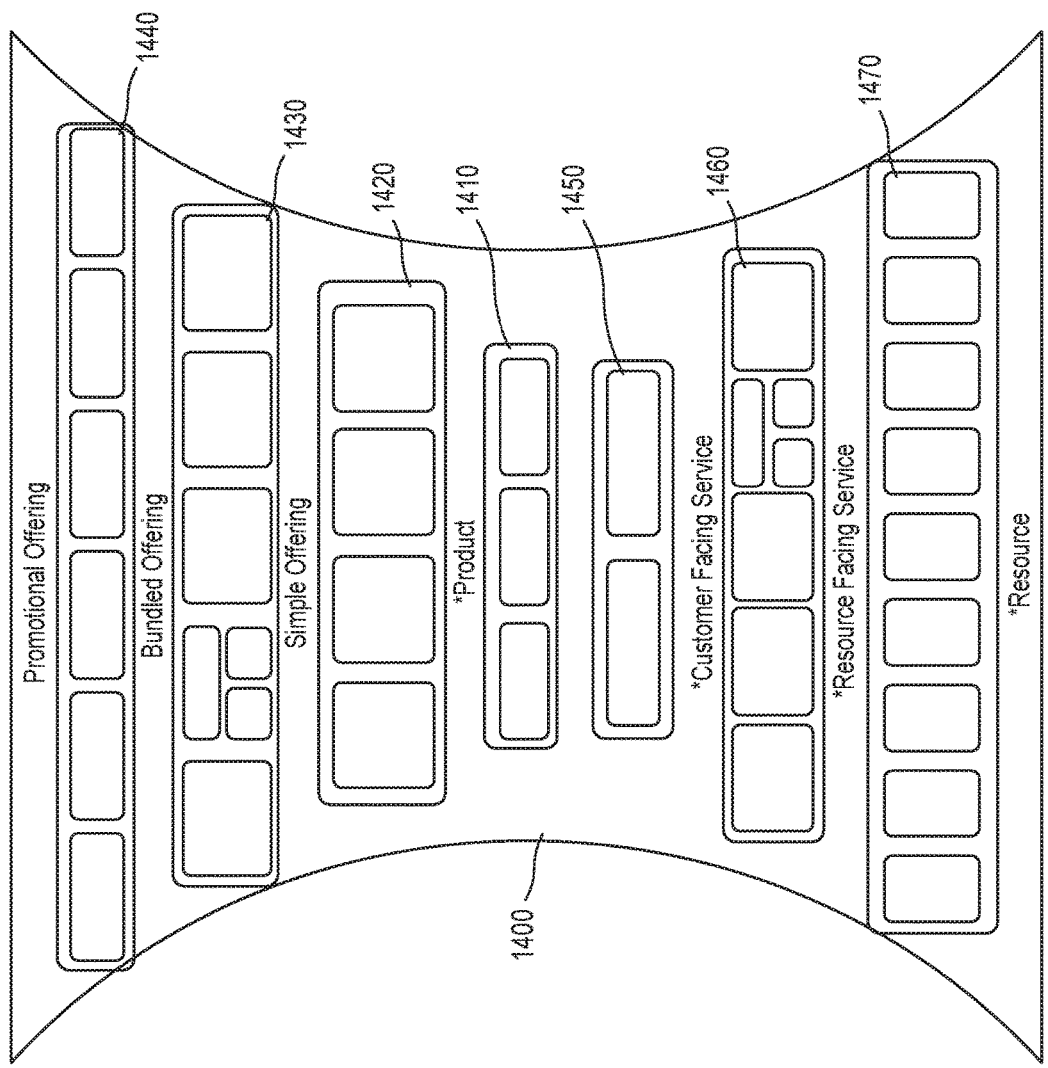
FIG. 14 illustrates a block diagram of an entity hierarchy, according to an embodiment of the invention.

FIG. 14 illustrates a block diagram of an entity hierarchy 1400, according to an embodiment of the invention. Entity hierarchy 1400 can be utilized to effectuate a commercial decoupling, as entity hierarchy 1400 creates separate layers of data, where the data that relates to commercial offerings is decoupled from data that relates to a service or product that is provisioned to a customer. According to an embodiment, a plurality of entities can be defined within entity hierarchy 1400, where each entity includes a distinct subset of data, and where one entity can be mapped to another entity. In certain embodiments, entity hierarchy can be part of a technical catalog.

In the illustrated embodiment of FIG. 14, entity hierarchy 1400 includes a product specification (i.e., product) 1410. As previously described, a product specification is an entity that represents a type of product offering, and can be used to facilitate reuse of attributes and logic associated with one or more product offerings. More specifically, a product specification represents all or a subset of the capabilities of a customer-facing service specification.

Entity hierarchy 1400 also includes a simple offering 1420. As previously described, a simple offering is a commercially viable and commercially indivisible sales catalog item. A simple offering can establish a promise to a customer and can represent a variety of commercial items, such as physical goods, services, service features, discounts, or pricing items. Simple offerings can be made available to sell solo, within a bundled or promotional offering, or both. According to an embodiment, one or more simple offerings can be created based on a product specification.

Entity hierarchy 1400 also includes a bundled offering 1430. As previously described, a bundled offering is an aggregation of one or more simple offerings, other bundled offerings, and or commercialization logic to facilitate selling and contracts. According to an embodiment, one or more bundled offerings can be created based on a simple offering. In certain embodiments, a bundled offering can include other bundled offerings in addition to, or instead of, simple offerings.

Entity hierarchy 1400 also includes a promotional offering 1440. As previously described, a promotional offering is a special type of bundled offering that offers reuse under different commercial and contractual terms. Examples of commercial and contractual terms can include customer segments, time periods, and penalties associated with discontinuing the promotional offering. According to an embodiment, a promotional offering can be created based on one or more simple offerings, one or more bundled offerings, or a combination therein.

Entity hierarchy 1400 also includes customer-facing service specification (i.e., customer-facing service) 1450. As previously described, a "customer-facing service" is a technology-agnostic abstraction of a holistic capability from a perspective of a service provider (as opposed to a perspective of an end user) that facilitates service commercialization, fulfillment and management. A customer-facing service can be realized through one or more technical solutions, where a technical solution is comprised of one or more resources and/or resource-facing services. Thus, a customer-facing service defines the service related features of commercial value that can be made available to a market through one or more product offerings. Thus, a single customer-facing service can be utilized regardless of a number of product offerings (either simple, bundled, or promotional) that the customer-facing service is offered through. As also previously described, a customer-facing service specification is an entity that represents a type of customer-facing service, and can be used to facilitate reuse of attributes and logic associated with one or more customer-facing services.

A customer-facing service specification does not include data that describes a product offering utilized to offer the customer-facing service. Instead, a customer-facing service specification can be mapped to one or more product specifications, where a product offering (either simple, bundled, or commercial) can include the one or more product specifications. In one embodiment, the mapped one or more product offerings, can be defined as a "commercial offering." In one embodiment, a customer-facing service specification can be mapped to one or more commercial offerings, and a commercial offering can be selected to represent the customer-facing service specification at design-time. Thus, a customer-facing service described within a customer-facing service specification can be completely decoupled from the commercial offerings of the customer-facing service described within one or more simple offerings, bundled offerings, or promotional offerings. Further, a customer-facing service specification can also be mapped to one or more resource-facing service specifications, one or more resource specifications, or a combination therein.

Entity hierarchy 1400 also includes resource-facing service specification (i.e., resource-facing service) 1460. As previously described, a resource-facing service is a technology-specific, vendor-agnostic abstraction of a capability from a perspective of a service provider (as opposed to a perspective of an end user). Thus, a resource-facing service represents a meaningful capability associated with one or more resources. A resource-facing service may also combine capabilities from other finer-grained resource-facing services. As also previously described, a resource-facing service specification is an entity that represents a type of resource-facing service, and can be used to facilitate reuse of attributes and logic associated with one or more resource-facing services.

Entity hierarchy 1400 also includes resource specification (i.e., resource) 1470. As previously described, a resource is a part of a provider's infrastructure, CPE utilized directly or indirectly by a service, or a good that may be procured by the market in the form of a product. A resource can be physical and it can be realized through the provider's infrastructure or as a CPE. Alternatively, a resource can be logical and it can be realized directly as a configuration (via software) of physical resources, or it may be used to facilitate the configuration of the network or the interactions with a third-party supplier or partner. As also previously described, a resource specification is an entity that represents a type of resource, and can be used to facilitate reuse of attributes and logic associated with one or more resources. In one embodiment, a resource-facing service specification can be mapped to one or more resource specifications. In an alternate embodiment, a resource-facing service specification can be mapped to other resource-facing service specifications in addition to, or instead of, resource specifications.

Figure 15:
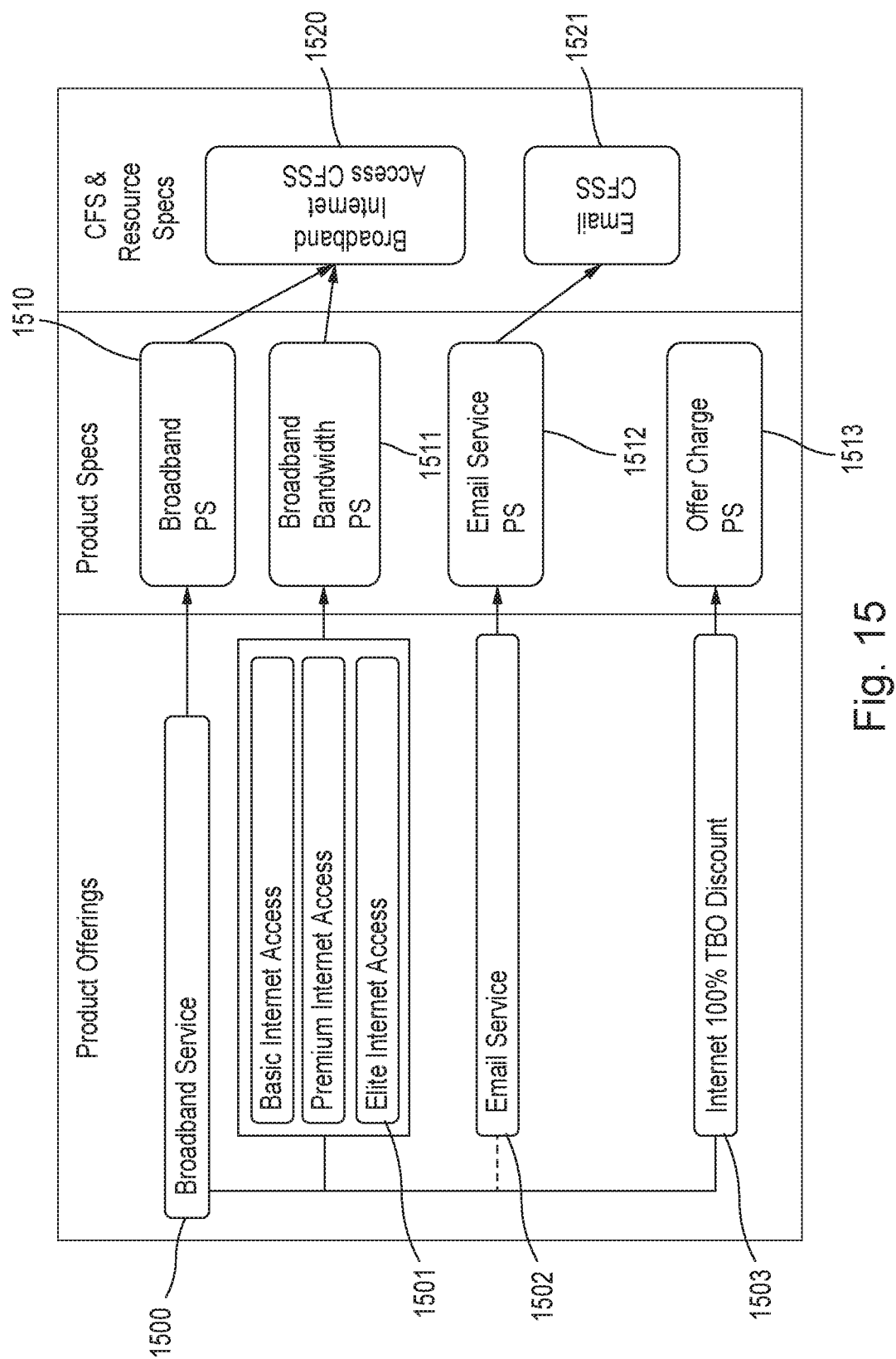
FIG. 15 illustrates an example product offering and an example product specification to customer-facing service specification mapping, according to an embodiment of the invention.

FIG. 15 illustrates an example product offering 1500 and an example product specification to customer-facing service specification mapping, according to an embodiment of the invention. According to the embodiment, product offering 1500 is a bundled offering that includes three simple offerings (i.e., simple offerings 1501, 1502, and 1503), and four product specifications (i.e., product specifications 1510, 1511, 1512, and 1513). Further, product specifications 1510 and 1511 are mapped to customer-facing service specification 1520, and product specification 1512 is mapped to customer-facing service specification 1521. In the illustrated embodiment, product specification 1513 is not mapped to a customer-facing service specification. According to an embodiment, a customer order can be generated, where a first customer order line of the customer order includes a product offering based on product specification 1510, a second customer order line of the customer order includes a product offering based on product specification 1511, a third customer order line of the customer order includes a product offering based on product specification 1512, and a fourth customer order line of the customer order includes a product offering based on product specification 1513. Further, according to the embodiment, as part of the fulfillment of the customer order, a customer order can be transformed into a service order, where a first service order line of the service order includes a customer-facing service based on customer-facing service specification 1520, and a second service order line of the service order includes a customer-facing service based on customer-facing service specification 1521.

Figure 16:
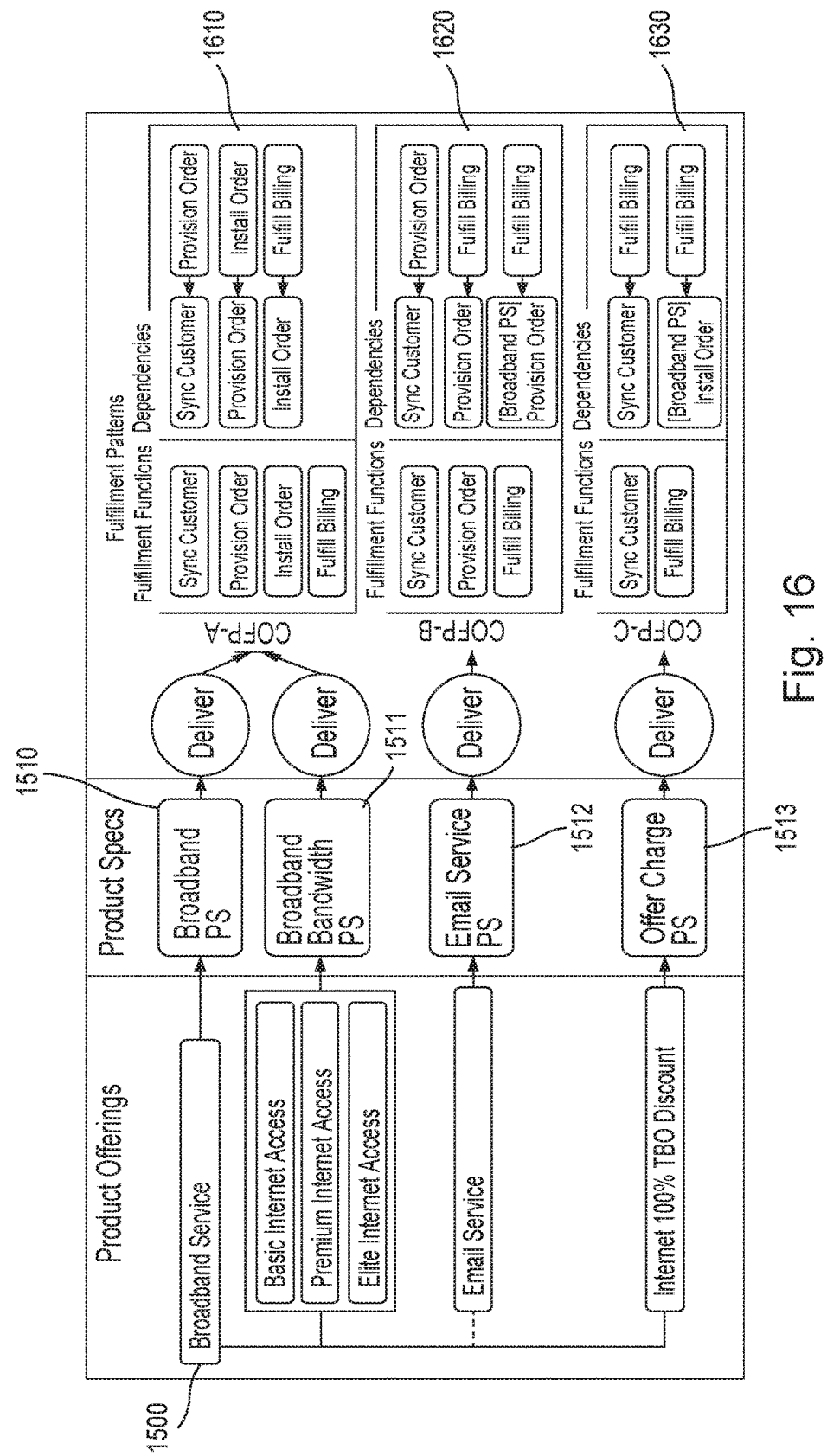
FIG. 16 illustrates an example product specification to fulfillment pattern mapping for an example product offering, according to an embodiment of the invention.

FIG. 16 illustrates an example product specification to fulfillment pattern mapping for product offering 1500, according to an embodiment of the invention. As previously described, a fulfillment pattern includes metadata that defines a set of one or more fulfillment functions and one or more dependencies. According to the embodiment, product specifications 1510 and 1511 are mapped to fulfillment pattern 1610. Product specification 1512 is further mapped to fulfillment pattern 1620, and product specification 1513 is further mapped to fulfillment pattern 1630. Thus, according to the embodiment, product offering 1500 is decoupled from fulfillment patterns 1610, 1620, and 1630. This means that product offering 1500 can be modified without requiring modifications to fulfillment patterns 1610, 1620, or 1630. For example, one or more commercial attributes (such as price) can be modified for product offering 1500 without requiring modifications to fulfillment patterns 1610, 1620, or 1630. Further, one or more new product offerings (either simple, bundled, or promotional) can be created based on one or more of product specifications 1510, 1511, 1512, or 1513 without requiring modifications to fulfillment patterns 1610, 1620, or 1630.

Figure 17:
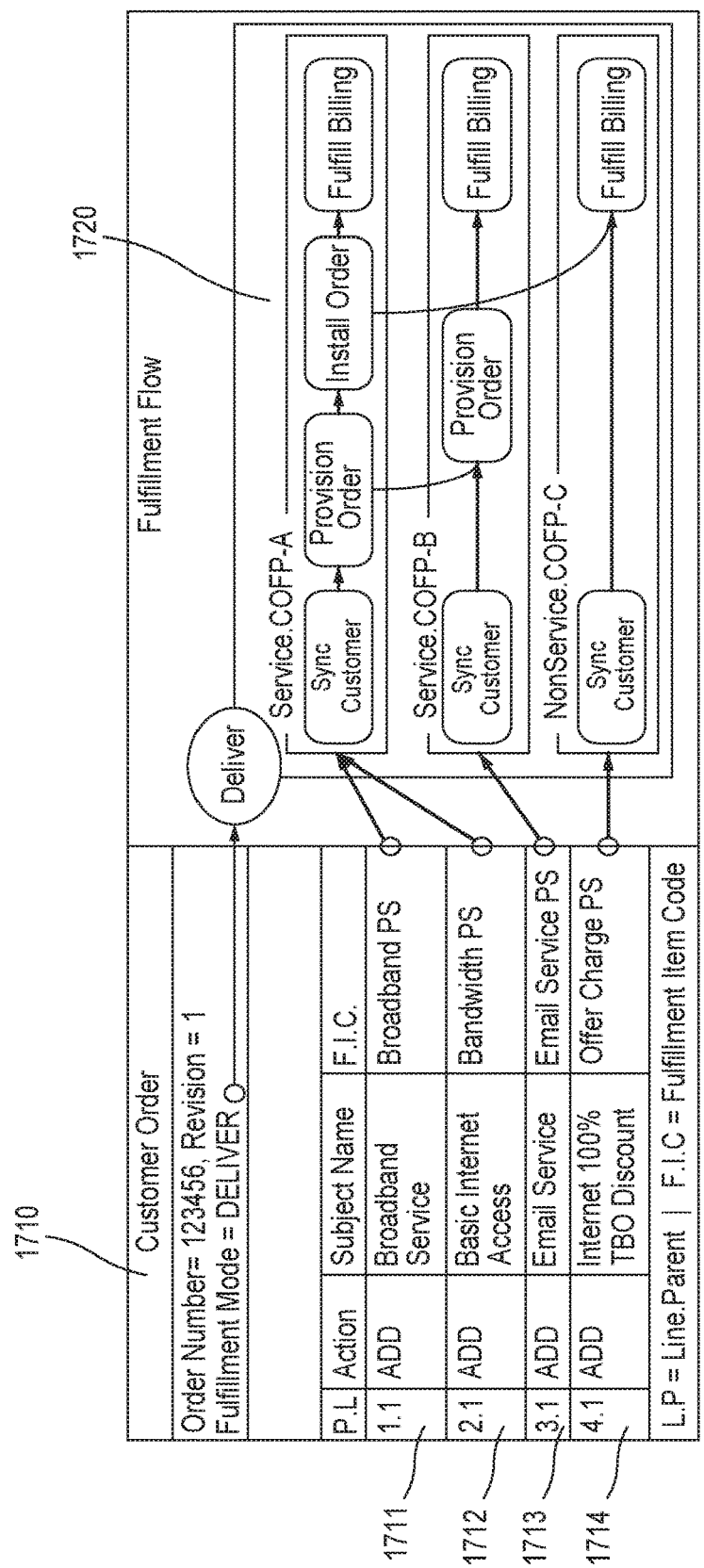
FIG. 17 illustrates an example product specification to fulfillment flow mapping for an example customer order, according to an embodiment of the invention.

FIG. 17 illustrates an example product specification to fulfillment flow mapping for an example customer order 1710, according to an embodiment of the invention. According to the embodiment, customer order 1710 includes customer order line 1711 which includes a product offering based on product specification 1510 of FIG. 15 ("Broadband PS"). Customer order 1710 further includes customer order line 1712 which includes a product offering based on product specification 1511 of FIG. 15 ("Bandwidth PS"). Customer order 1710 further includes customer order line 1713 which includes a product offering based on product specification 1512 of FIG. 15 ("Email Service PS"). Customer order 1710 further includes customer order line 1714 which includes a product offering based on product specification 1513 of FIG. 15 ("Offer Change PS"). Further, customer order lines 1711, 1712, 1713, and 1714 each map to fulfillment flow 1720, where fulfillment flow 1720 is based on fulfillment patterns 1610, 1620, or 1630. According to an embodiment, an orchestration plan can be generated based on fulfillment flow 1720, where the orchestration plan can fulfill customer order 1710. Thus, according to the embodiment, product offering 1500 of FIG. 15 is decoupled from fulfillment flow 1720. This means that product offering 1500 of FIG. 15 can be modified without requiring modifications to fulfillment flow 1720. For example, one or more commercial attributes (such as price) can be modified for product offering 1500 without requiring modifications to fulfillment flow 1720. Further, one or more new product offerings (either simple, bundled, or promotional) can be created based on one or more of product specifications 1510, 1511, 1512, or 1513 of FIG. 15 without requiring modifications to fulfillment flow 1720. According to the embodiment, customer order 1710 can be further orchestrated, fulfilled, transformed, or otherwise processed.

Figure 18:
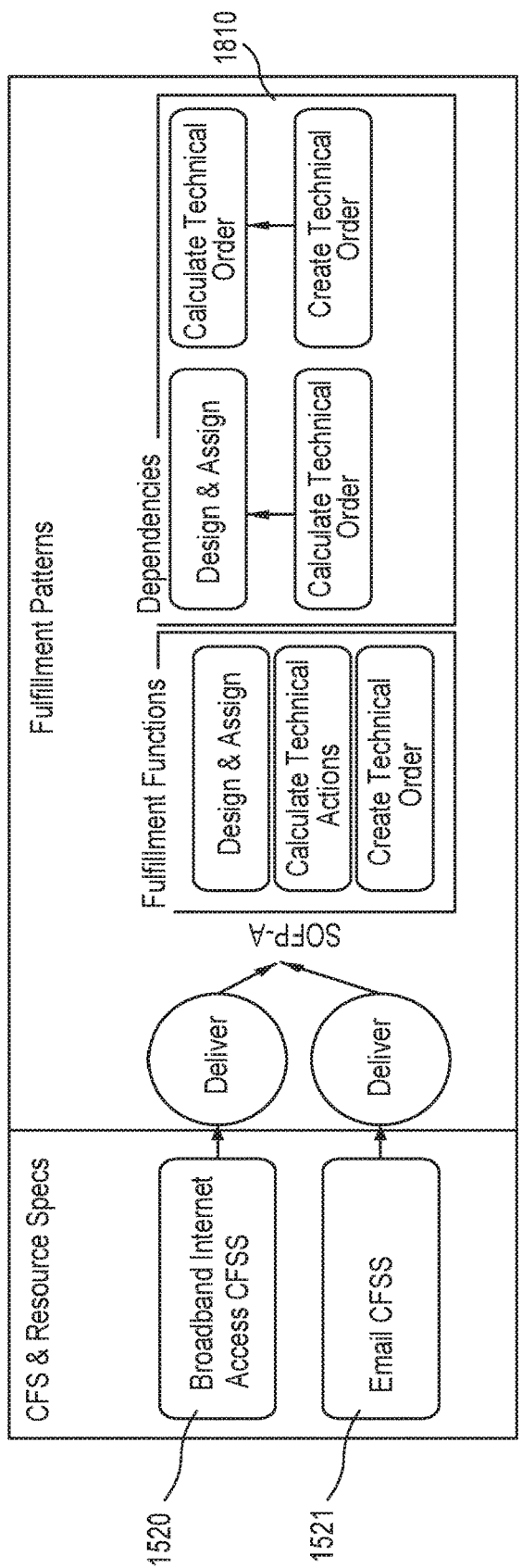
FIG. 18 illustrates an example customer-facing service specification to fulfillment pattern mapping, according to an embodiment of the invention.

FIG. 18 illustrates an example customer-facing service specification to fulfillment pattern mapping, according to an embodiment of the invention. According to the embodiment, customer-facing service specifications 1520 and 1521 are mapped to fulfillment pattern 1810. Thus, according to the embodiment, product offering 1500 of FIG. 5 is decoupled from fulfillment pattern 1810. This means that product offering 1500 of FIG. 15 can be modified without requiring modifications to fulfillment pattern 1810. For example, one or more commercial attributes (such as price) can be modified for product offering 1500 without requiring modifications to fulfillment pattern 1810. Further, one or more new product offerings (either simple, bundled, or promotional) can be created based on one or more of customer-facing service specifications 1520 and 1521 without requiring modifications to fulfillment pattern 1810.

Figure 19:
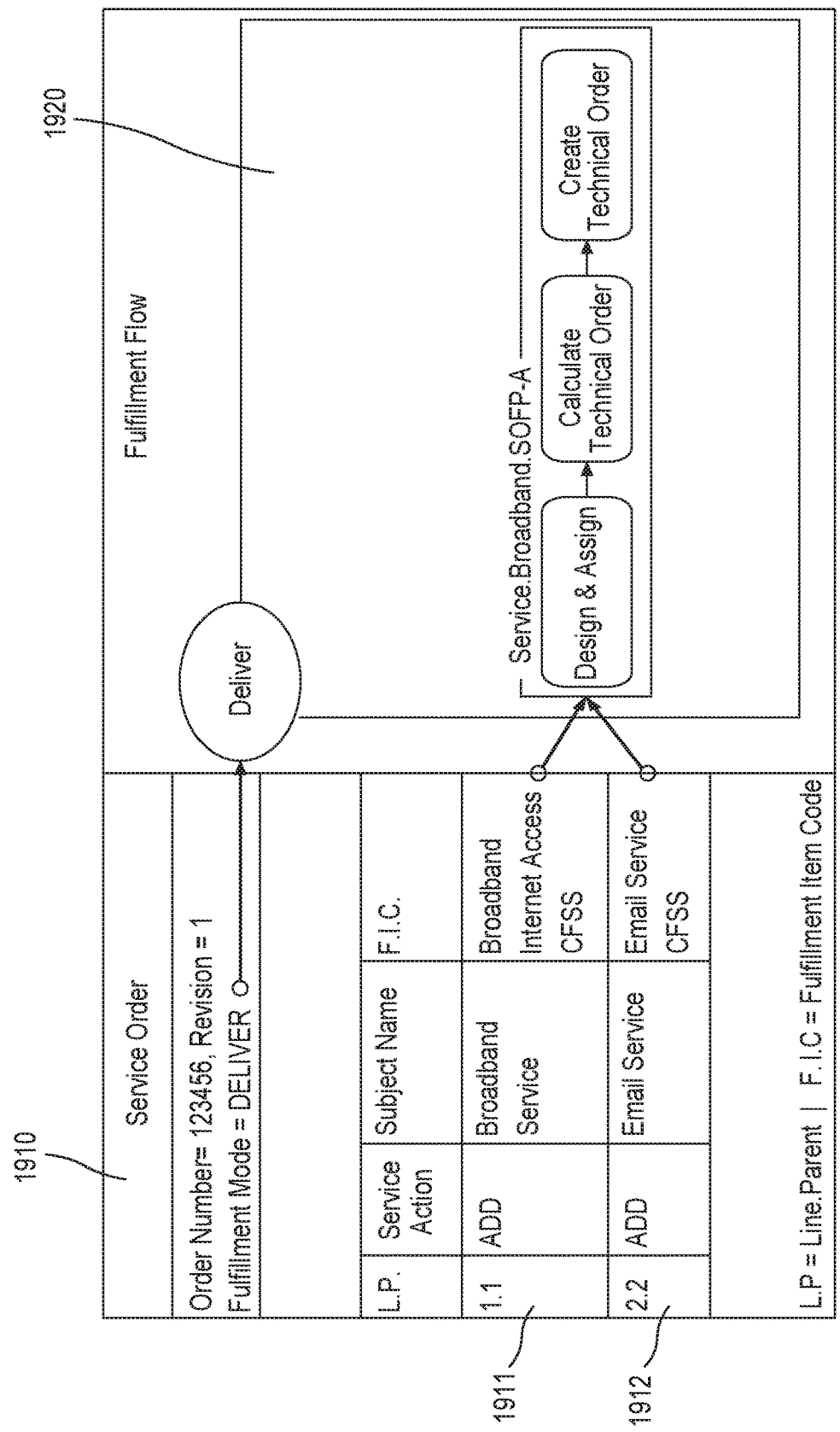
FIG. 19 illustrates an example customer-facing service specification to fulfillment flow mapping for an example service order, according to an embodiment of the invention.

FIG. 19 illustrates an example customer-facing service specification to fulfillment flow mapping for an example service order 1910, according to an embodiment of the invention. According to the embodiment, service order 1910 includes service order line 1911 which includes a customer-facing service based on customer-facing service specification 1520 of FIG. 15 ("Broadband Internet Access CFSS"). Service order 1910 further includes service order line 1912 which includes a customer-facing service based on customer-facing service specification 1521 of FIG. 15 ("Email Service CFSS"). Further, service order lines 1911 and 1912 each map to fulfillment flow 1920, where fulfillment flow 1920 is based on fulfillment pattern 1810 of FIG. 18. According to an embodiment, an orchestration plan can be generated based on fulfillment flow 1920, where the orchestration plan can fulfill service order 1910. Thus, according to the embodiment, product offering 1500 of FIG. 15 is decoupled from fulfillment flow 1920. This means that product offering 1500 of FIG. 15 can be modified without requiring modifications to fulfillment flow 1920. For example, one or more commercial attributes (such as price) can be modified for product offering 1500 without requiring modifications to fulfillment flow 1920. Further, one or more new product offerings (either simple, bundled, or promotional) can be created based on one or more of customer-facing service specifications 1520 and 1521 of FIG. 15 without requiring modifications to fulfillment flow 1920. According to the embodiment, service order 1910 can be further orchestrated, fulfilled, transformed, or otherwise processed.

Figure 20:
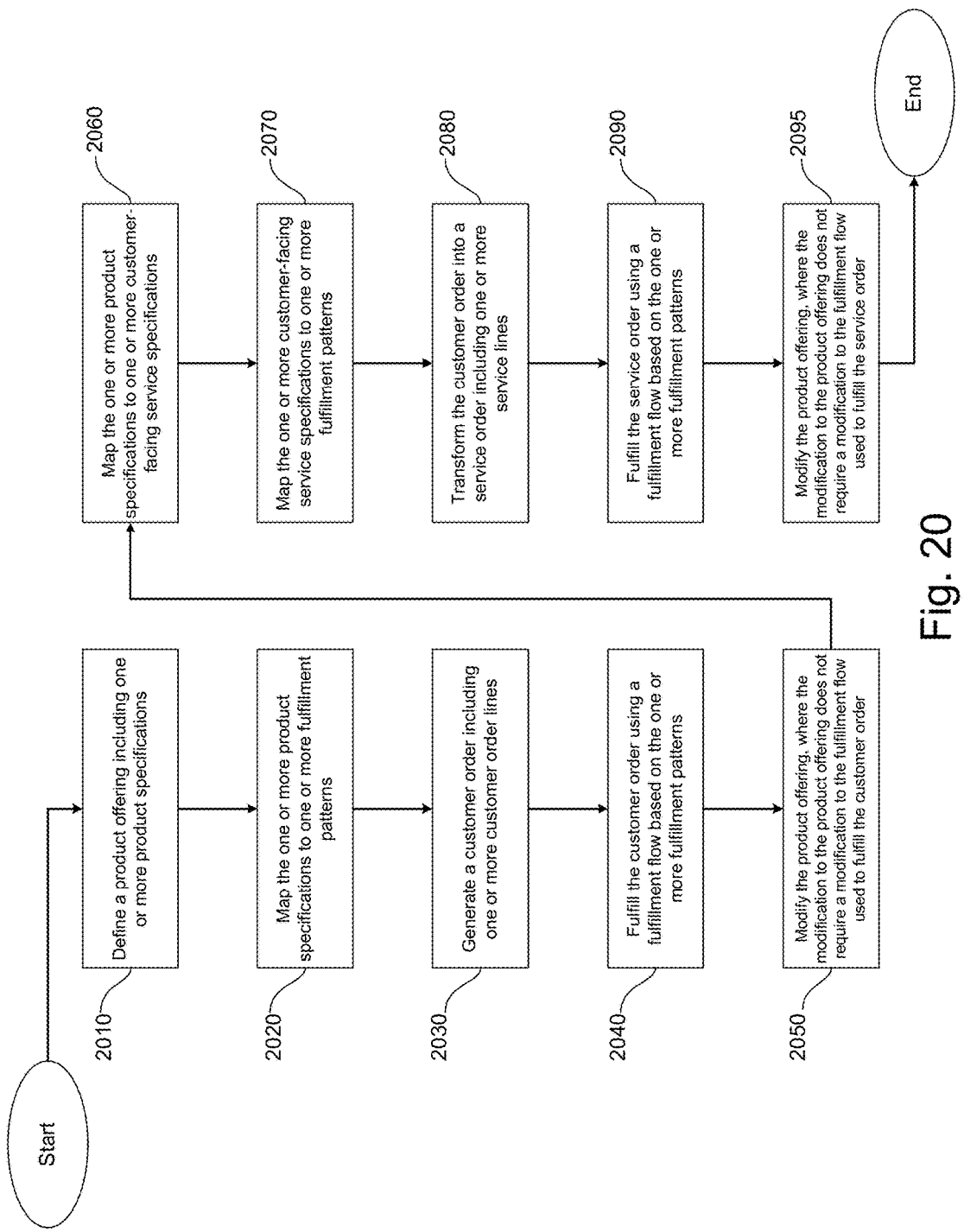
FIG. 20 illustrates another flow diagram of the functionality of a service design and order fulfillment module, according to another embodiment of the invention.

FIG. 20 illustrates another flow diagram of the functionality of a service design and order fulfillment module, according to another embodiment of the invention. The flow begins, and proceeds to 2010. At 2010, a product offering is defined that includes one or more product specifications. Each product specification includes metadata that defines a product that is provided. The product offering further includes metadata that defines one or more commercial attributes. In certain embodiments, the product offering is one of: a simple offering, a bundled offering, or a promotional offering. The flow then proceeds to 2020.

At 2020, the one or more product specifications are mapped to one or more fulfillment patterns. Each fulfillment pattern includes metadata that defines a set of one or more fulfillment functions and one or more dependencies. The flow then proceeds to 2030.

At 2030, a customer order is generated that includes one or more customer order lines. Each customer order line includes a product action and a product offering that is based on a product specification. In certain embodiments, the customer order is an order for communication services. The flow then proceeds to 2040.

At 2040, the customer order is fulfilled using a fulfillment flow based on the one or more fulfillment patterns mapped to the one or more product specifications. In certain embodiments, the fulfillment of the customer order can include generating an orchestration plan based on the fulfillment flow, and executing the orchestration plan. The flow then proceeds to 2050.

At 2050, the product offering is modified, where the modification to the product offering does not require a modification to the fulfillment flow used to fulfill the customer order. In certain embodiments, the product offering is modified by modifying the one or more commercial attributes of the product offering. In other embodiments, the product offering is modified by creating a new product offering based on at least one of the one or more product specifications. In other embodiments, the product offering is modified by creating a new product offering based on one or more existing product offerings. The flow then proceeds to 2060.

At 2060, the one or more product specifications are mapped to one or more customer-facing service specifications. Each customer-facing service specification includes metadata that defines a customer-facing service that is provided. In certain embodiments, the product offering, the one or more product specifications, and the one or more customer-facing service specifications are each part of an entity hierarchy stored within an enterprise catalog, where the product offering is stored in a commercial catalog, and the one or more product specifications, as well as the one or more customer-facing service specifications, are stored within a technical catalog. The flow then proceeds to 2070.

At 2070, the one or more customer-facing service specifications are mapped to one or more fulfillment patterns. The flow then proceeds to 2080.

At 2080, the customer order is transformed into a service order including one or more service order lines. Each service order line includes a service action and a customer-facing service based on a customer-facing service specification. The flow then proceeds to 2090.

At 2090, the service order is fulfilled using a fulfillment flow based on the one or more fulfillment patterns mapped to the one or more customer-facing service specifications. In certain embodiments, the fulfillment of the customer order can include generating an orchestration plan based on the fulfillment flow, and executing the orchestration plan. The flow then proceeds to 2095.

At 2095, the product offering is modified, where the modification to the product offering does not require a modification to the fulfillment flow used to fulfill the service order. In certain embodiments, the product offering is modified by modifying the one or more commercial attributes of the product offering. In other embodiments, the product offering is modified by creating a new product offering based on at least one of the one or more product specifications. In other embodiments, the product offering is modified by creating a new product offering based on the product offering. The flow then ends.

Thus, in one embodiment, a service design and order fulfillment system can effectively decouple a product offering metadata entity from a fulfillment flow used to fulfill both a customer order and a service order. An introduction of product offerings within a sales catalog could be done without needing to make any changes in order management or within an OSS component. This could allow service providers the agility to respond to market conditions in a single day as opposed to lengthy cycles that extend to weeks and months otherwise.

According to another embodiment, a service design and order fulfillment system can provide a format and semantic definition of a service order, where the service order is a primary request interface into a fulfillment solution for a wide variety of communications/information services. The interface is defined around a customer-facing service, which can provide decoupling between commercial offers and the underpinning technology implementations. A service order can be defined in terms of a specific kind of action. Further, a service order calculation provider function can generate this type of order.

As previously described, order fulfillment can utilize multiple order subject transformations via a set of one or more order layers. A first order layer can be a customer order layer (i.e., customer layer). A second order layer can be a service order layer (i.e., a service layer). A third order layer can be a technical order layer (also identified as a technical layer). Each order layer can define a layer of an overall fulfillment solution, and each order layer can be configured to orchestrate a type of order among multiple provider functions, fulfillment system types, and fulfillment providers.

More specifically, a customer layer can be configured to orchestrate a customer order, and to transform a customer order into a service order. A customer order can include one or more customer order lines. Each customer order line can include a product action on a product offering based on a product specification, where the product offering is a representation of a sales catalog item along with one or more commercial attributes. Further, a service order can include one or more service order lines. Each service order line can include a service action on a customer-facing service based on a product specification, where the customer-facing service is a technology-agnostic abstraction of a holistic capability from a perspective of a service provider that facilitates service commercialization, fulfillment and management.

Thus, a service order can be considered a technology-agnostic representation of a customer order. More specifically, a service order is a way to represent a customer order in a technology-agnostic manner that is eventually represented as a technical order for fulfillment. This is because the service order is not required to include any technical attributes. Instead, the technical attributes can be included within a technical order, and a technical order can be generated that is based on the service order. Thus, the service order can be used to shield the customer layer from any technical changes. In other words, an output of the customer layer (i.e., a service order) does not need to be modified in light of any technical changes within a technical layer. Similarly, the service order can also be used to shield the technical layer from any commercial changes. In other words, an input of the technical layer (i.e., a service order) does not need to be modified in light of any commercial changes within a customer layer. Thus, a service order can be defined as a canonical representation of an action taken upon a customer-facing service, independent of commercial variations and independent of technical variations. This allows a service layer to abstract a customer layer from a technical layer. A service order is further described in greater detail below.

Further, a service layer can be configured to orchestrate a service order, and to generate a technical order. A technical order can include one or more technical order lines. Each technical order line can include a technical action on a resource-facing service based on a resource-facing service specification, or a technical action on a resource based on a resource specification. A resource-facing service is a technology-specific, vendor-agnostic abstraction of a capability from a perspective of a service provider, and a resource is a part of a provider's infrastructure, a CPE that is utilized directly or indirectly by a service, or a good that may be procured by the market in the form of a product. Furthermore, a technical layer can be configured to orchestrate a technical order.

Figure 21:
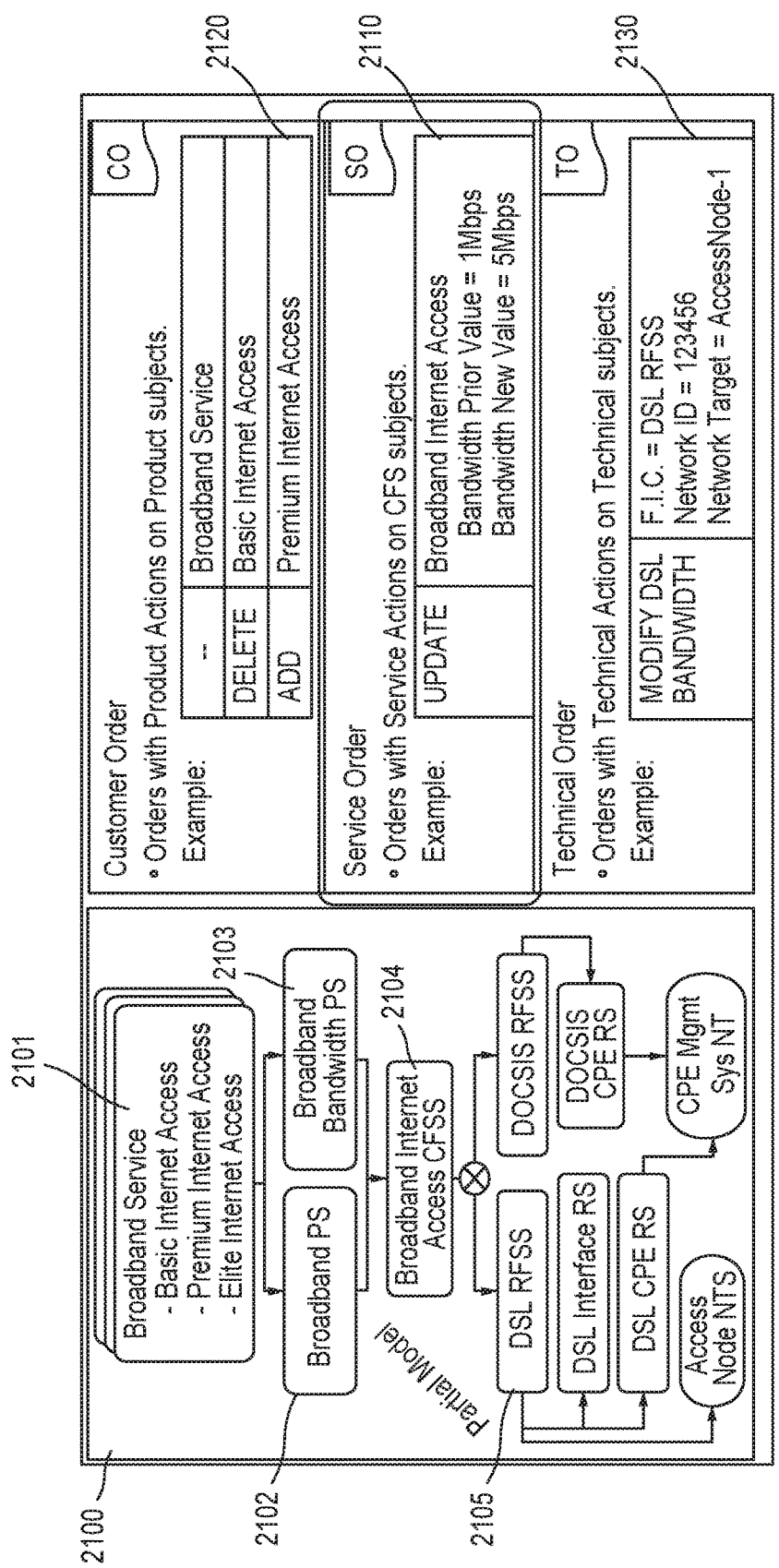
FIG. 21 illustrates examples of service order, a customer order, and a technical order, according to an embodiment of the invention.

FIG. 21 illustrates an example service order 2110, an example customer order 2120, and an example technical order 2130, according to an embodiment of the invention. According to the illustrated embodiment, an entity model 2100 includes a broadband service product offering 2101, where broadband service product offering is mapped to two product specifications: a broadband product specification 2102 and a broadband bandwidth product specification 2103. Further, broadband product specification 2102 and broadband bandwidth product specification 2103 are both mapped to a broadband internet access customer-facing service specification 2104. Even further, broadband internet access customer-facing service specification 2104 is mapped to a number of resources and resource-facing service specifications, which includes DSL resource-facing service specification 2105.

According to the embodiment, service order 2110 is a canonical representation of a service action taken on a customer-facing service subject. In the illustrated embodiment, service order 2110 includes an "UPDATE" service action on broadband internet access customer-facing service specification 2104. The UPDATE service action modifies a bandwidth value of broadband internet access customer-facing service specification 2104. In the illustrated embodiment, the UPDATE service action modifies a bandwidth value of broadband internet access customer-facing service specification 2104 from a prior value of "1 Mbps" to a new value of "5 Mbps."

In one embodiment, service order 2110 is a result of a transformation of customer order 2120. Customer order 2120 is a canonical representation of product action on a product subject. In the illustrated embodiment, customer order 2120 includes a "DELETE" product action on broadband service product offering 2101 (i.e., delete "Basic Internet Access" from the broadband service product), and also includes an "ADD" product action on broadband service product offering 2101 (i.e., add "Premium Internet access" to the broadband service product). Thus, the UPDATE service action on broadband internet access customer-facing service specification 2104 is a technology-agnostic representation of both the DELETE product action and the ADD product action on broadband service product offering 2101. In other words, in order to delete "Basic Internet Access" from the broadband service product and add "Premium Internet Access" to the broadband service product, a service design and order fulfillment system updates a broadband internet access customer-facing service by modifying a bandwidth value of the broadband internet access customer-facing service from a prior value of "1 Mbps" to a new value of "5 Mbps." Further, even if the change of bandwidth is represented differently on customer order 2120, such as a change to an attribute, service order 2110 would still include the UPDATE service action on broadband internet access customer-facing service specification 2104. Thus, service order 2110 is a technology-agnostic representation of customer order 2120.

Further, in one embodiment, technical order 2130 can be generated based on service order 2110. Technical order 2130 is a canonical representation of a technical action taken on a technical subject (i.e., a resource-facing service subject or a resource subject). In the illustrated embodiment, technical order 2130 includes a "MODIFY DSL BANDWIDTH" technical action on DSL resource-facing service specification 2105. Thus, the MODIFY DSL BANDWIDTH technical action on DSL resource-facing service specification 2105 is a technology-specific representation of the UPDATE service action on broadband internet access customer-facing service specification 2104. In other words, in order to updates a broadband internet access customer-facing service, a service design and order fulfillment system modifies a bandwidth value of the DSL resource-facing service. Technical order 2130 is one of many possible technical orders that vary by technology (e.g., DSL, DOCSIS, fiber, LTE), and by context (such as whether a customer is a residential customer or a business customer). The logic used to create an appropriate technical order can dependent on a stable service order input and takes into consideration a state of inventory, infrastructure, and other context. This way, a single service order can result in different technical orders if executed for different contexts. Thus, technical order 2130 is a technology-specific representation of service order 2110.

FIG. 22 illustrates an example of a plurality of service order lines of service order 2200, according to an embodiment of the invention. Service order 2200 includes service order line 2210 and service order line 2220. Service order line 2210 includes a service action "ADD," a subject name "Broadband Service", a fulfillment item code that references a broadband internet access customer-facing service specification, a commercial inventory identity "AI-123456-1.1," and a set of attributes (i.e., Technology=Default; Download Speed=3096; Upload Speed=1024; QoS=Data). Thus, service order line 2210 performs an ADD service action on a broadband internet access customer-facing service that is based on a broadband internet access customer-facing service specification. Service order line 2220 includes a service action "ADD," a subject name "Email Service," a fulfillment item code that references an email service customer-facing service specification, a commercial inventory identity "AI-123456-3.1," and a set of attributes (i.e., Admin Account=admin; Max Number of Accounts=5). Thus, service order line 2220 performs an ADD service action on an email service customer-facing service that is based on an email service customer-facing service specification.

Figure 23:
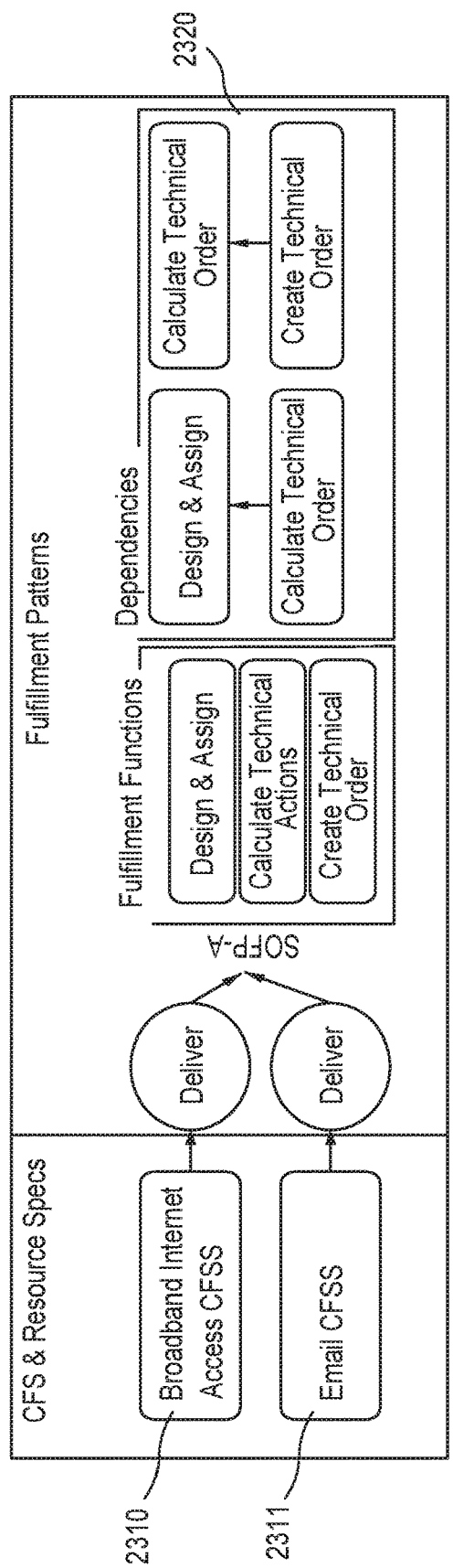
FIG. 23 illustrates an example customer-facing service specification to fulfillment pattern mapping, where each customer-facing service specification is part of a service order line of a service order, according to an embodiment of the invention.

FIG. 23 illustrates an example customer-facing service specification to fulfillment pattern mapping, where each customer-facing service specification is part of a service order line of a service order, according to an embodiment of the invention. According to the embodiment, customer-facing service specifications 2310 and 2311 are mapped to fulfillment pattern 2320. Thus, according to the embodiment, fulfillment pattern 2320 can be used to generate a fulfillment flow that can be used to fulfill a service order that includes customer-facing service specification 2310, customer-facing service specification 2311, or a combination therein.

Figure 24:
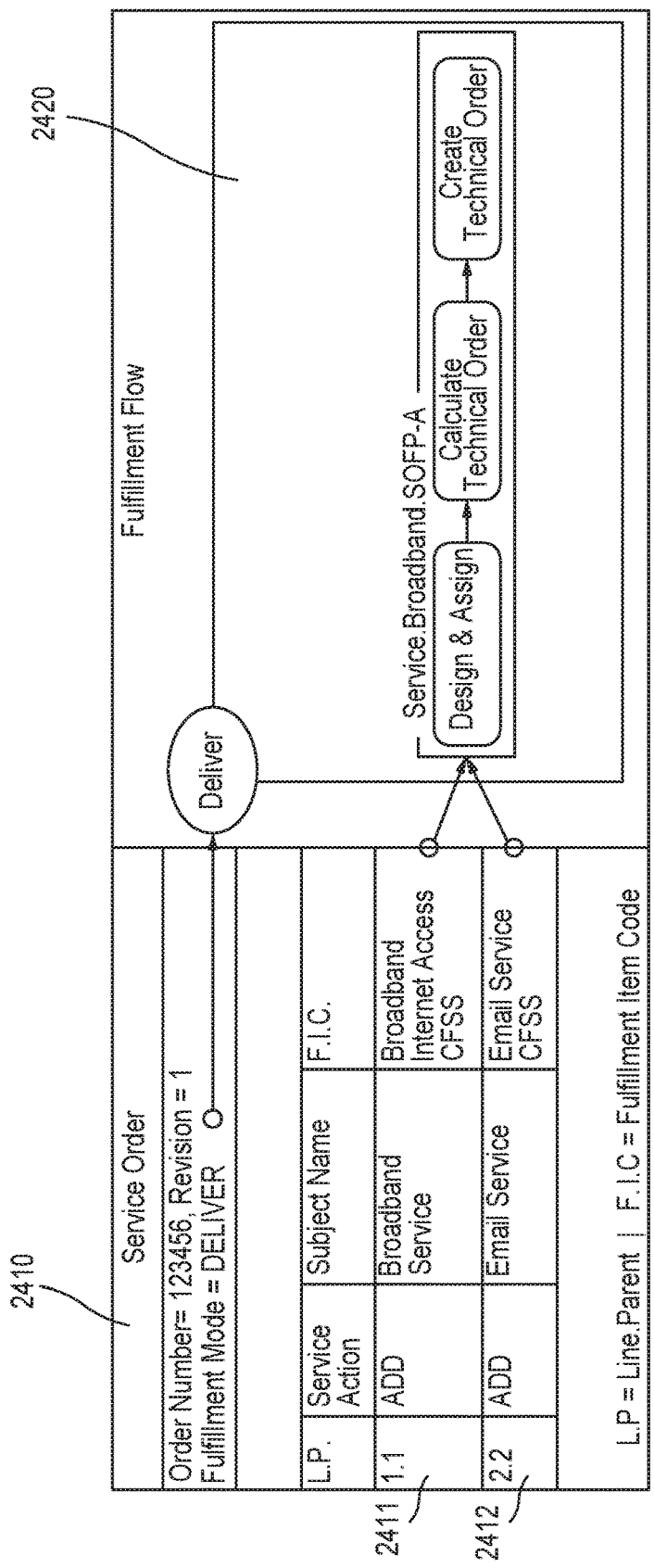
FIG. 24 illustrates an example service order mapped to an example fulfillment pattern, according to an embodiment of the invention.

FIG. 24 illustrates an example service order 2410 mapped to an example fulfillment flow 2420, according to an embodiment of the invention. According to the embodiment, service order 2410 includes service order line 2411 which includes a customer-facing service based on customer-facing service specification 1520 of FIG. 15 ("Broadband Internet Access CFSS"). Service order 2410 further includes service order line 2412 which includes a customer-facing service based on customer-facing service specification 1521 of FIG. 15 ("Email Service CFSS"). Further, service order lines 2411 and 2412 each map to fulfillment flow 2420, where fulfillment flow 2420 is based on fulfillment pattern 2320 of FIG. 23. According to an embodiment, an orchestration plan can be generated based on fulfillment flow 2420, where the orchestration plan can fulfill service order 2410. According to the embodiment, service order 2410 can be further orchestrated, fulfilled, transformed, or otherwise processed. Further, a design and assign provider function can receive service order 2410 and generate one or more service instances based on service order 2410. This can be done by determining a future infrastructure state that meets the constraints of service order 2410, and then determining and executing an orchestration plan to realize the future state.

Figure 25:
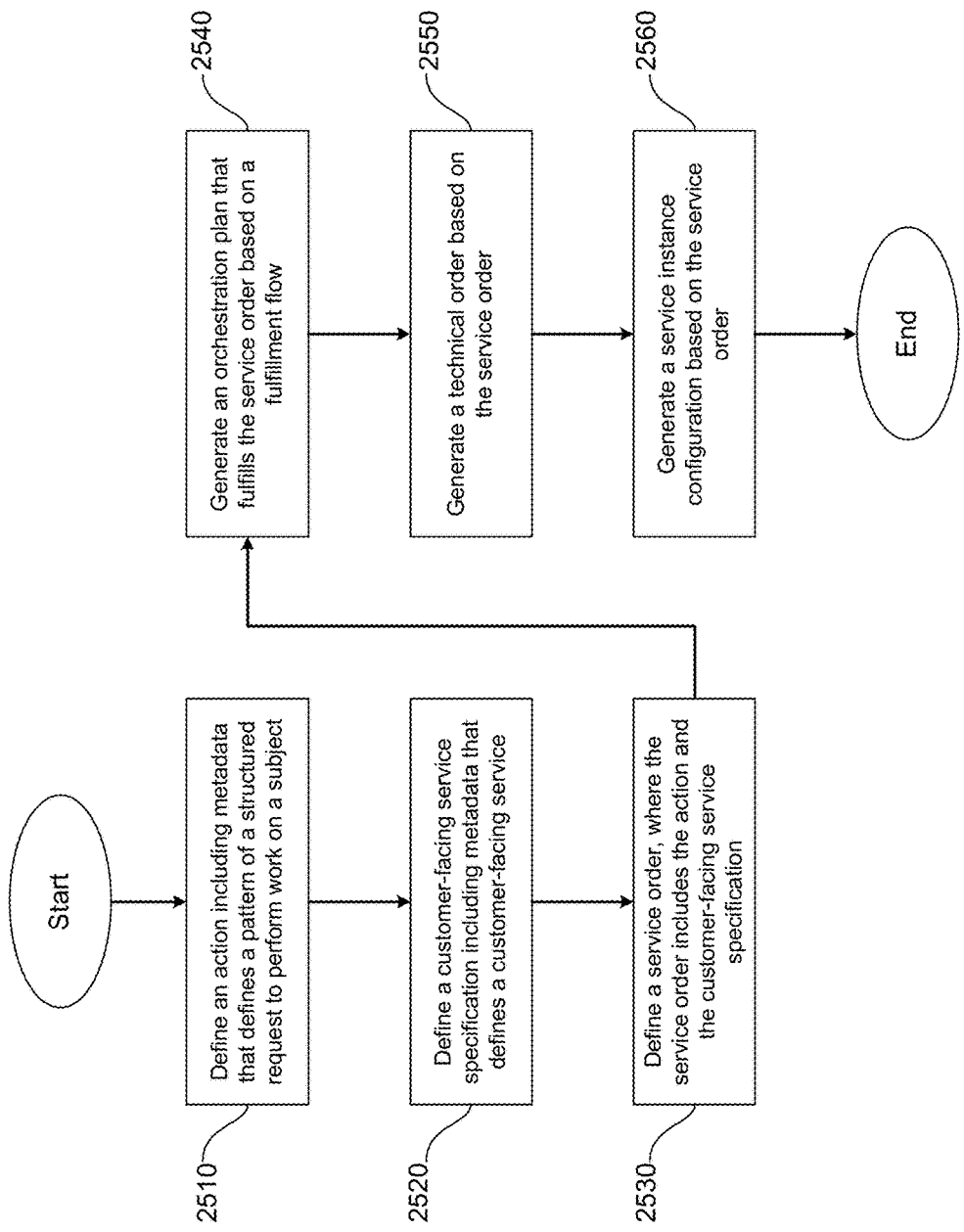
FIG. 25 illustrates another flow diagram of the functionality of a service design and order fulfillment module, according to another embodiment of the invention.

FIG. 25 illustrates another flow diagram of the functionality of a service design and order fulfillment module, according to another embodiment of the invention. The flow begins and proceeds to 2510. At 2510, a service action is defined that includes metadata that defines a pattern of a structured request to perform work on a customer-facing service that is based on a customer-facing service specification. The flow then proceeds to 2520.

At 2520, a customer-facing service specification is defined that includes metadata that defines a customer-facing service that is provided. According to the embodiment, a customer-facing service includes a technology-agnostic abstraction of a holistic capability. The flow then proceeds to 2530.

At 2530, a service order is defined, where the service order includes one or more service order lines, and where each service order line includes a service action and a customer-facing service based on a customer-facing service specification. In certain embodiments, each service order line of the service order is also defined. Also, in certain embodiments, the service order is an order for communication services.

In some embodiments, the service order is transformed from a customer order, where the customer order includes a product action and a product offering, and where the product offering is the subject of the product action. In some of these embodiments, the product offering can include one or more product specifications. In some of these embodiments, the service order is a technology-agnostic representation of the customer order. Further, in some of these embodiments, the service action of the service order is a technology-agnostic representation of one or more customer order lines of the customer order. The flow then proceeds to 2540.

At 2540, an orchestration plan is generated that fulfills the service order based on a fulfillment flow. In some of these embodiments, the fulfillment flow includes one or more fulfillment patterns that are mapped to the customer-facing service specification. The flow then proceeds to 2550.

At 2550, a technical order is generated based on the service order, where the technical order includes a technical action and one of: a resource-facing service specification, or a resource specification. The flow then proceeds to 2560.

At 2560, a service instance configuration is generated based on the service order. The flow then ends.

Thus, in one embodiment, a service design and order fulfillment system can provide a service order, where a service order includes an action that is taken on a customer-facing service. Thus, an introduction of a newer technology to replace legacy technology (such as a 4G network to replace a 3G network) requires only additional design and assign functionality to translate from an existing customer-facing service to a technical service defined for the newer technology. This means that the introduction of newer technology does not require any changes in a mapping from a product specification to a customer-facing service specification. Because no changes to the customer-facing service are required, design and assign functionality can be based on a small set of durable service actions and customer-facing services. This can localize changes to the fewest layers of a fulfillment solution, reduce a number of mappings and a volume of logic, and keep mapping and logic simpler and hence more manageable. This can lead to a faster time to market.

According to another embodiment, a service design and order fulfillment system can provide a fulfillment action (i.e., action), where an action is defined as format and method for expressing requests between components of the service design and order fulfillment system, using a standardized pattern adaptable to various contexts within a fulfillment solution. One or more actions can be a basis of defining orders, such as a customer order, a service order, or a technical order.

Figure 26:
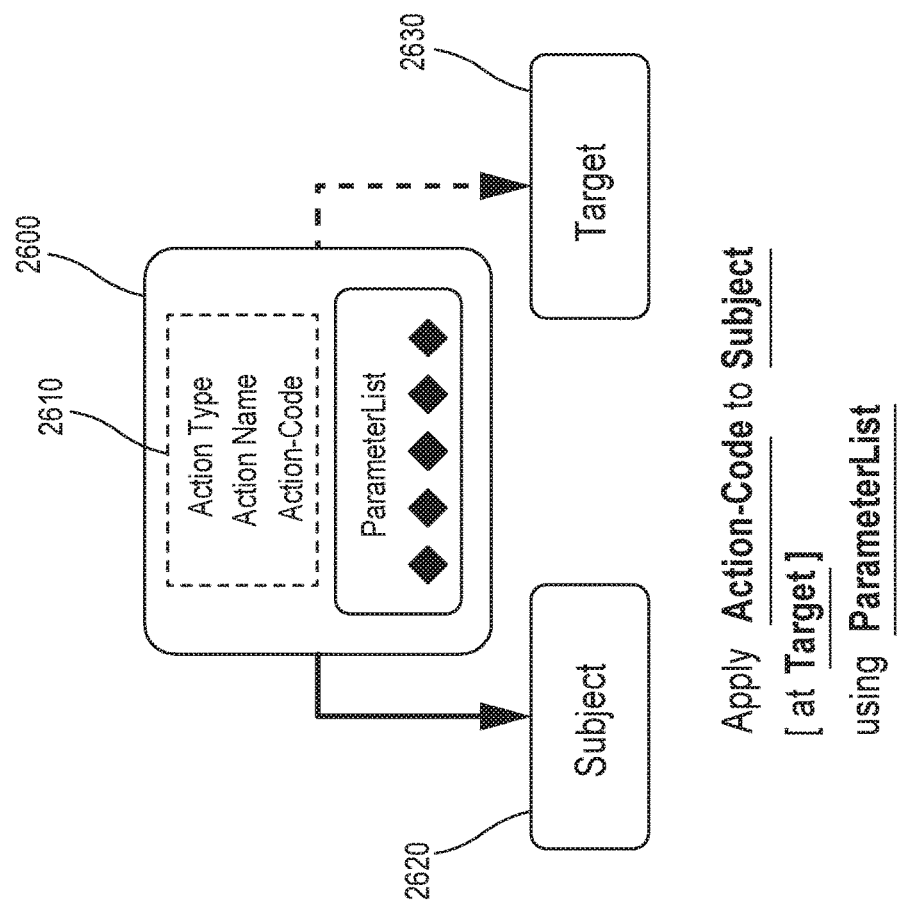
FIG. 26 illustrates a general form of an action specification for an action, according to an embodiment of the invention.
Figure 27:
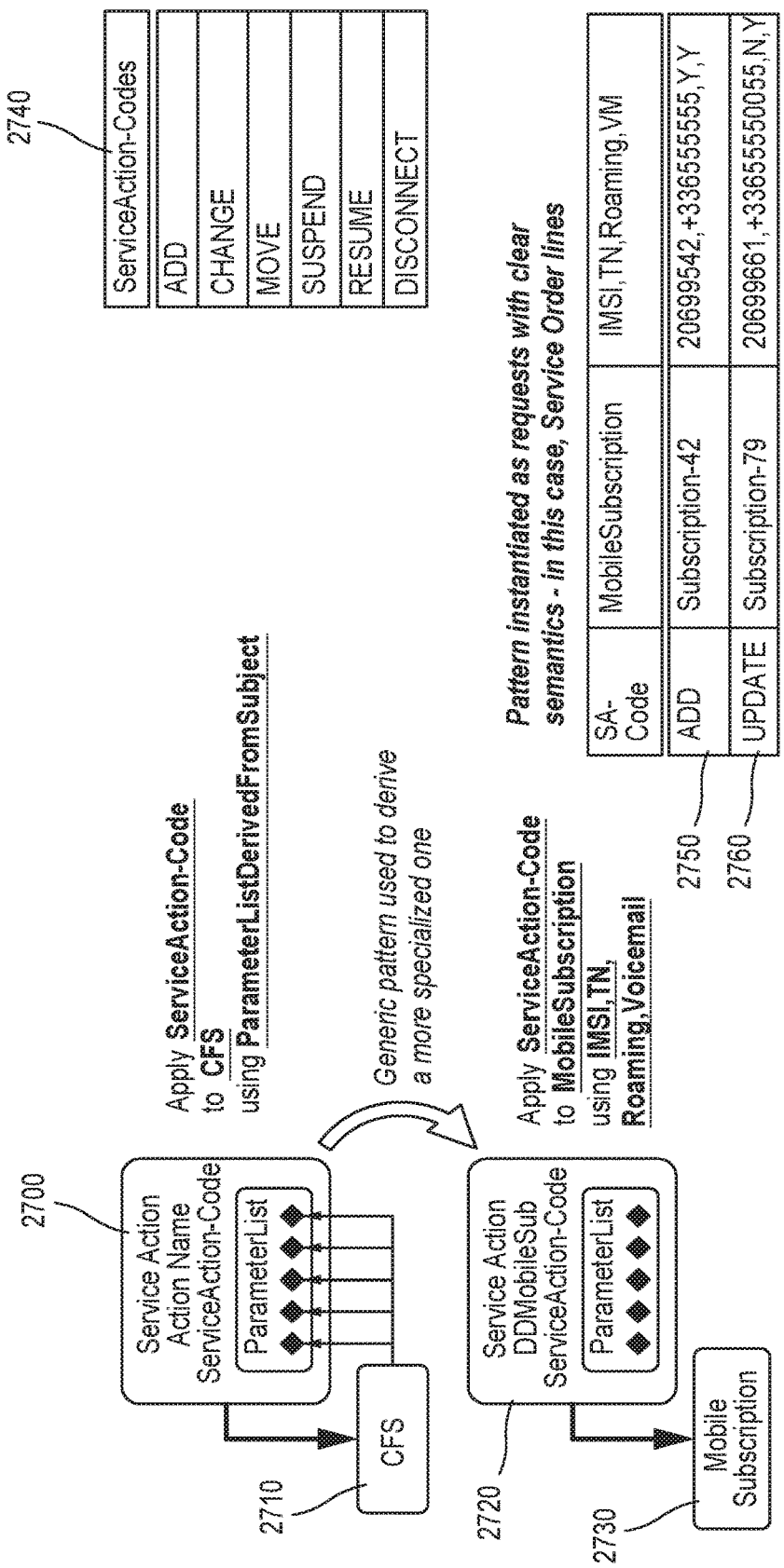
FIG. 27 illustrates an example of a service action, according to an embodiment of the invention.

FIG. 26 illustrates a general form of an action specification 2600 for an action, according to an embodiment of the invention. As described below in greater detail, FIG. 27 illustrates an action specification 2700 (i.e., service action 2700) as a more specific form of action specification 2600. Action specification 2600 is a general form of a pattern or template. As described below in greater detail, a more specifically defined action specification, such as action specification 2720 (i.e., service action 2720) of FIG. 27, is a pattern or template that can be instantiated as a specific request. More specifically, action specification 2600 can serve as a general form of a pattern or template that, where more specifically defined, can be transformed into process logic when a more specifically defined action specification that is based on action specification 2600 is instantiated. As is described below in greater detail, action specification 2600 can be more specifically defined by defining elements of action specification 2600, such as data 2610, subject 2620, or target 2630. Further, as previously described, an action is a structured request to perform work. Thus, an action includes metadata that defines the pattern or template of the structured request to perform work, where the format of the metadata is an action specification of a general form of action specification 2600. Further, action specification 2600 can serve as a pattern or template for more specifically-defined action specifications (such as action specification 2720 of FIG. 27).

Actions may be specified with varying degrees of specialization based on the specificity of the action specification, providing flexibility in declaring the semantics that are commonly understood by a requestor and a responder in a particular dialog. For example, if an action specification only includes generalized information, then the action specification (and the resulting action) can be considered generic, where the action can apply to a large set of subject types that vary broadly in nature. However, if the action specification includes specific information, then the action specification (and the resulting action) can be considered specific, where the action can only apply to a small set of subject types (or a single subject type) whose nature varies more narrowly. Thus, a level of specificity of an action is a spectrum varying from a generic pattern to a more specific pattern to a specific subject type. In certain embodiments, a specific instance of an action is an order line of an order.

According to the embodiment, action specification 2600 includes data 2610 and subject 2620, and optionally includes target 2630. Data 2610 is data that defines the request to perform work. By defining the request to perform work, data 2610 can constrain the boundaries of action specification 2600. More specifically, data 2610 can include an action type, an action name, an action code, and a parameter list. An action type is a type identifier that identifies a type of the action. The action type can contextualize action specifications (such as action specification 2600) according to subject and can constrain valid action code verbs for an action specification. An action name is an action identifier that identifies the action. An action code is a predefined code, where the action code can take the format of a verb notation, and where the action code can be selected from a set of predefined verbs (such as, for example, ADD, MOVE, CHANGE, SUSPEND, RESUME, DISCONNECT). In an alternate embodiment, an action code can defined rather than being selected from a set of predefined verbs. A set of predefined verbs can be defined based on an action type. An action code can be an action code template that refers to one or more action codes. A parameter list is a list of one or more parameters for carrying information as input to or output from the work to be performed by the request. The parameter list can be a parameter template that refers to one or more parameters. Further, the one or more parameters can be inferred based on specific information defined for action specification 2600 (such as specific information defined for subject 2620) or can be explicitly defined. Thus, for example, different parameters lists for a specific action, and specific subject, can be defined in a catalog. By selecting a specific action and subject, a specific instantiation of one or more parameters can inferred dynamically from a generic pattern. Alternatively, one or more parameters can be specifically defined, and no inference is required.

Subject 2620 is an entity that is (or a set of entities that are) acted upon by the action. Subject 2620 can be defined generically to include a subject template that references a set of one or more entity specifications, or subject 2620 can be defined to solely include a specific entity specification. Examples of specific entity specifications for subject 2620 can include a product specification, a customer-facing service specification, a resource-facing service specification, or a resource specification.

Target 2630 is an entity, role, or individual (or a set of entities, roles, or individuals) to which a request to perform work is to be relayed. Thus, target 2630 can identify where the action is to take place. Target 2630 can be defined generically to include a target template that references a set of one or more specifications, or target 2630 can be defined to solely include a specific specification. An example of a specific specification for target 2630 can be a resource specification. As previously described, target 2630 is optional, and in some embodiments, action specification 2600 does not include target 2630.

Thus, action specification 2600 allows an action to be expressed using the following format: "Apply Action-Code to Subject [at Target] using ParameterList." This framework can provide semantic clarity for a variety of dialogs between a requestor and a responder. Using action specification 2600, the service design and order fulfillment system can express valid requests for a context, conversion of requests in one context to requests in another context, derivation of the requests that correspond to state changes, and dependencies between requests that can be considered when orchestrating the requests.

Further, in some embodiments, actions can be categorized by an order layer of a fulfillment solution blueprint. More specifically, actions can be categorized into product actions (where an instance of a product action can be included within a customer order line), service actions (where an instance of a service action can be included within a service order line), and technical actions (where an instance of a technical action can be included within a technical order line). Product actions, service actions, and technical actions can each have a different set of potential action codes.

In certain embodiments, each action may also have some aspects of its action specification pre-defined, causing the action to be a specific action. For example, an action can be specific to a specific subject or action code. The more specific the definition of an action, the more limited its use is to a narrow context, such as a specific function. Conversely, the action can be a completely generic pattern, requiring that both a subject and an action code be provided when the action is instantiated.

According to certain embodiments, different categories of actions can be utilized to define a fulfillment solution. Examples of these categories of actions are now described in greater detail. One example category includes service layer generic actions that are applicable to any customer-facing service subject. Another example category includes service layer actions that are specific to a particular customer-facing service subject, but require an action code to be specified. Actions from these two action categories can serve as a template for service order lines of a service order. Another example category includes service layer actions that are specific both to a subject and an action code. An example action of this action category is "Add_DSL" which can define a parameter list specific to an "ADD" action code and specific to a DSL resource-facing specification subject. Actions from this action category can be utilized in a design and assign provider function. Another example category includes technical layer generic actions that are applicable to any resource-facing service subject or any resource subject. Actions from this action category can serve as a template for technical order lines of a technical order. Another example category includes technical layer actions that are specific both to a subject and an action code. An example action of this action category is "AActivate_GSM_Subscriber" which can define a parameter list specific to a "CREATE" action code and specific to a GSM_Subscription resource-facing service specification subject. Actions from this action category can be utilized in a technical order activation provider function. Actions from this action category can also serve as a template for technical order lines of a technical order.

FIG. 27 illustrates an example of a service action 2700, according to an embodiment of the invention. Service action 2700 is an example of a generic action that has a generic pattern. More specifically, rather than including a specific action code, service action 2700 includes an action code template, "ServiceAction-Code." The action code template references one or more service action codes defined within service action codes 2740. Examples of service action codes in the illustrated embodiment include "ADD," "CHANGE," "MOVE," "SUSPEND," "RESUME," and "DISCONNECT." Thus, a service action code defined within service action codes 2740 can be derived from the action code template, "ServiceAction-Code." In certain embodiments, the action code templates references service action codes 2740 because an action type of action 2700 is "ServiceAction." Further, service action 2700 includes subject 2710, where subject 2710 is a subject template (specifically, a customer-facing service template). The customer-facing service template of subject 2710 references a set of one or more customer-facing service specifications. Thus, any defined customer-facing service specification can be derived from the customer-facing service template of subject 2710. Service action 2700 further includes a parameter list template, where the one or more parameters of the parameter list of service action 2700 can be derived based on an instance of the customer-facing service template of subject 2710. Thus, service action 2700 can be expressed using the following format: "Apply ServiceAction-Code to CFS using ParameterListDerivedFromSubject."

FIG. 27 further illustrates service action 2720, where service action 2720 is an example of a more specialized action that has a more specialized pattern, and where service action 2720 can be derived from service action 2700. According to an embodiment, a specialized pattern can be derived from a generic pattern by performing at least one of: (1) replacing an action code template with a more specific action code template that only references a subset of the one or more action codes that are referenced by the generic action code template; (2) replacing a parameter list template with a more specific parameter list template that only references a subset of the one or more parameters referenced by the generic parameter list template; or (3) replacing a subject template with a more specific subject template that only references a subset of the one or more entity specifications referenced by the generic subject template.

More specifically, according to the illustrated embodiment, service action 2720 includes an action name, "DDMobileSub." Similar to service action 2700, service action 2720 does not include a specific action code, but instead includes an action code template, "ServiceAction-Code." The action code template references one or more service action codes defined within service action codes 2740. Further, service action 2720 includes subject 2730, where subject 2730 is a mobile subscription template, and where a mobile subscription is a customer-facing service. The mobile subscription template of subject 2730 can reference a set of one or more mobile subscription specifications. Thus, the mobile subscription template of subject 2730 replaces the customer-facing service template of subject 2710. Service action 2720 further includes a parameter list template that includes the parameters, "IMSI," "TN," "Roaming," and "Voicemail," where an instance of service action 2720 can include values for the parameters. These parameters can be derived from the mobile subscription template of subject 2730. Thus, the parameter list template of service action 2720 replaces the parameter list template of service action 2700. Service action 2720 can further be expressed using the following format: "Apply ServiceAction-Code to Mobile Subscription using IMSI, TN, Roaming, Voicemail."

According to the embodiment, service action 2720 can be instantiated into one or more service order lines, where a service order line includes a specific instance of a service action. By instantiating service action 2720 into a service order line, the following can be performed: (1) using the action code template of service action 2720 to select an action code; (2) using the parameter list template of service action 2720 to populate one or more parameters with one or more values; and (3) using the subject template of service action 2720 to select an instance of an entity specification. FIG. 27 illustrates two examples of service order lines that include instances of service action 2720: service order lines 2750 and 2760. Service order line 2750 includes: a service action code, "ADD"; a subject, "Subscription-42"; and a parameter list, "20699542," "+336555555," "Y," and "Y." Service order line 2760 includes: a service action code, "UPDATE"; a subject, "Subscription-79," and a parameter list, "20699661," "+33655550055," "N," and "Y."

Figure 28:
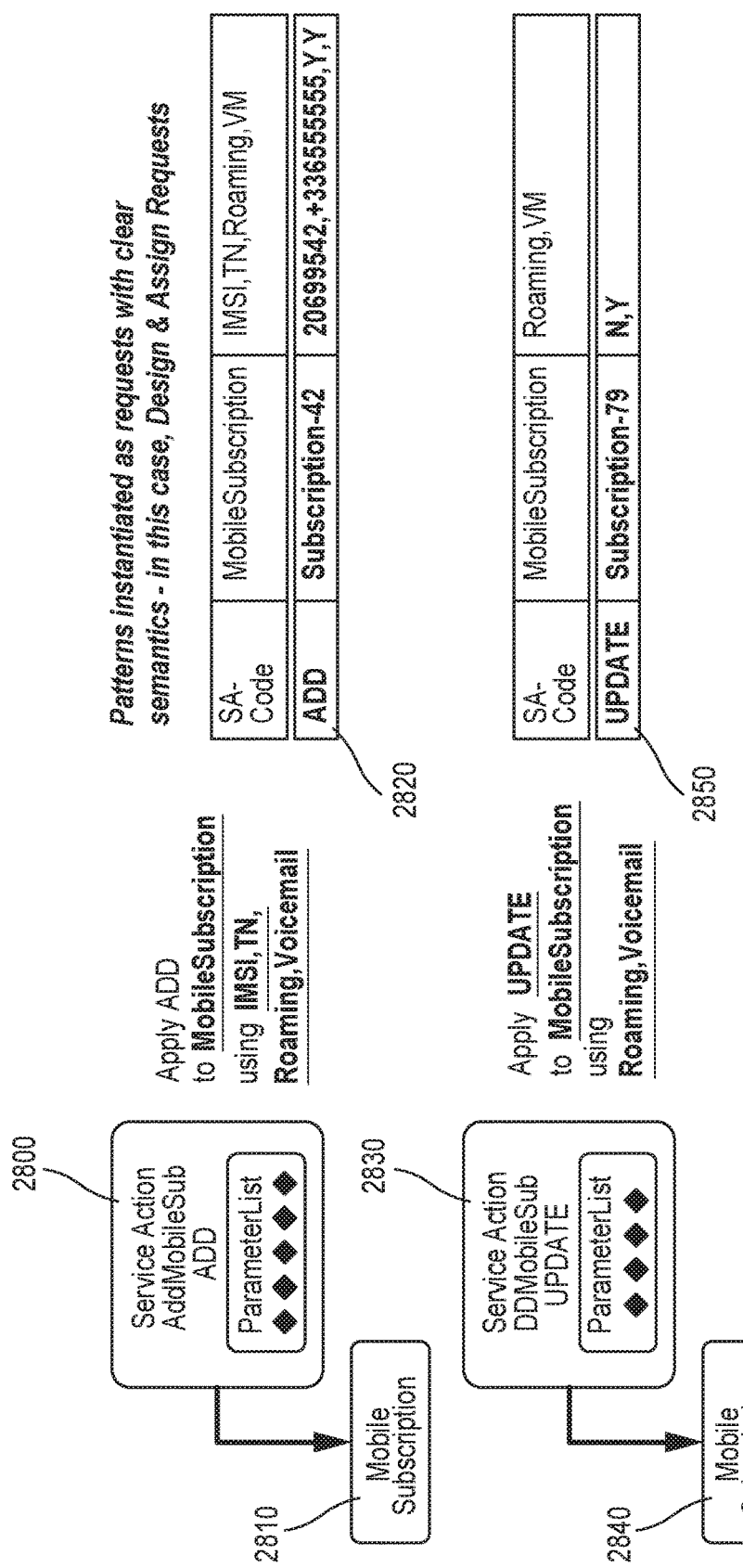
FIG. 28 illustrates two examples of service actions, according to an embodiment of the invention.

FIG. 28 illustrates two examples of service actions (i.e., service action 2800 and service action 2830), according to an embodiment of the invention. According to the illustrated embodiment, service action codes from FIG. 27 can be applied using an alternate pattern for a service action. More specifically, service action 2800 is another example of a more specialized action that has a more specialized pattern, where service action 2800 can be derived from service action 2700 of FIG. 27. According to the illustrated embodiment, service action 2800 includes an action name, "AddMobileSub." Further, service action 2800 includes a specific action code, "ADD." Thus, the action code, "ADD," replaces the action code template of service action 2700. Service action 2800 also includes subject 2810, where subject 2810 is a mobile subscription template, and where a mobile subscription is a customer-facing service. The mobile subscription template of subject 2810 references a set of one or more mobile subscription specifications. Thus, the mobile subscription template of subject 2810 replaces the customer-facing service template of subject 2710 of FIG. 27. Service action 2800 further includes a parameter list template that includes the parameters, "IMSI," "TN," "Roaming," and "Voicemail," where an instance of service action 2800 can include values for the parameters. These parameters can be derived from the mobile subscription template of subject 2810. Thus, the parameter list template of service action 2800 replaces the parameter list template of service action 2700 of FIG. 27. Service action 2800 can further be expressed using the following format: "Apply ADD to Mobile Subscription using IMSI, TN, Roaming, Voicemail."

According to the embodiment, service action 2800 can be instantiated into one or more service order lines, where a service order line includes a specific instance of a service action. By instantiating service action 2800 into a service order line, a parameter list template can be replaced with one or more parameters, and a subject template can be replaced with an entity specification. FIG. 28 illustrates an example of a service order line that includes an instance of service action 2800: service order line 2820. Service order line 2820 includes: a service action code, "ADD"; a subject, "Subscription-42"; and parameter values, "20699542," "+336555555," "Y," and "Y."

Further, service action 2830 is another example of a more specialized action that has a more specialized pattern, where service action 2830 can be derived from service action 2700 of FIG. 27. According to the illustrated embodiment, service action 2800 includes an action name, "DDMobileSub." Further, service action 2830 includes a specific action code, "UPDATE." Thus, the action code, "UPDATE," replaces the action code template of service action 2700 of FIG. 27. Service action 2830 also includes subject 2840, where subject 2840 is a mobile subscription template, and where a mobile subscription is a customer-facing service. The mobile subscription template of subject 2840 references a set of one or more mobile subscription specifications. Thus, the mobile subscription template of subject 2840 replaces the customer-facing service template of subject 2710 of FIG. 27. Service action 2830 further includes a parameter list template that includes the parameters, "Roaming" and "Voicemail," where an instance of service action 2830 can include values for the parameters. These parameters can be derived from the mobile subscription template of subject 2840. Thus, the parameter list template of service action 2800 replaces the parameter list template of service action 2700 of FIG. 27. Service action 2830 can further be expressed using the following format: "Apply UPDATE to Mobile Subscription using Roaming, Voicemail."

According to the embodiment, service action 2830 can be instantiated into one or more service order lines, where a service order line includes a specific instance of a service action. By instantiating service action 2830 into a service order line, the parameter list template can be used to populate one or more parameters with one or more values, and the subject template can be used to select an instance of an entity specification. FIG. 28 illustrates an example of a service order line that includes an instance of service action 2830: service order line 2850. Service order line 2850 includes: a service action code, "UPDATE"; a subject, "Subscription-79"; and a parameter list, "N" and "Y."

Figure 29:
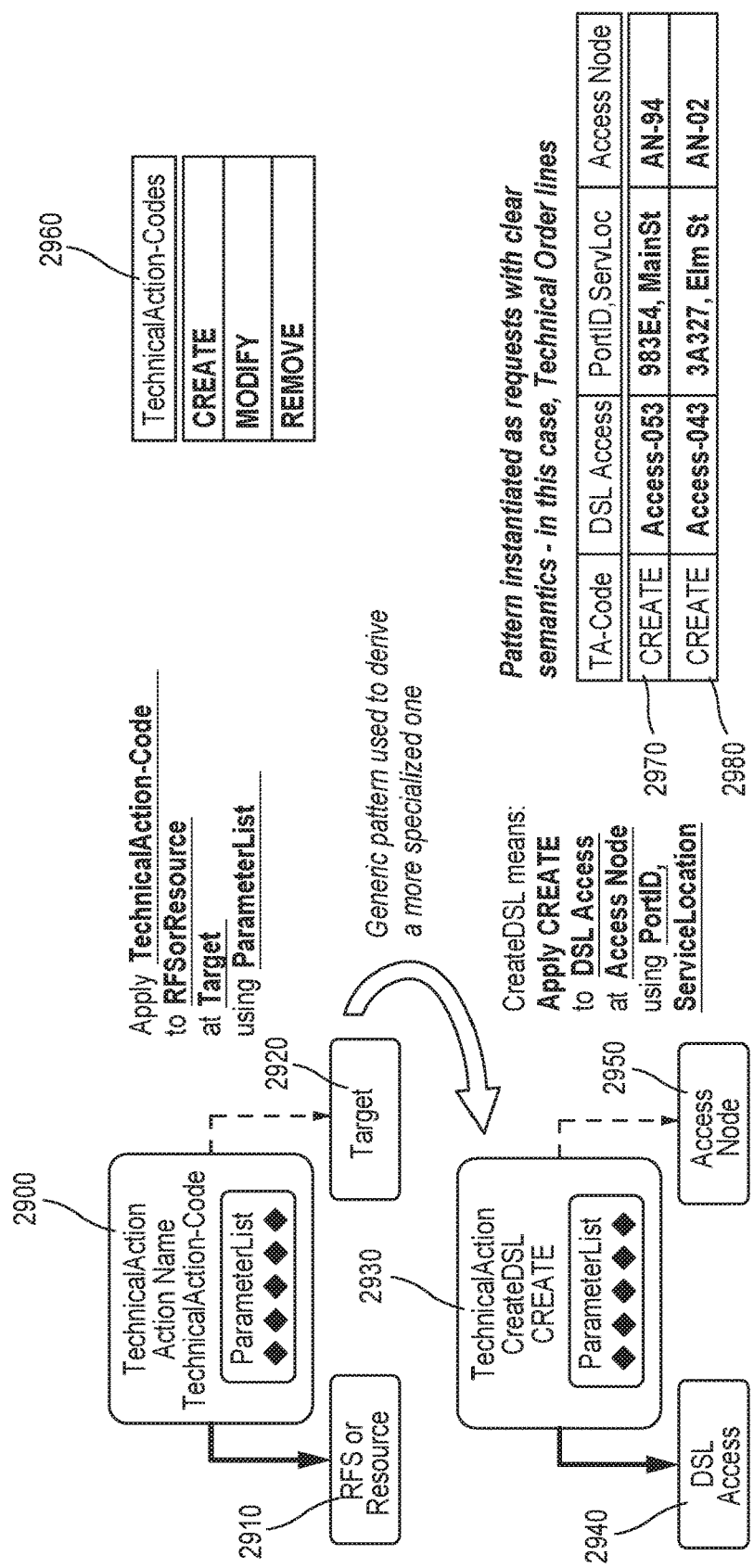
FIG. 29 illustrates an example of two technical actions with differing degrees of specialization, according to an embodiment of the invention.

FIG. 29 illustrates an example of two technical actions with differing degrees of specialization (i.e., technical action 2900 and technical action 2930), according to an embodiment of the invention. Technical action 2900 is another example of a generic action that has a generic pattern. More specifically, rather than including a specific action code, technical action 2900 includes an action code template, "TechnicalAction-Code." The action code template references one or more technical action codes defined within technical action codes 2960. Examples of technical action codes in the illustrated embodiment include "CREATE," "MODIFY," and "MOVE." Thus, a technical action code defined within technical action codes 2960 can be derived from the action code template, "TechnicalAction-Code." In certain embodiments, the action code template references technical action codes 2960 because an action type of action 2900 is "TechnicalAction." Further, technical action 2900 includes subject 2910, where subject 2910 is a resource-facing service or resource template. The resource-facing service or resource template of subject 2910 can reference a set of one or more resource-facing service specifications or resource specifications. Thus, any defined resource-facing service specification or resource specification can be derived from the resource-facing service template of subject 2910. Technical action 2900 further includes a parameter list template that can reference a set of one or more parameters. Technical action 2900 further includes target 2920, where target 2920 is a resource template. The resource template of target 2920 can reference a set of one or more resource specifications. Thus, technical action 2900 can be expressed using the following format: "Apply TechnicalAction-Code to RFSorResource at Target using ParameterList."

FIG. 29 further illustrates technical action 2930, where technical action 2930 is an example of a more specialized action that has a more specialized pattern, and where technical action 2930 can be derived from technical action 2900. As previously described, a specialized pattern can be derived from a generic pattern by performing at least one of: (1) replacing an action code template with a more specific action code template that only references a subset of the one or more action codes that are referenced by the generic action code template; (2) replacing a parameter list template with a more specific parameter list template that only references a subset of the one or more parameters referenced by the generic parameter list template; or (3) replacing a subject template with a more specific subject template that only references a subset of the one or more entity specifications referenced by the generic subject template. When an action specification includes a target, a specialized pattern can also be derived from a generic pattern by: (4) replacing a target template with a more specific target template that only references a subset of one or more specifications that are referenced by the generic target template.

More specifically, technical action 2930 includes an action name, "CreateDSL." Further, technical action 2930 includes a specific action code, "CREATE." Thus, the action code, "CREATE," replaces the action code template of technical action 2900. Technical action 2930 further includes subject 2940, where subject 2940 is a DSL access template, and where a DSL access is a resource-facing service. The DSL access template of subject 2940 references a set of one or more DSL access specifications. Thus, the DSL access template of subject 2940 replaces the resource-facing service or resource template of subject 2910. Technical action 2930 further includes a parameter list template that includes the parameters, "PortID," and "ServiceLocation," where an instance of technical action 2930 can include values for the parameters. Thus, the parameter list template of technical action 2930 replaces the parameter list template of technical action 2900. Technical action 2930 further includes target 2950, where target 2950 is an access node template. The access node template of target 2950 can reference a set of one or more access node specifications. Thus, the access node template of target 2950 replaces the resource template of target 2920. Technical action 2930 can further be expressed using the following format: "Apply CREATE to DSL Access at Access Node using PortID, ServiceLocation."

According to the embodiment, technical action 2930 can be instantiated into one or more technical order lines, where a technical order line includes a specific instance of a technical action. By instantiating technical action 2930 into a technical order line, the following can be performed: (1) using the action code template of technical action 2930 to select an action code; (2) using the parameter list template of technical action 2930 to populate one or more parameters with one or more values; (3) using the subject template of technical action 2930 to select an instance of an entity specification; and (4) using the target template of technical action 2930 to select an instance of a resource specification. FIG. 29 illustrates two examples of technical order lines that include instances of technical action 2930: technical order lines 2970 and 2980. Technical order line 2970 includes: a technical action code, "CREATE"; a subject, "Access-543"; a parameter list, "983E4," "Main St."; and a target, "AN-94." Technical order line 2980 includes: a technical action code, "CREATE"; a subject, "Access-043"; a parameter list, "3A327," "Elm Street"; and a target, "AN-02."

Figure 29A:
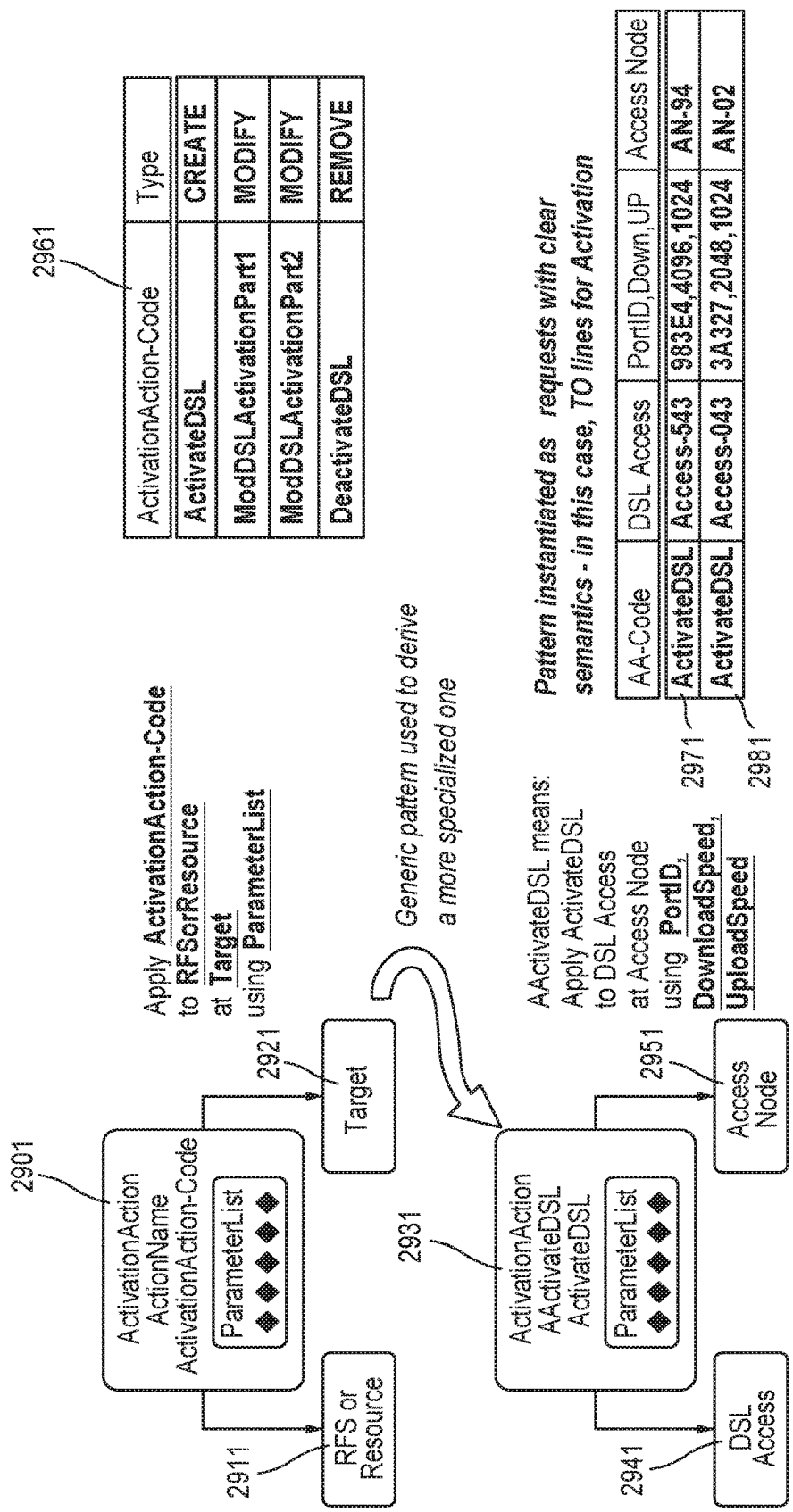
FIG. 29A illustrates another example of two activation actions with differing degrees of specialization, according to another embodiment of the invention.

FIG. 29A illustrates an example of two activation actions (where an activation action is a type of technical action) with differing degrees of specialization (i.e., activation action 2901 and activation action 2931), according to another embodiment of the invention. Activation action 2901 is another example of a generic action that has a generic pattern. More specifically, rather than including a specific action code, activation action 2901 includes an action code template, "ActivationAction-Code." The action code template references one or more activation action codes defined within activation action codes 2961. Examples of technical action codes in the illustrated embodiment include "CREATE," "MODIFY," and "REMOVE." Thus, an activation action code defined within activation action codes 2961 can be derived from the action code template, "ActivationAction-Code." In certain embodiments, the action code template references activation action codes 2961 because an action type of action 2901 is "ActivationAction." Further, activation action 2901 includes subject 2911, where subject 2911 is a resource-facing service or resource template. The resource-facing service or resource template of subject 2911 can reference a set of one or more resource-facing service specifications or resource specifications. Thus, any defined resource-facing service specification or resource specification can be derived from the resource-facing service template of subject 2911. Activation action 2901 further includes a parameter list template that can reference a set of one or more parameters. Activation action 2901 further includes target 2921, where target 2921 is a resource template. The resource template of target 2921 can reference a set of one or more resource specifications. Thus, activation action 2901 can be expressed using the following format: "Apply ActivationAction-Code to RFSorResource at Target using ParameterList."

FIG. 29A further illustrates activation action 2931, where activation action 2931 is an example of a more specialized action that has a more specialized pattern, and where activation action 2931 can be derived from activation action 2901. As previously described, a specialized pattern can be derived from a generic pattern by performing at least one of: (1) replacing an action code template with a more specific action code template that only references a subset of the one or more action codes that are referenced by the generic action code template; (2) replacing a parameter list template with a more specific parameter list template that only references a subset of the one or more parameters referenced by the generic parameter list template; or (3) replacing a subject template with a more specific subject template that only references a subset of the one or more entity specifications referenced by the generic subject template. When an action specification includes a target, a specialized pattern can also be derived from a generic pattern by: (4) replacing a target template with a more specific target template that only references a subset of one or more specifications that are referenced by the generic target template.

More specifically, activation action 2931 includes an action name, "AActivateDSL." Further, activation action 2931 includes a specific action code, "ActivateDSL." Thus, the action code, "ActivateDSL," replaces the action code template of activation action 2901. Activation action 2931 further includes subject 2941, where subject 2941 is a DSL access template, and where a DSL access is a resource-facing service. The DSL access template of subject 2941 references a set of one or more DSL access specifications. Thus, the DSL access template of subject 2941 replaces the resource-facing service or resource template of subject 2911. Activation action 2931 further includes a parameter list template that includes the parameters, "PortID," "DownloadSpeed" and "UploadSpeed," where an instance of activation action 2931 can include values for the parameters. Thus, the parameter list template of activation action 2931 replaces the parameter list template of activation action 2930. Activation action 2931 further includes target 2951, where target 2951 is an access node template. The access node template of target 2951 can reference a set of one or more access node specifications. Thus, the access node template of target 2951 replaces the resource template of target 2921. Activation action 2931 can further be expressed using the following format: "Apply ActivateDSL to DSL Access at Access Node using PortID, DownloadSpeed, UploadSpeed."

According to the embodiment, activation action 2931 can be instantiated into one or more technical order lines, where a technical order line includes a specific instance of an activation action. By instantiating activation action 2931 into a technical order line, the following can be performed: (1) using the action code template of activation action 2931 to select an action code; (2) using the parameter list template of activation action 2931 to populate one or more parameters with one or more values; (3) using the subject template of activation action 2931 to select an instance of an entity specification; and (4) using the target template of activation action 2931 to select an instance of a resource specification.

FIG. 29A illustrates two examples of technical order lines that include instances of activation action 2931: technical order lines 2971 and 2981. Technical order line 2971 includes: an activation action code, "ActivateDSL"; a subject, "Access-543"; a parameter list, "983E4," "4096," "1024"; and a target, "AN-94." Technical order line 2981 includes: a technical action code, "CREATE"; a subject, "Access-043"; a parameter list, "983E4," "4096," "1024"; and a target, "AN-02."

Figure 29B:
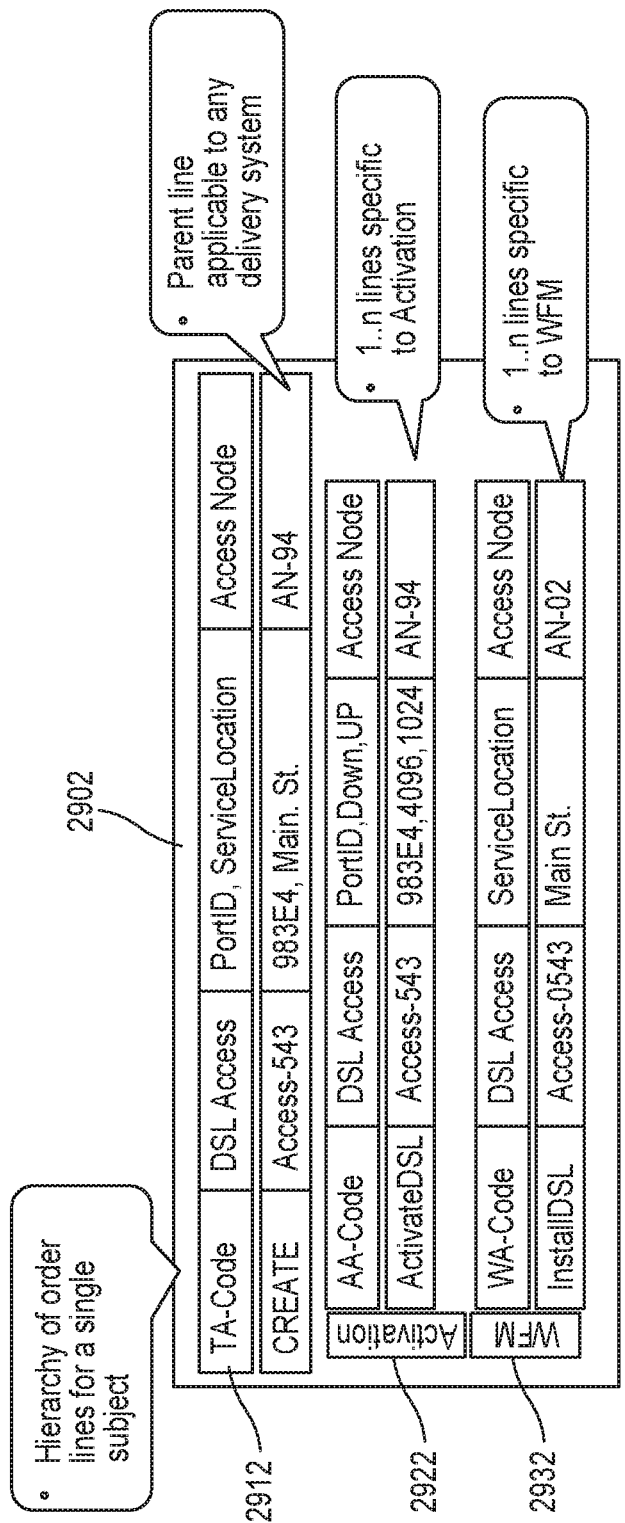
FIG. 29B illustrates an example hierarchy of order lines, according to an embodiment of the invention.

FIG. 29B illustrates an example hierarchy of order lines (i.e., order line hierarchy 2902), according to an embodiment of the invention. Order line hierarchy 2902 includes technical order line 2912, where technical order line 2912 is a parent order line applicable to any delivery system. Order line hierarchy 2902 further includes technical order line 2922, where technical order line 2922 is specific to an activation system. In alternate embodiments, order line hierarchy 2902 can include a plurality of technical order lines specific to an activation system. Order line hierarchy 2902 further includes technical order line 2932, where technical order line 2932 is specific to a WFM system. In alternate embodiments, order line hierarchy 2902 can include a plurality of technical order lines specific to a WFM system.

Figure 30:
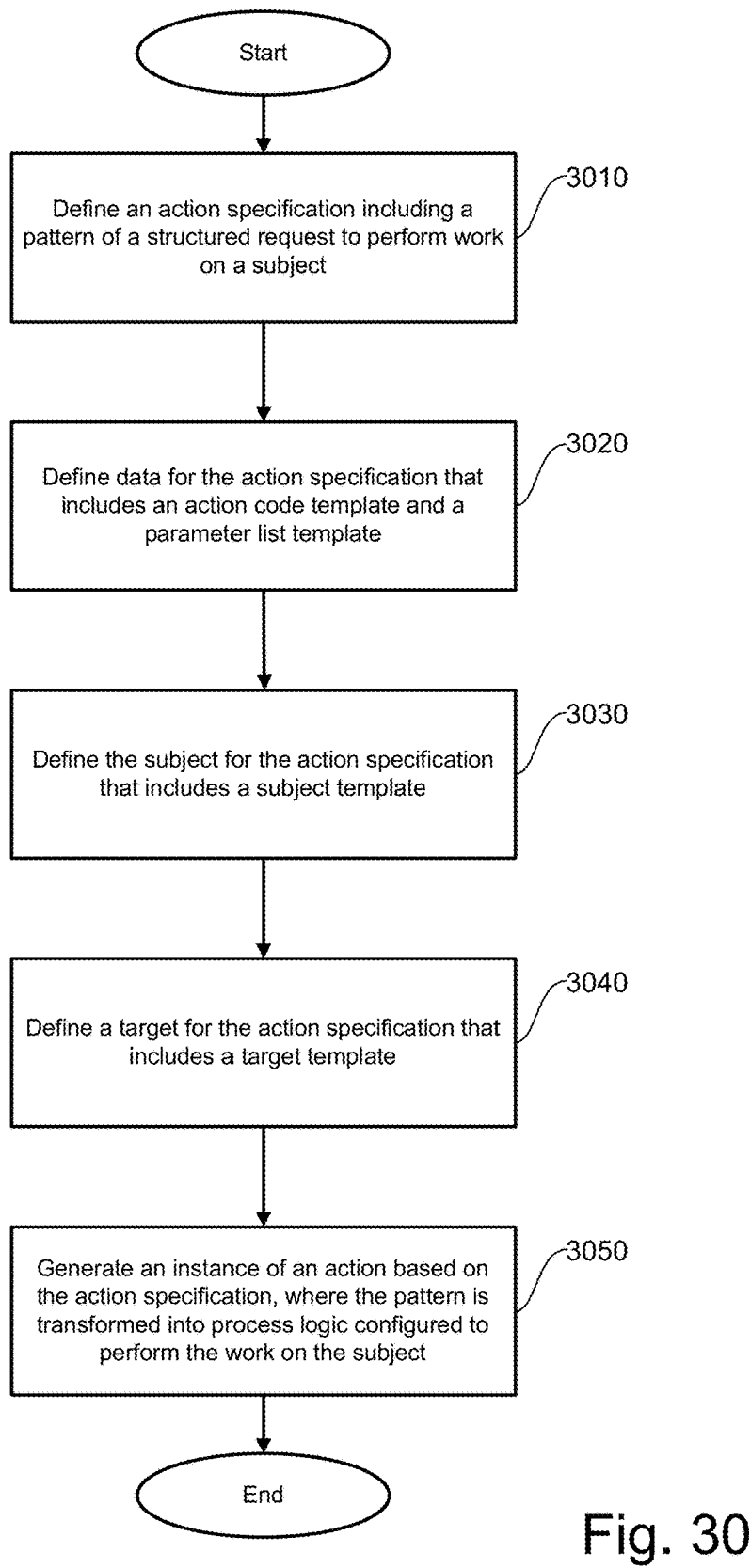
FIG. 30 illustrates another flow diagram of the functionality of a service design and order fulfillment module, according to another embodiment of the invention.

FIG. 30 illustrates another flow diagram of the functionality of a service design and order fulfillment module, according to another embodiment of the invention. The flow begins, and proceeds to 3010. At 3010, an action specification is defined that includes a pattern of a structured request to perform work on a subject. The flow then proceeds to 3020.

At 3020, data is defined for the action specification that includes an action code template that references one or more action codes, and a parameter list template that references one or more parameters. The flow then proceeds to 3030.

At 3030, the subject is defined for the action specification, where the subject includes a subject template that references one or more entity specifications. The flow then proceeds to 3040.

At 3040, a target is defined for the action specification, where the target includes a target template that references one or more resource specifications. In certain embodiments, 3040 can be omitted. The flow then proceeds to 3050.

At 3050, an instance of an action is generated based on the action specification, where the pattern of the structured request to perform work is transformed into process logic configured to perform work on the subject. In certain embodiments, the action is one of: a product action, a service action, or a technical action. In some of these embodiments, the instance of the action is included within one of: a customer order line, a service order line, or a technical order line. In certain embodiments, the action is a component of a fulfillment solution, where the fulfillment solution includes a metadata-driven executable process that fulfills an order. In some of these embodiments, the order is an order for communication services.

Further, in certain embodiments, the generating the instance of the action further includes: using the action code template to select an action code, using the parameter list template to populate one or more parameters with one or more values, and using the subject template to select an instance of an entity specification. In some of these embodiments, the one or more parameters can be inferred based on the subject. In alternate embodiments, the generating the instance of the action further includes: using a specific action code template that references a subset of the one or more action codes to select an action code, using a specific parameter list template that references a subset of the one or more parameters to populate one or more parameters with one or more values, and using a specific subject template that references a subset of the one or more entity specifications to select an instance of an entity specification. The flow then ends.

Thus, in one embodiment, a service design and order fulfillment system can provide an action, where an action is a pattern or template that can be instantiated as a specific request, where an instance of an action can be included within an order line. Thus, an interface contract can utilize a set of actions to enable the functions/layers of an orchestration process to be decoupled, allowing requests to provide varying levels of latitude in framing their requests. This can allow for a standardized interface contract between systems and network elements that encapsulate how the interface contract is implemented so that changes to the implementation can be isolated and hidden. Further, actions can be defined declaratively, which can enable mapping of action parameters to entity specifications and which can eliminate much of the coding that is normally needed to perform this transformation. This can reduce overall solution complexity, and provide systems with needed agility to adapt to typical industry developments, such as deployment of new technologies, devices, network elements, partnerships, business models, etc. This can further reduce cost and time needed to make necessary changes. Additionally, the use of actions can improve clarity of requests through use of disciplined semantics, and can provide a higher degree of dynamism through configuration of process logic using templates.

According to another embodiment, a service design and order fulfillment system can design a provider function such that a behavior of the provider function is variable, driven by specifically structured external metadata. Dynamic determination of a process flow can provide extreme versatility of the provider function while maintaining manageability and reusability of the metadata. The dynamic, pattern-driven fulfillment approach can be utilized to design specific provider functions, such as a customer order orchestration provider function, a service order orchestration provider function, a technical order orchestration provider function, a service order calculation provider function, and a technical order calculation provider function.

Figure 31:
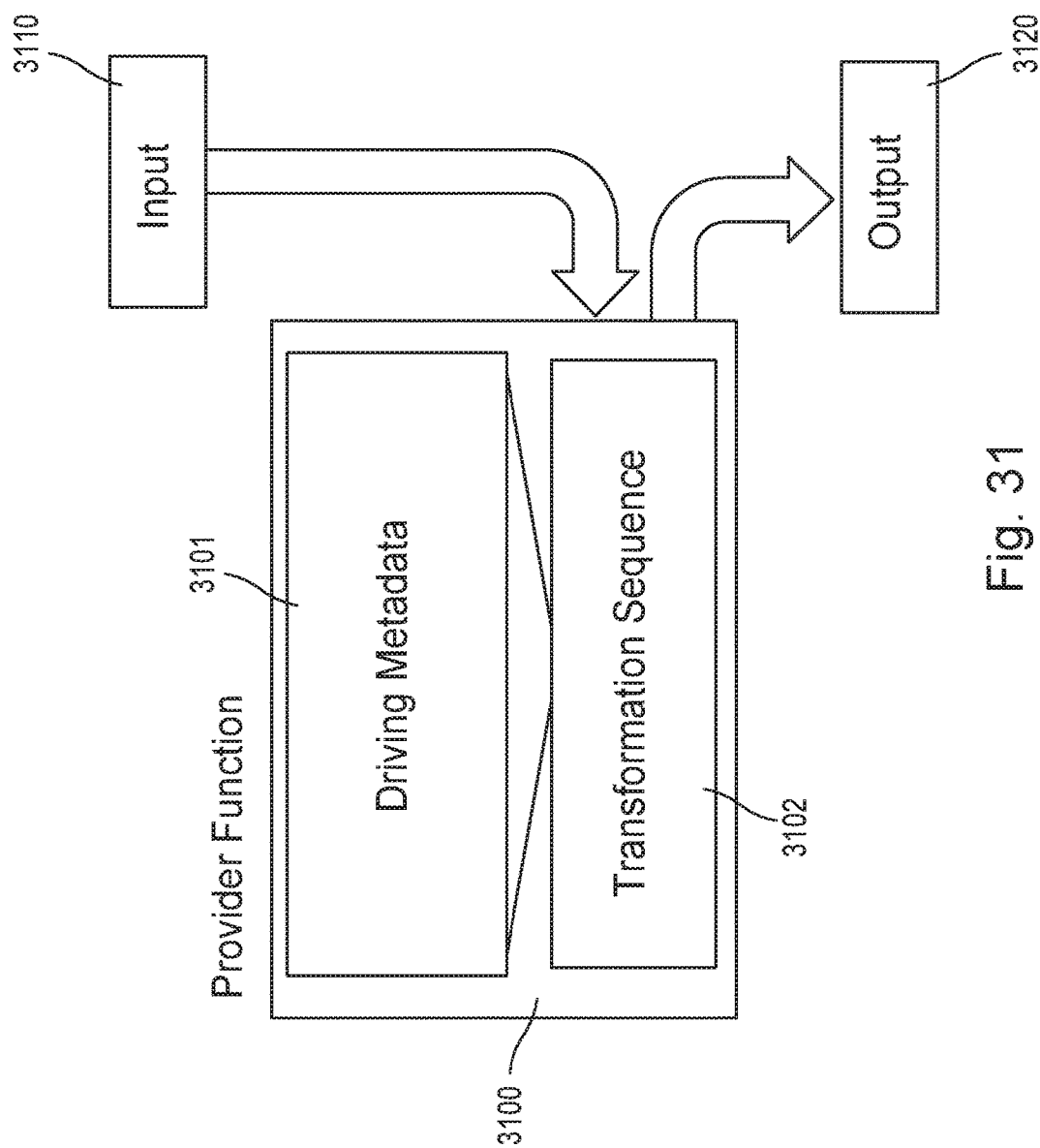
FIG. 31 illustrates an example provider function, according to an embodiment of the invention.

FIG. 31 illustrates an example provider function 3100, according to an embodiment of the invention. A provider function (such as provider function 3100) is a logical component of a fulfillment solution that offers a generalized capability, where the provider function acts upon a defined input (such as input 3110) to generate a defined output (such as output 3120). In certain embodiments, input 3110 can be a customer order, a service order, a technical order, one or more fulfillment patterns, or a combination therein. Further, in certain embodiments, output 3120 can be a service order, a technical order, or an orchestration plan.

According to the embodiment, provider function 3100 includes metadata 3101 and a transformation sequence 3102. In an alternate embodiment, transformation sequence 3102 is omitted, and provider function 3100 only includes metadata 3101. As is discussed below in greater detail, metadata 3101 includes a structured set of metadata, and transformation sequence 3102 includes a set of customizable process logic that is designed to be customized by metadata 3101, where the customizable process logic is structured within one or more stages. In certain embodiments, metadata 3101 includes a plurality of structured sets of metadata, where a set of metadata can be selected. Further, in certain embodiments, transformation sequence 3102 includes a plurality of sets of customizable process logic, where a set of customizable process logic can be selected. Thus, the behavior of provider function 3100 in a particular context can depend on metadata 3101 and transformation sequence 3102. This means that provider function 3100 can provide a capability that is customizable at runtime.

As is described below in greater detail, provider function 3100 can be defined in a service-agnostic manner (i.e., provider function 3100 is not coupled with a specific service or specific technology). Rather, provider function 3100 can utilize metadata (specifically, a fulfillment pattern retrieved from a technical catalog, in certain embodiments) to provide a generalized capability for a context of a specific stage of a process. Thus, the generalized capability provided by provider function 3100 can be adaptable based on the fulfillment pattern. Further, the capability provided by provider function 3100 can be dynamically produced at runtime based on input (e.g., parameters and an information state of an order), based on metadata (e.g., fulfillment pattern retrieved from technical catalog), and based on a subject (e.g., product specification, customer-facing service specification, resource-facing service specification, or resource specification). Thus, provider function 3100 can provide a separation of a fundamental fulfillment pattern from metadata that causes the fulfillment pattern to perform a specific function. Further, provider function 3100 can provide a separation of metadata 3101 and transformation sequence 3102.

Figure 32:
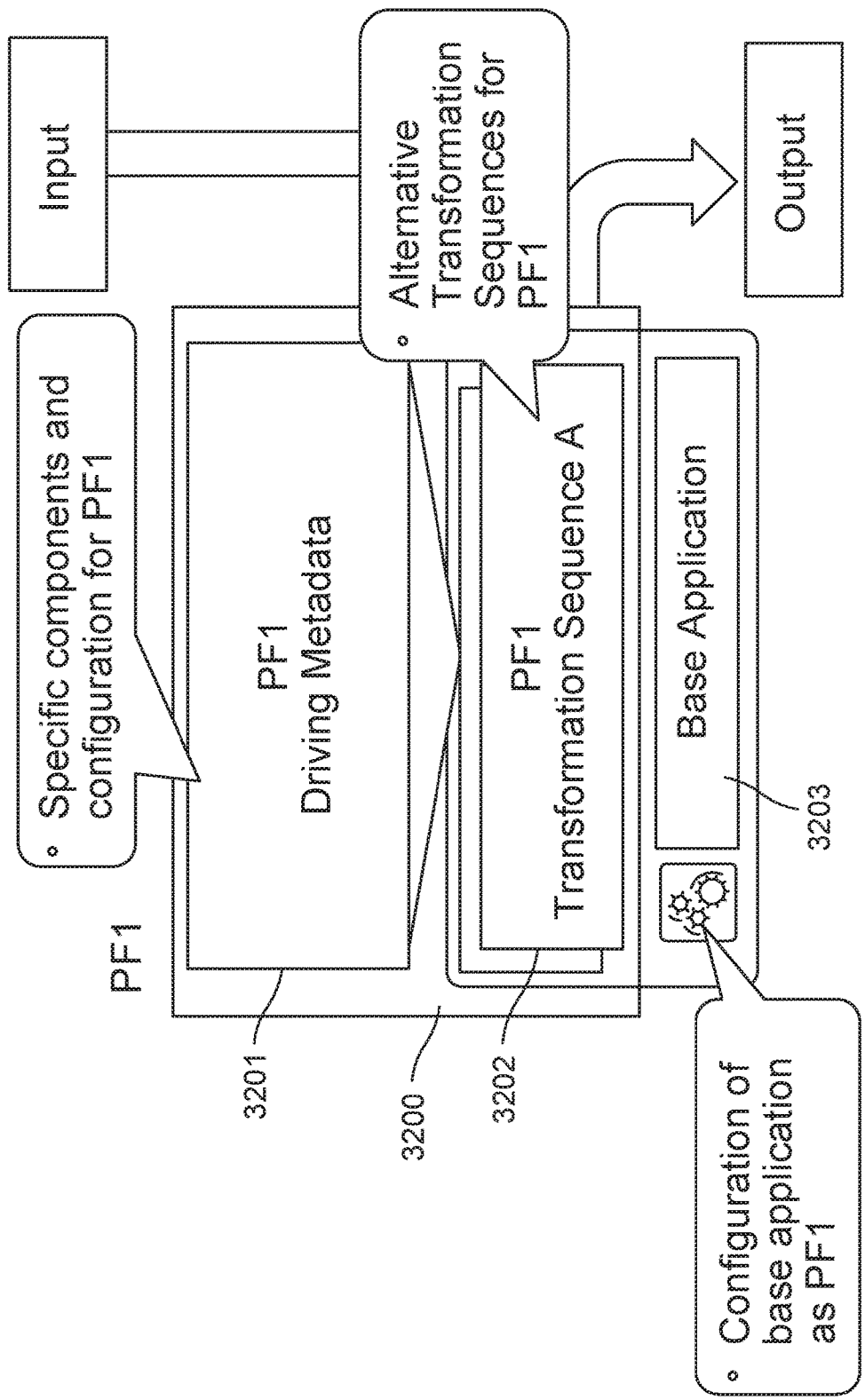
FIG. 32 illustrates another example provider function, according to an embodiment of the invention.

FIG. 32 illustrates another example provider function 3200, according to an embodiment of the invention. According to the embodiment, provider function 3200 includes metadata 3201, a transformation sequence 3202, and a base application 3203. Similar to the illustrated embodiment of FIG. 31, metadata 3201 includes a structured set of metadata, and transformation sequence 3202 includes a set of customizable process logic. In certain embodiments, metadata 3101 includes a plurality of structured sets of metadata, where a set of metadata can be selected. Further, in certain embodiments, transformation sequence 3102 includes a plurality of sets of customizable process logic, where a set of customizable process logic can be selected. Base application 3203 includes base process logic that can be configured by metadata 3201 and transformation sequence 3202.

According to the embodiment, provider function 3200 can be implemented in an environment of a specific software application by: (1) configuring base application 3203 to select and utilize a set of customizable process logic from transformation sequence 3202; and (2) configuring base application 3202 to select and utilized a set of metadata from metadata 3201 based on a context of provider function 3200. Metadata 3201 and transformation sequence 3202 are further described in greater detail in conjunction with FIGS. 33 and 34.

Figure 33:
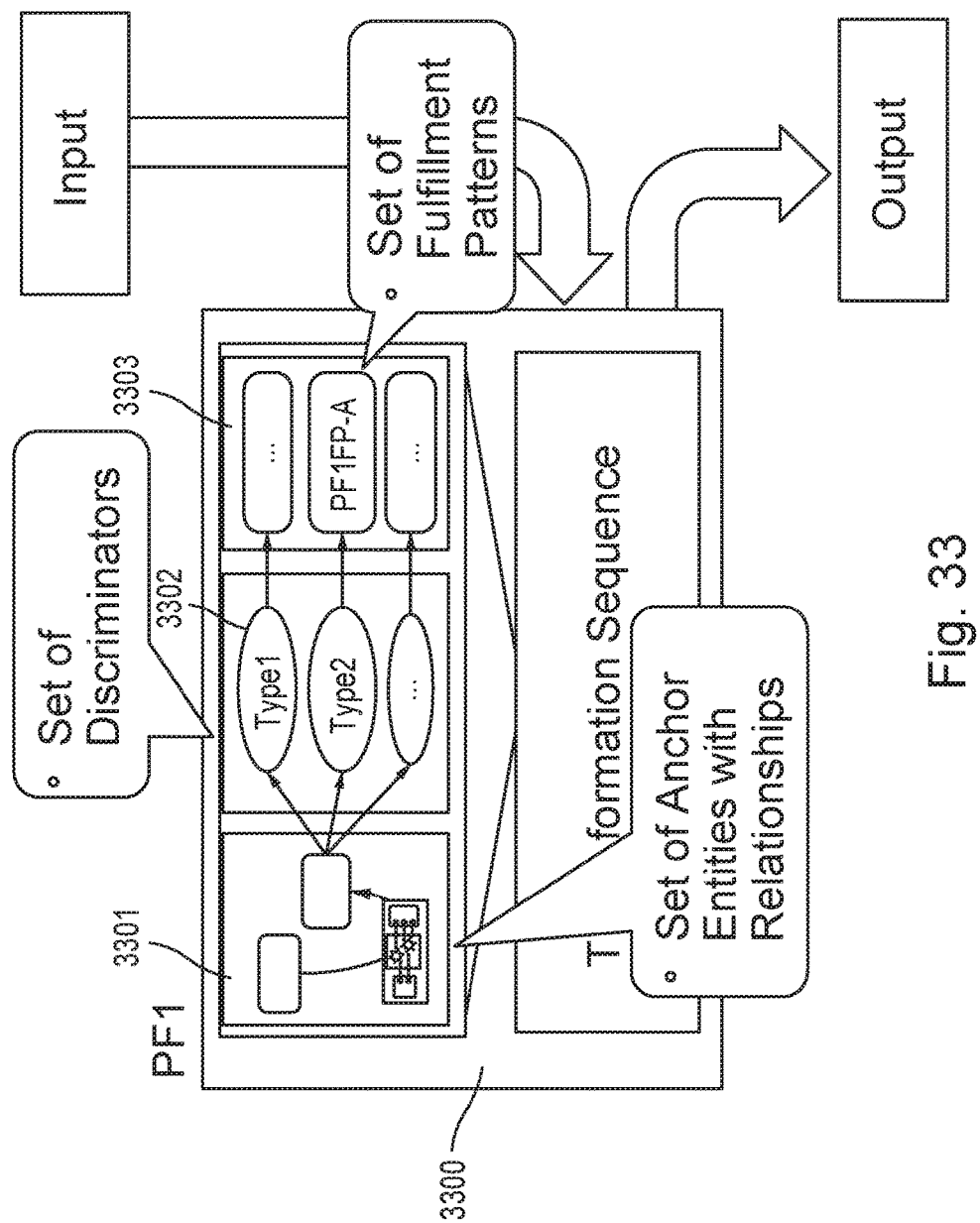
FIG. 33 illustrates metadata of an example provider function, according to an embodiment of the invention.

FIG. 33 illustrates metadata of an example provider function 3300, according to an embodiment of the invention. According to the embodiment, metadata of provider function 3300 can be in one of three categories: entities 3301, discriminators 3302, and fulfillment patterns 3303. Entities 3301 are entities that include metadata that defines a capability that is provided. In certain embodiments, entities 3301 can include at least one of: a product specification, a customer-facing service specification, a resource-facing service specification, or a resource specification. According to the embodiment, a product specification includes metadata that defines a product that is provided, a customer-facing service specification includes metadata that defines a customer-facing service that is provided, a resource-facing service specification includes metadata that defines a resource-facing service that is provided, and a resource specification includes metadata that defines a resource that is provided. Further, entities 3301 can optionally include one or more relationships or one or more mappings, where a relationship includes metadata that defines an association between a first entity and a second entity, and a mapping includes metadata that defines an association between a first entity, one or more attributes of the first entity, or one or more attribute values of the first entity, and a second entity, one or more attributes of the second entity, or one or more attribute values of the second entity.

Discriminators 3302 include metadata that define variants that can be used to select a fulfillment pattern from one or more fulfillment patterns. Discriminators 3302 can define request types or modes. Each discriminator of discriminators 3302 can be associated with a fulfillment pattern.

Fulfillment patterns 3303 include metadata that defines a set of one or more fulfillment functions and one or more dependencies. Thus, fulfillment patterns are process flow declarations that can be considered abstractions of static process flows. This can provide for a declaration of process flow that is more scalable. According to the embodiment provider function 3300 can dynamically generate a fulfillment flow based on a selected fulfillment pattern. The dynamic generation of a fulfillment flow from a selected fulfillment pattern is further described in greater detail in conjunction with FIG. 35. Thus, a combination of one or more entity instances of entities 3301, along with a discriminator of discriminators 3302, results in a selection of a fulfillment pattern of fulfillment patterns 3303. Further, the selection of a fulfillment pattern of fulfillment patterns 3303 ultimately determines a behavior of a transformation sequence of provider function 3300. More specifically, the selected fulfillment pattern of fulfillment patterns 3303 is applied to a selected transformation sequence of provider function 3300 to dynamically generate a runtime process flow. A transformation sequence is further described in greater detail in conjunction with FIG. 34.

Figure 34:
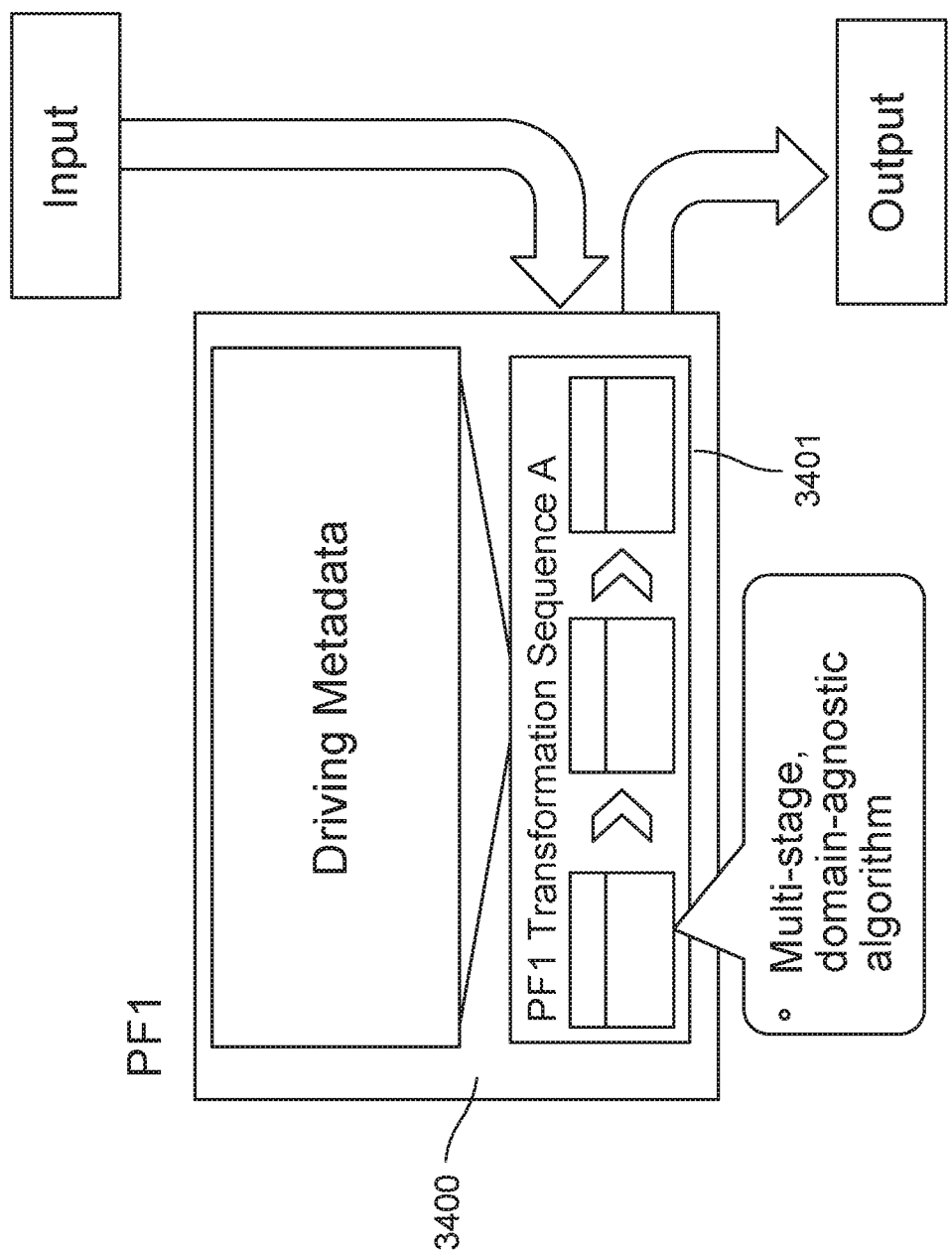
FIG. 34 illustrates a transformation sequence of an example provider function, according to an embodiment of the invention.

FIG. 34 illustrates a transformation sequence of an example provider function 3400, according to an embodiment of the invention. According to the illustrated embodiment, a transformation sequence of provider function 3400 is a multi-stage domain-agnostic algorithm, or process logic, that can be designed to operate on any type of logical input, such as an order. Because the process logic is structured into one or more stages, the process logic of each stage of the transformation sequence can operate on different sections of the information model within each stage. Thus, a complex transformation can be broken down into one or more simpler (and more stable) stages. This can make provider function 3400 relatively insensitive to a redefinition of a domain model, as provider function 3400 can be coded for stable patterns, rather than the richness of a full complex sequence of instances. Further, by structuring a transformation sequence as discrete stages, the discrete stages can be combined to support complex transformations.

Figure 35:
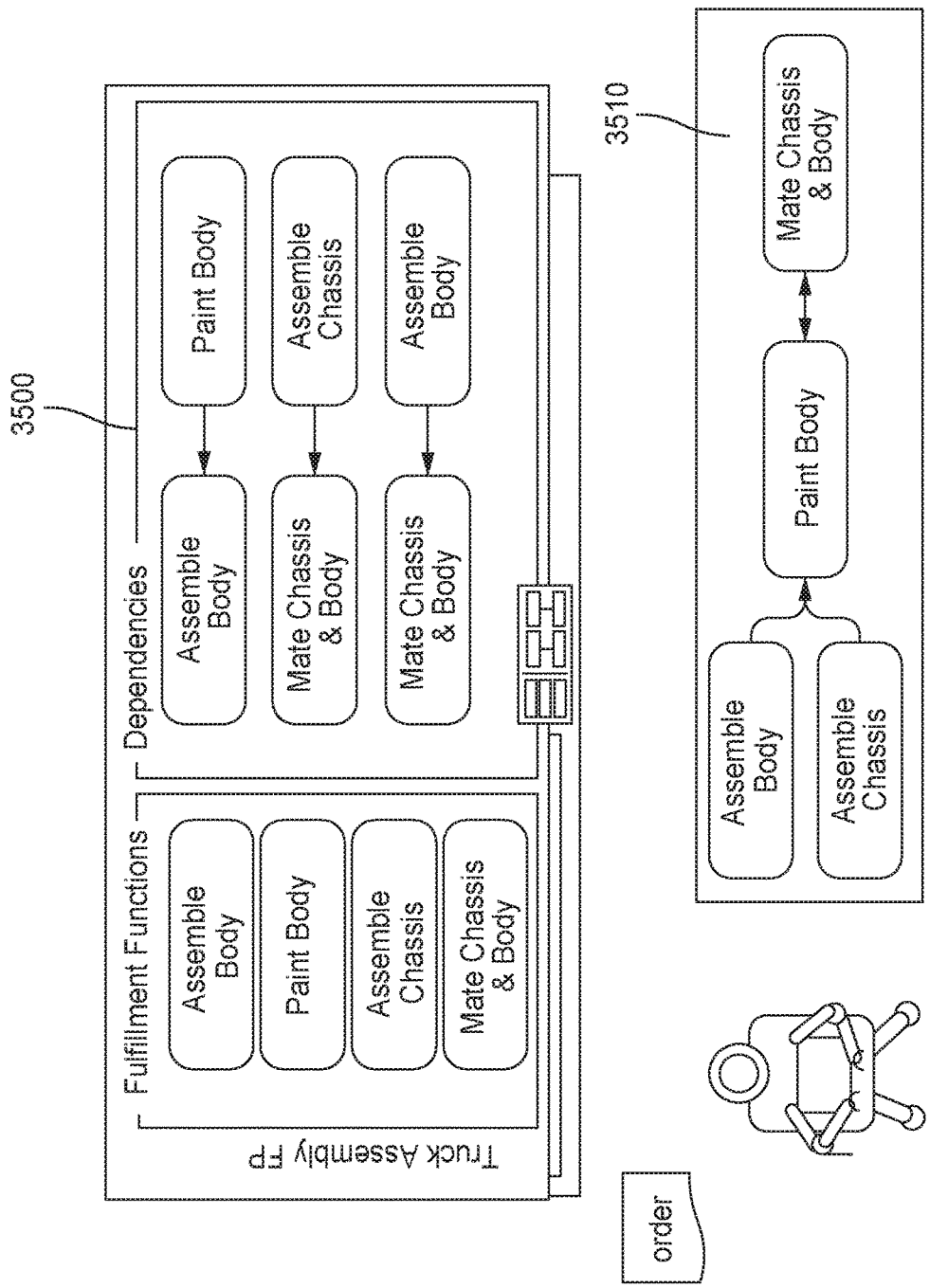
FIG. 35 illustrates an example fulfillment flow for a provider function, where the fulfillment flow is dynamically generated from a fulfillment pattern, according to an embodiment of the invention.

FIG. 35 illustrates an example fulfillment flow 3510 for a provider function, where fulfillment flow 3510 is dynamically generated from a fulfillment pattern 3500, according to an embodiment of the invention. Fulfillment pattern 3500 defines a set of one or more fulfillment functions and one or more dependencies for a provider function. According to the embodiment, the provider function can evaluate the dependencies of fulfillment pattern 3500, and dynamically generate fulfillment flow 3510 based on fulfillment pattern 3500.

Figure 36:
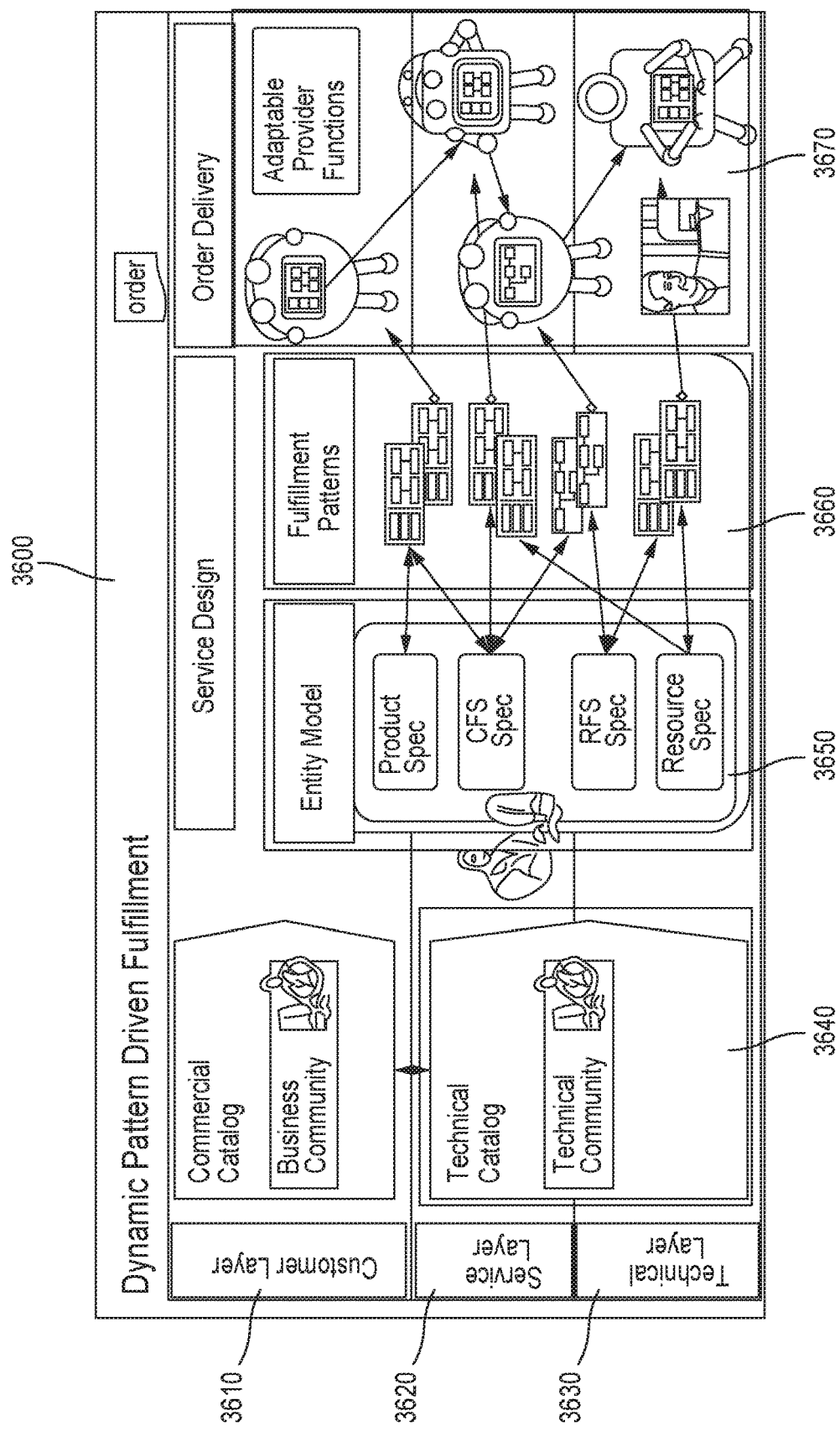
FIG. 36 illustrates a service design and order fulfillment system that utilizes a plurality of provider functions, according to an embodiment of the invention.

FIG. 36 illustrates a service design and order fulfillment system 3600 that utilizes a plurality of provider functions, according to an embodiment of the invention. According to the embodiment, service design and order fulfillment system 3600 can provide order fulfillment through a complex fulfillment solution that can utilize multiple order subject transformations via a set of one or more order layers (i.e., customer layer 3610, 3620, and 3630). Service design and order fulfillment system 3600 can break down the complex functionality of the fulfillment solution through a plurality of provider functions. More specifically, service design and order fulfillment system 3600 can utilize a technical catalog 3640. Technical catalog 3640 includes an entity model 3650 that includes one or more entities (such as one or more product specifications, one or more customer-facing service specifications, one or more resource-facing service specifications, or one or more resource specifications). Technical catalog 3640 further includes a fulfillment pattern set 3660 that includes one or more fulfillment patterns, where the one or more fulfillment patterns are mapped to the one or more entities of entity model 3650. Service design and order fulfillment system 3600 can further dynamically generate a provider function set 3670, where each provider function of provider function set 3670 is a component of an overall fulfillment solution configured to fulfill an order.

According to the embodiment, each provider function of provider function set 3670 can be defined with an input and an output and can be defined to be service-agnostic. In some embodiments, each provider function of provider function set 3670 can also be action-agnostic. The one or more provider functions of provider function set 3670 can adapt to a context through the use of one or more fulfillment patterns of fulfillment pattern set 3660 defined within technical catalog 3640. More specifically, each provider function of provider function set 3670 can be fitted with one or more fulfillment patterns of fulfillment pattern set 3660. When an order is received, each provider function can read a requested action contained within the order, and determine which fulfillment pattern(s) to apply based on the requested action plus other optional context. The actual fulfillment work can be composed and executed dynamically from the selected fulfillment pattern(s) through generating a fulfillment flow based on the selected fulfillment pattern(s).

Figure 37:
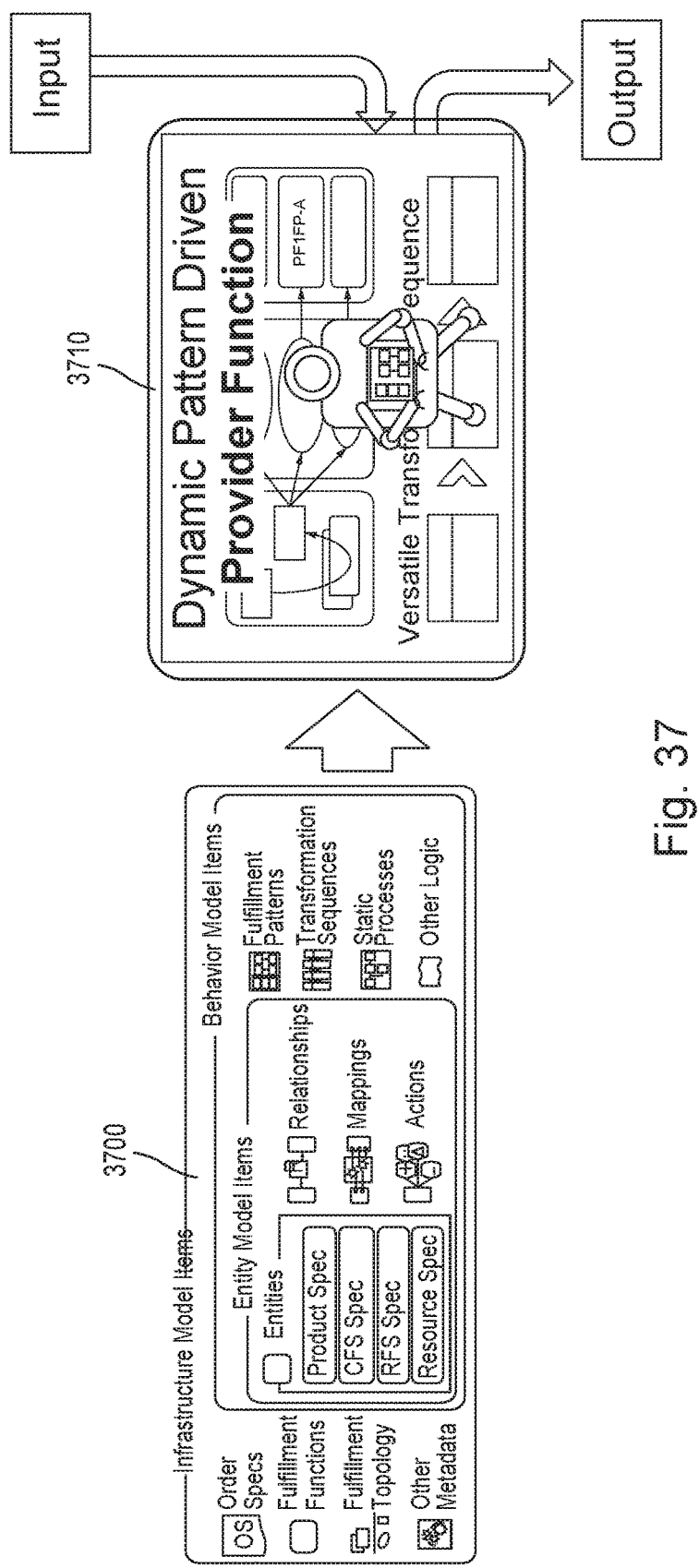
FIG. 37 illustrates a provider function that utilizes one or more items of a technical catalog, according to an embodiment of the invention.

FIG. 37 illustrates a provider function 3710 that utilizes one or more items of a technical catalog 3700, according to an embodiment of the invention. According to the embodiment, provider function 3710 can select one or more items from technical catalog to define the metadata of provider function 3710. Thus, by creating new items within technical catalog 3700, or by modifying or deleting existing items within technical catalog 3700, a provider function designer can modify the behavior of provider function 3710.

Figure 38:
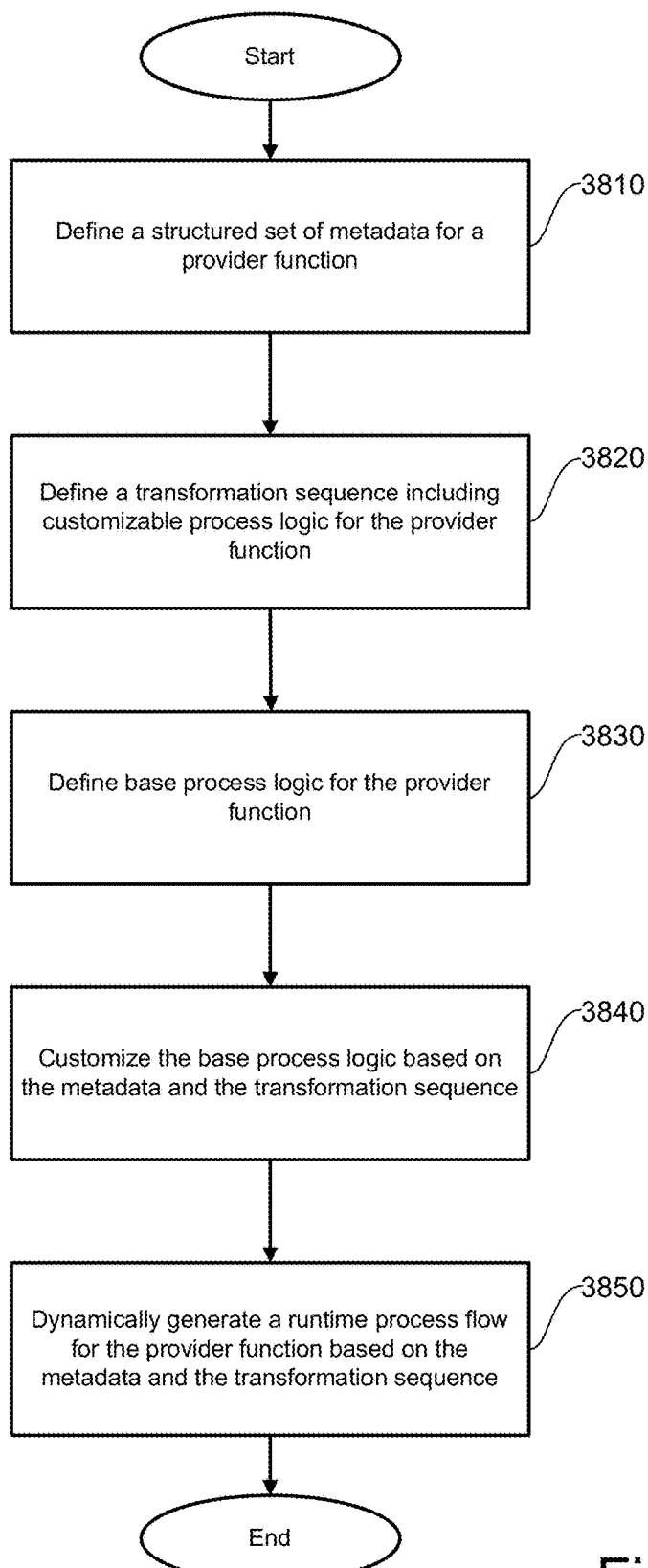
FIG. 38 illustrates another flow diagram of the functionality of a service design and order fulfillment module, according to another embodiment of the invention.

FIG. 38 illustrates another flow diagram of the functionality of a service design and order fulfillment module, according to another embodiment of the invention. The flow begins and proceeds to 3810. At 3810, a structured set of metadata is defined for a provider function. In certain embodiments, the metadata includes one or more entities including metadata that defines a capability that is provided. In some of these embodiments, the metadata further includes one or more relationships including metadata that defines an association between a first entity and a second entity. In some of these embodiments, the metadata further includes one or more mappings including metadata that defines a first entity, one or more attributes of the first entity, or one or more attribute values of the first entity and a second entity, one or more attributes of the second entity, or one or more attribute values of the second entity. In some of these embodiments, the metadata further includes one or more discriminators including metadata that defines one or more variants used to select a fulfillment pattern from one or more fulfillment patterns. In some of these embodiments, the metadata further includes one or more fulfillment patterns including metadata that defines a set of one or more fulfillment functions and one or more dependencies. Additionally, in certain embodiments, the defining the structured set of metadata further includes defining a plurality of structured sets of metadata for the provider function, and selecting a structured set of metadata from the plurality of structured sets of metadata.

Further, in certain embodiments, the metadata is retrieved from a technical catalog, such as a technical catalog 211 of FIG. 2. In some of these embodiments, the one or more entities of the metadata includes at least one of: a product specification including metadata that defines a product that is provided; a customer-facing service specification including metadata that defines a customer-facing service that is provided; a resource-facing service specification including metadata that defines a resource-facing service that is provided; or a resource specification including metadata that defines a resource that is provided. The flow then proceeds to 3820.

At 3820, a transformation sequence including customizable process logic is defined for the provider function. The customizable process logic is structured within one or more stages. In certain embodiments, the defining the transformation sequence further includes defining a plurality of transformation sequences for the provider function, and selecting a transformation sequence from the plurality of transformation sequences. The flow then proceeds to 3830.

At 3830, base process logic is defined for the provider function. The flow then proceeds to 3840.

At 3840, the base process logic is customized based on the metadata and the transformation sequence. The flow then proceeds to 3850.

At 3850, a runtime process flow is dynamically generated for the provider function based on the metadata and the transformation sequence. In certain embodiments, the dynamically generating the runtime process flow further includes selecting at least one fulfillment pattern from the one or more fulfillment patterns based on at least one entity from the one or more entities and at least one discriminator from the one or more discriminators, and generating a fulfillment flow based on the at least one selected fulfillment pattern.

Further, in certain embodiments, the provider function is a component of a fulfillment solution including a metadata-driven executable process that fulfills an order. In some of these embodiments, the order is an order for communication services. The flow then ends.

Thus, in one embodiment, a service design and order fulfillment system can utilize one or more adaptable provider functions, where the one or more provider functions can serve as components of an overall fulfillment solution. Thus, rather than continually refactoring code to support more product offerings, services, technologies, and devices, core functionality can be provided out-of-the-box and adapted to variant requirements through a simple and reliable process of defining fulfillment patterns. Additional variants can be accommodated by reusing existing patterns or by adding new patterns. This can eliminate service design complexity, can eliminate a need to build different "stacks" for different services/technologies, and can localize the impact of any change to an implementation of one or more provider function fulfillment patterns.

According to another embodiment, a service design and order fulfillment system can provide a service order calculation provider function that derives orders for a wide range of communications/information services based on orders for commercial offers. The service order calculation provider function can be highly configurable using business-meaningful metadata, which can maximize business agility. The output of the service order calculation provider function can have the form and semantics of a service order, as previously described. The structure and behavior of the service order calculation provider function can be described in terms of a pattern or template that can be transformed into process logic, as previously described. Further, the components of driving metadata of the service order calculation provider function, as well as the subject of the output of the service order calculation provider function, can be defined within a technical catalog, as previously described.

Figure 39:
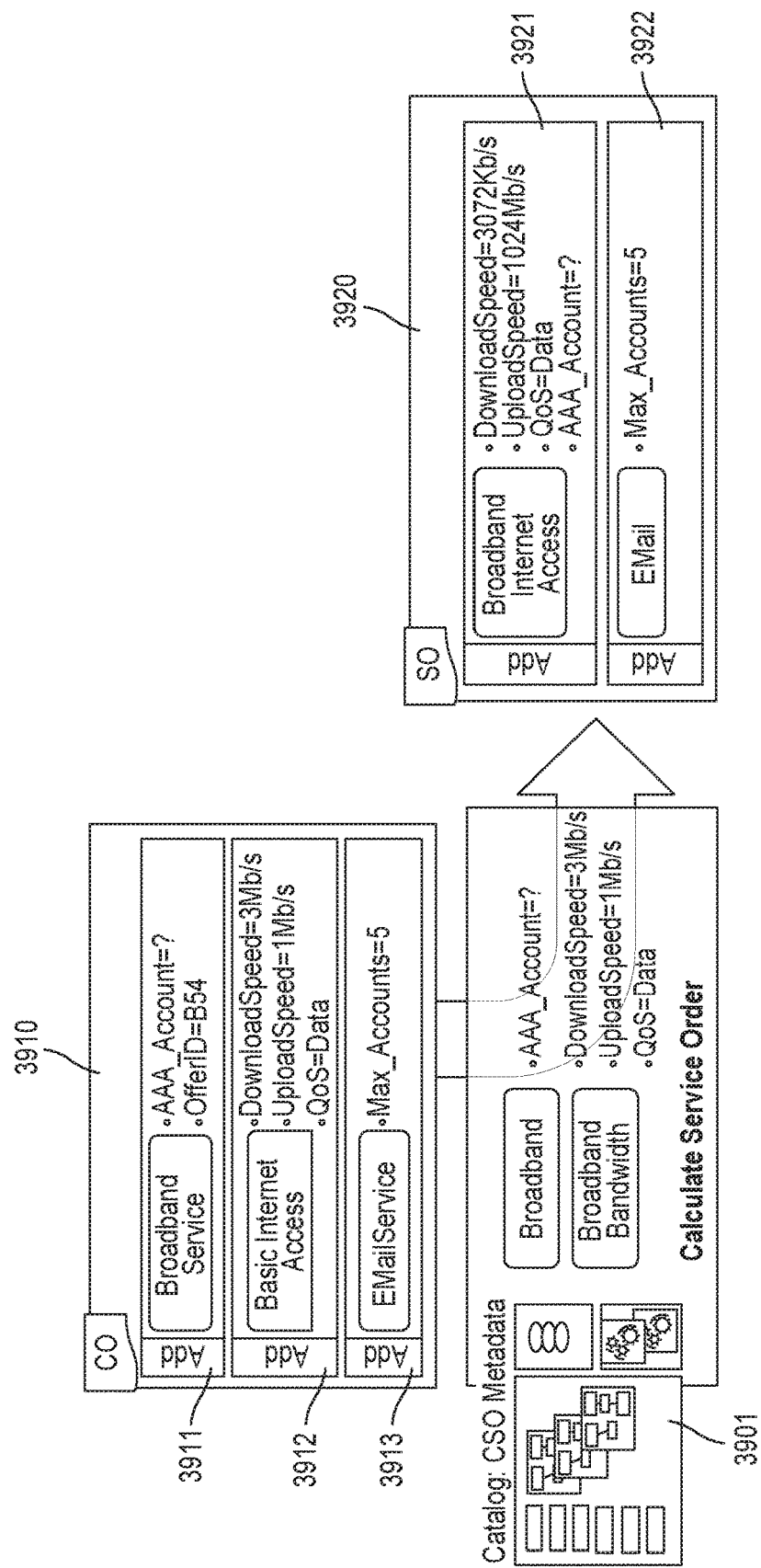
FIG. 39 illustrates an example service order calculation provider function that transforms a customer order into a service order, according to an embodiment of the invention.

FIG. 39 illustrates an example service order calculation provider function 3900 that transforms a customer order 3910 into a service order 3920, according to an embodiment of the invention. According to the embodiment, service order calculation provider function 3900 can include metadata, where the metadata can be retrieved from technical catalog 3901. The metadata can include one or more product specifications, one or more customer-facing service specifications, one or more relationships, and one or more mappings.

Further, according to the embodiment, service order calculation provider function 3900 can receive customer order 3910, where customer order 3910 includes customer order lines 3911, 3912, and 3913. In the illustrated embodiments, customer order line 3911 includes a product action on product offering 1500 of FIG. 15 ("Broadband Service"), customer order line 3912 includes a product action on simple offering 1501 of FIG. 15 ("Basic Internet Access"), and customer order line 3913 includes a product action on simple offering 1502 of FIG. 15 ("EMailService"). Based on the metadata retrieved from technical catalog 3901, service order calculation provider function 3900 can map product offering 1500 of FIG. 15 to product specification 1510 of FIG. 15 ("Broadband"), can map simple offering 1501 of FIG. 15 to product specification 1511 of FIG. 15 ("Broadband Bandwidth"), and can map simple offering 1502 of FIG. 15 to product specification 1512 of FIG. 15 (not illustrated in FIG. 39).

According to the embodiment, service order calculation provider function 3900 can further generate service order 3920, transform customer order lines 3911, 3912, and 3913 into service order lines 3921 and 3922, and package service order lines 3921 and 3922 within service order 3920. As part of the transformation, and based on the metadata retrieved from technical catalog 3901, service order calculation provider function 3900 can map product specifications 1510 and 1511 of FIG. 15 to customer-facing service specification 1520 of FIG. 15 ("Broadband Internet Access"), and can map product specification 1512 of FIG. 15 to customer-facing service specification 1521 of FIG. 15 ("Email"). Also, as part of the transformation, service order calculation provider function 3900 can generate service order lines 3921 and 3922, where service order line 3921 includes a service action on a customer-facing service that is based on customer-facing service specification 1520 of FIG. 15 ("Broadband Internet Access"), and where service order line 3922 includes a service action on a customer-facing service that is based on customer-facing service specification 1521 of FIG. 15 ("Email"). According to the embodiment, the product action of customer order line 3911 and the product action of customer order line 3912 can be transformed into a service action of service order line 3921, and the product action of customer order line 3913 can be transformed into a service action of service order line 3922.

Figure 40:
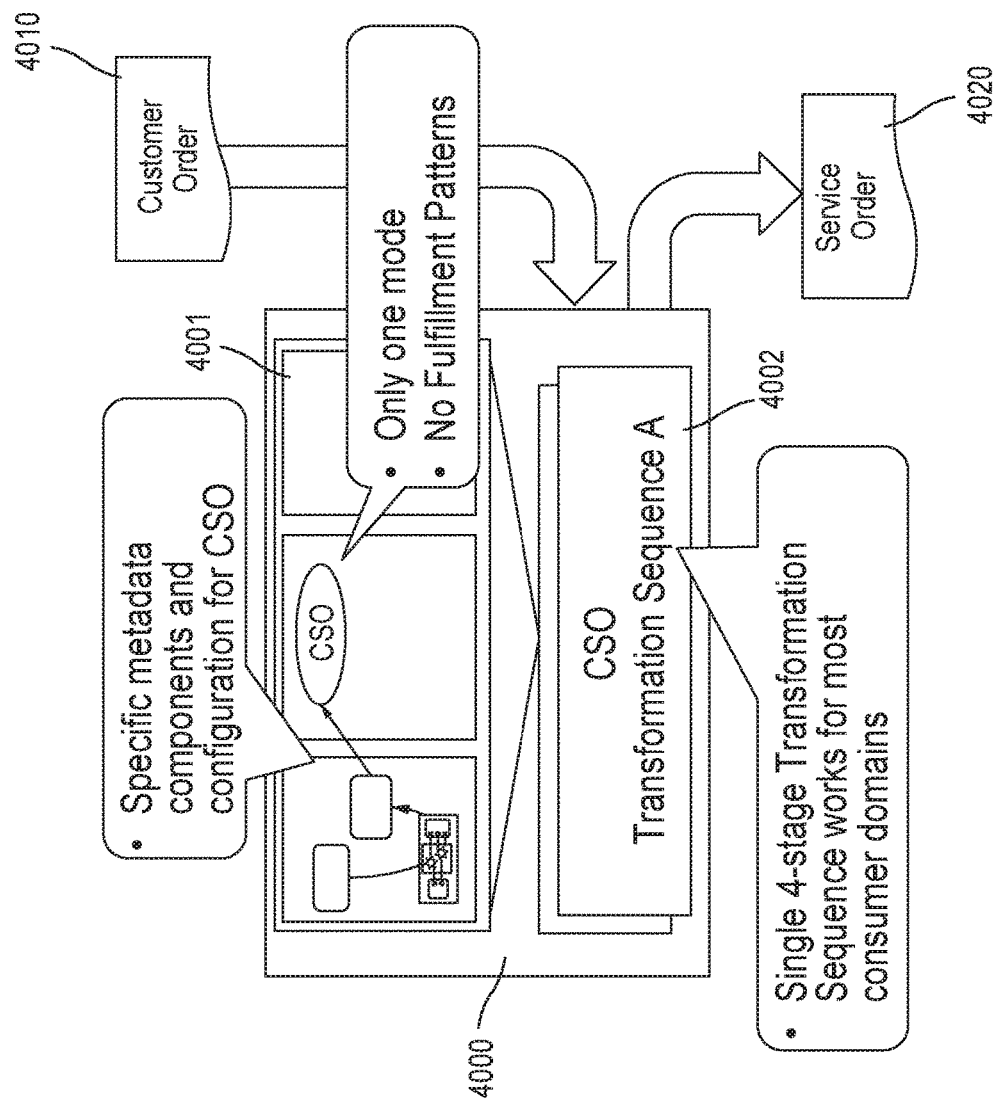
FIG. 40 illustrates an example service order calculation provider function, according to an embodiment of the invention.

FIG. 40 illustrates an example service order calculation provider function 4000, according to an embodiment of the invention. Service order calculation provider function 4000 is a logical component of a fulfillment solution that offers a capability of transforming a customer order into a service order, where service order calculation provider function 4000 acts upon customer order 4010 to generate service order 4020. In certain embodiments, service order calculation provider function 4000 follows a pattern-driven fulfillment model.

According to the embodiment, service order calculation provider function 4000 includes metadata 4001 and a transformation sequence 4002. Metadata 4001 includes a structured set of metadata, and transformation sequence 4002 includes a set of customizable process logic that is designed to be customized by metadata 4001, where the customizable process logic is structured within one or more stages. In certain embodiments, metadata 4001 includes a plurality of structured sets of metadata, where a set of metadata can be selected. Further, in certain embodiments, transformation sequence 4002 includes a plurality of sets of customizable process logic, where a set of customizable process logic can be selected. Additionally, in certain embodiments, service order calculation provider function 4000 includes a base application (not illustrated in FIG. 40), where the base application includes base process logic that can be configured by metadata 4001, and that can select transformation sequence 4002 to transform a customer order into a service order.

In certain embodiments, metadata 4001 can be defined to include a specifically structured set of specific metadata that is configured for transforming a customer order into a service order. Such metadata can include one or more product specifications, one or more customer-facing service specifications, one or more relationships between a product specification and a customer-facing service specification, or one or more mappings between one or more attributes of a product specification and one or more attributes of a customer-facing service specification. A relationship between a product specification and a customer-facing service specification can be used to map the product specification to the customer-facing service specification. More specifically, a relationship can be used to map one or more attributes of the product specification to one or more attributes of the customer-facing service specification via one or more mappings. A relationship between a product specification and a customer-facing service specification can be a primary relationship or it can be an auxiliary relationship. A primary relationship is a relationship that can be used to create a new service order line with a new customer-facing service specification based on an existing customer order line with an existing product specification. An auxiliary relationship is a relationship that can be used to modify an existing service order line with an existing customer-facing service specification based on an existing customer order line with an existing product specification.

In some of these embodiments, the metadata of metadata 4001 can further include a single discriminator, and may not include any fulfillment patterns. Further, in embodiments where service order calculation provider function 4000 includes a base application, the base application can configure its base process logic based on the aforementioned metadata. The aforementioned metadata is further described below in greater detail in conjunction with FIG. 41.

Further, in certain embodiments, transformation sequence 4002 can include a single four-stage transformation sequence configured to transform one or more customer order lines of a customer order to one or more service order lines of a service order. In embodiments where service order calculation provider function 4000 includes a base application, the base application can configure its base process logic to select the aforementioned transformation sequence. The aforementioned transformation sequence is further described below in greater detail in conjunction with FIG. 41.

Figure 41:
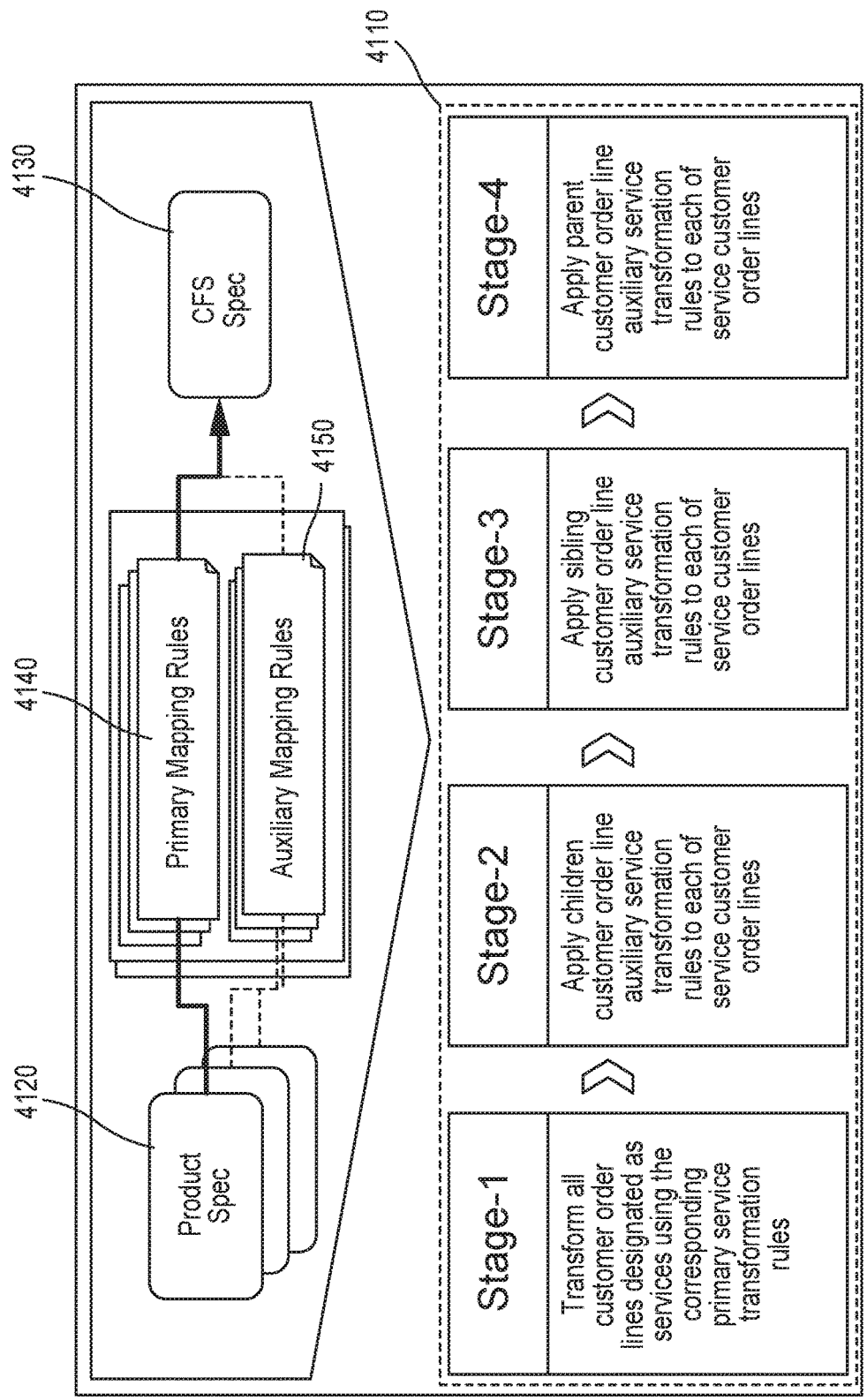
FIG. 41 illustrates an example transformation sequence that transforms a customer order into a service order, according to an embodiment of the invention.

FIG. 41 illustrates an example transformation sequence 4110 that transforms a customer order into a service order, according to an embodiment of the invention. As previously described, a transformation sequence (such as transformation sequence 4110) can break down a complex transformation (such as transforming a customer order into a service order) into a sequence of one or more stages. Each stage can receive an input, can process the input, and can generate an output. Further, the processing the input can include at least a portion of the transformation, and a final stage can generate the final output (such as a service order). Even further, each stage can be identified as a transformation stage.

In the illustrated embodiment, transformation sequence 4110 is a single four-stage transformation sequence configured to transform one or more customer order lines of a customer order to one or more service order lines of a service order. However, this is an example embodiment, and in alternate embodiments, a transformation sequence that can be used to transform a customer order into a service order can have any number of stages.

According to the illustrated embodiment, transformation sequence 4110 can utilize metadata that includes one or more product specifications (identified in FIG. 41 as product specification 4120), one or more customer-facing service specifications (identified in FIG. 41 as customer-facing service specification 4130), one or more primary relationships and mappings between product specification 4120 and customer-facing service specification 4130 (identified in FIG. 41 as primary mapping rules 4140), and one or more auxiliary relationships and mappings between product specification 4120 and customer-facing service specification 4130 (identified in FIG. 41 as auxiliary mapping rules 4150).

According to the illustrated embodiment, in a first stage of transformation sequence 4110 (illustrated in FIG. 41 as "Stage-1"), one or more customer order lines can be transformed to one or more service order lines using one or more primary service transformation rules. The one or more primary service transformation rules can be based on primary mapping rules 4140, and can transform a product specification on a customer order line to a customer-facing service specification on a service order line.

In a second stage of transformation sequence 4110 (illustrated in FIG. 41 as "Stage-2"), one or more children customer order line auxiliary service transformation rules can be applied to modify one or more service order lines. The one or more children customer order line auxiliary service transformation rules can be based on auxiliary mapping rules 4150, and can modify one or more attributes of a customer-facing service specification on a service order line based on one or more attributes of a product specification on a corresponding customer order line. In certain embodiments, the one or more children customer order line auxiliary service transformation rules can be used to modify one or more attributes of a customer-facing service specification on a service order line based on one or more attributes of a product specification on a customer order line that is a child of a corresponding customer order line.

In a third stage of transformation sequence 4110 (illustrated in FIG. 41 as "Stage-3"), one or more sibling customer order line auxiliary service transformation rules can be applied to modify one or more service order lines. The one or more sibling customer order line auxiliary service transformation rules can be based on auxiliary mapping rules 4150, and can modify one or more attributes of a customer-facing service specification on a service order line based on one or more attributes of a product specification on a corresponding customer order line. In certain embodiments, the one or more children customer order line auxiliary service transformation rules can be used to modify one or more attributes of a customer-facing service specification on a service order line based on one or more attributes of a product specification on a customer order line that is a sibling of a corresponding customer order line.

In a fourth stage of transformation sequence 4110 (illustrated in FIG. 41 as "Stage-4"), one or more parent customer order line auxiliary service transformation rules can be applied to modify one or more service order lines. The one or more parent customer order line auxiliary service transformation rules can be based on auxiliary mapping rules 4150, and can modify one or more attributes of a customer-facing service specification on a service order line based on one or more attributes of a product specification on a corresponding customer order line. In certain embodiments, the one or more children customer order line auxiliary service transformation rules can be used to modify one or more attributes of a customer-facing service specification on a service order line based on one or more attributes of a product specification on a customer order line that is a parent of a corresponding customer order line.

FIG. 42 illustrates an example transformation rule set 4200, according to an embodiment of the invention. According to the embodiment, transformation rule set 4200 includes transformation rule subsets 4210, 4220, and 4230. Transformation rule subset 4210 includes the attribute-value transformation rule, "CFS.AAA Account=PS.AAA Account." This attribute-value transformation rule maps an "AAA Account" attribute of a customer-facing service specification to an "AAA Account" attribute of a corresponding product specification. The attribute-value transformation rule is a primary transformation rule. Further, the attribute-value transformation rule applies to product specification 1510 of FIG. 15 ("Broadband PS") and customer-facing service specification 1520 of FIG. 15 ("Broadband Internet Access CFSS").

Transformation rule subset 4220 includes the following attribute-value transformation rules: "CFS.Download Speed.3072=PS.Download Speed.3 Mbps;" "CFS.Download Speed.5120=PS.Download Speed.5 Mbps;" "CFS.Download Speed.15360=PS.Download Speed.15 Mbps;" and "CFS.Upload Speed.1024=PS.Upload Speed.1 Mbps." The attribute-value transformation rule, "CFS.Download Speed.3072=PS.Download Speed.3 Mbps," modifies a "Download Speed" attribute of a customer-facing service specification to a value of "3072," when a "Download Speed" attribute of a corresponding product specification has a value of "3 Mbps." The attribute-value transformation rule, "CFS.Download Speed.5120=PS.Download Speed.5 Mbps," modifies a "Download Speed" attribute of a customer-facing service specification to a value of "5120," when a "Download Speed" attribute of a corresponding product specification has a value of "5 Mbps." The attribute-value transformation rule, "CFS.Download Speed.15360=PS.Download Speed.15 Mbps," modifies a "Download Speed" attribute of a customer-facing service specification to a value of "15360," when a "Download Speed" attribute of a corresponding product specification has a value of "15 Mbps." The attribute-value transformation rule, "CFS.Upload Speed.1024=PS.Upload Speed.1 Mbps," modifies an "Upload Speed" attribute of a customer-facing service specification to a value of "1024," when an "Upload Speed" attribute of a corresponding product specification has a value of "1 Mbps." These four attribute-value transformation rules are auxiliary transformation rules. Further, the four attribute-value transformation rules apply to product specification 1511 of FIG. 15 ("Bandwidth PS"), and customer-facing service specification 1520 of FIG. 15 ("Broadband Internet Access CFSS").

Transformation rule subset 4230 includes the attribute-value transformation rule, "CFS.Maximum Number of Accounts=PS.Maximum Number of Accounts." This attribute-value transformation rule maps a "Maximum Number of Accounts" attribute of a customer-facing service specification to a "Maximum Number of Accounts" attribute of a corresponding product specification. The attribute-value transformation rule is a primary transformation rule. Further, the attribute-value transformation rule applies to product specification 1512 of FIG. 15 ("Email Service PS") and customer-facing service specification 1521 of FIG. 15 ("Email CFSS").

Thus, according to the embodiment, a modification to a product offering (such as a new bundled offering) does not require modifications to the process logic of a transformation sequence of a service order calculation provider function, as the process logic of the transformation sequence is configured by the metadata of the service order calculation provider function (which can be expressed in one or more transformation rules). Thus, a transformation sequence can be decoupled from one or more commercial offerings.

Figure 43:
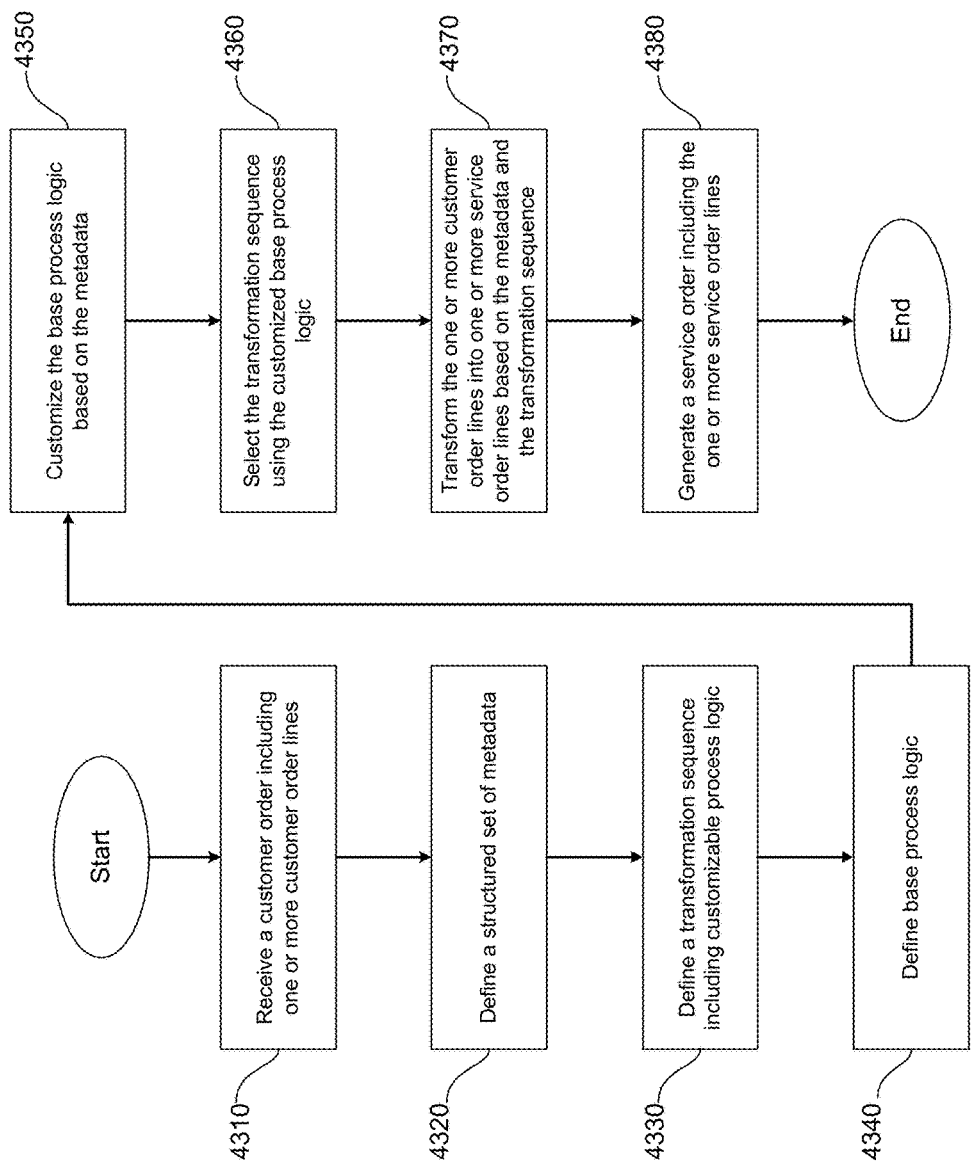
FIG. 43 illustrates another flow diagram of the functionality of a service design and order fulfillment module, according to another embodiment of the invention.

FIG. 43 illustrates another flow diagram of the functionality of a service design and order fulfillment module, according to another embodiment of the invention. The flow begins and proceeds to 4310. At 4310, a customer order is received, where the customer order includes one or more customer order lines. Each customer order line can include a product action and a product offering based on a product specification, where, in certain embodiments, a product specification can include metadata that defines a product that is provided. The flow then proceeds to 4320.

At 4320, a structured set of metadata is defined. The structured set of metadata includes one or more product specifications, one or more customer-facing service specifications, one or more relationships, and one or more mappings. In certain embodiments, each product specification can include metadata that defines a product that is provided, each customer-facing service specification can include metadata that defines a customer-facing service that is provided b, each relationship can include metadata that defines an association between a product specification and a customer-facing service specification, and each mapping can include metadata that defines an association between a product specification, one or more attributes of the product specification, or one or more attribute values of the product specification, and a customer-facing service specification, one or more attributes of the customer-facing service specification, or one or more attribute values of the customer-facing service specification.

Further, in certain embodiments, the one or more relationships can include at least one of: a primary relationship used to create a new service order line including a new customer-facing service specification based on an existing customer order line including an existing product specification; or an auxiliary relationship used to modify an existing service order line including an existing customer-facing service specification based on an existing customer order line including an existing product specification. The flow then proceeds to 4330.

At 4330, a transformation sequence including customizable process logic is defined. The customizable process logic is structured within one or more stages. The flow then proceeds to 4340.

At 4340, base process logic is defined. The flow then proceeds to 4350.

At 4350, the base process logic is customized based on the metadata. The flow then proceeds to 4360.

At 4360, the transformation sequence is selected using the customized base process logic. The flow then proceeds to 4370.

At 4370, the one or more customer order lines are transformed into one or more service order lines based on the metadata and the transformation sequence. Each service order line can include a service action and a customer-facing service based on a customer-facing service specification, where, in certain embodiments, the customer-facing service specification can include metadata that defines a customer-facing service that is provided. In certain embodiments, each product action of a customer order line is transformed into a service action of a service order line.

In certain embodiments, the transformation sequence includes four stages, and the transforming the one or more customer order lines into the one or more service order lines involves the following. In a first stage of the transformation sequence, the one or more customer order lines can be transformed into one or more service order lines using one or more primary service transformation rules. In certain embodiments, the one or more primary service transformation rules can transform a product specification on a customer order line to a customer-facing service specification on a service order line.

In a second stage of the transformation sequence, the one or more service order lines can be modified using one or more children customer order line auxiliary service transformation rules. In certain embodiments, the one or more children customer order line auxiliary service transformation rules modify one or more attributes of a customer-facing service specification on a service order line based on one or more attributes of a product specification on a customer order line that is a child of a corresponding customer order line.

In a third stage of the transformation sequence, the one or more service order lines can be modified using one or more sibling customer order line auxiliary service transformation rules. In certain embodiments, the one or more sibling customer order line auxiliary service transformation rules can modify one or more attributes of a customer-facing service specification on a service order line based on one or more attributes of a product specification on a customer order line that is a sibling of a corresponding customer order line.

In a fourth stage of the transformation sequence, the one or more service order lines can be modified using one or more parent customer order line auxiliary service transformation rules. In certain embodiments, the one or more parent customer order line auxiliary service transformation rules can modify one or more attributes of a customer-facing service specification on a service order line based on one or more attributes of a product specification on a customer order line that is a parent of a corresponding customer order line. The flow then proceeds to 4380.

At 4380, a service order is generated, where the service order includes the one or more service order lines. In certain embodiments, the service order is an order for communication services. The flow then ends.

Thus, in one embodiment, a service design and order fulfillment system can provide a service order calculation provider function, that can transform a customer order into a service order. The service design and order fulfillment system can reduce a sensitivity of the service order calculation provider function to commercial and technical changes to limited scenarios where a new type of service is introduced. This can afford service providers a high degree of agility at a very low cost. More specifically, the creation of new bundled offering generally does not require any changes to process logic, and an introduction of a new service can be handled by simply introducing new mapping rules, as opposed to adding new process logic.

According to another embodiment, a service design and order fulfillment system can provide a technical order calculation provider function that generates a type of order (i.e., a technical order) that represents activities required to realize a design of a communications/information service. The technical order calculation provider function can decouple work to be done in a network from a service order that triggered the work. A technical order that is generated by the technical order calculation provider function can be defined in terms of one or more fulfillment actions (i.e., actions), as previously described. Further, the technical order calculation provider function can be described in terms of a pattern or template that can be transformed into process logic, as previously described. Further, the components of driving metadata of the technical order calculation provider function, as well as the subject of the output of the technical order calculation provider function, can be defined within a technical catalog, as previously described.

Figure 44:
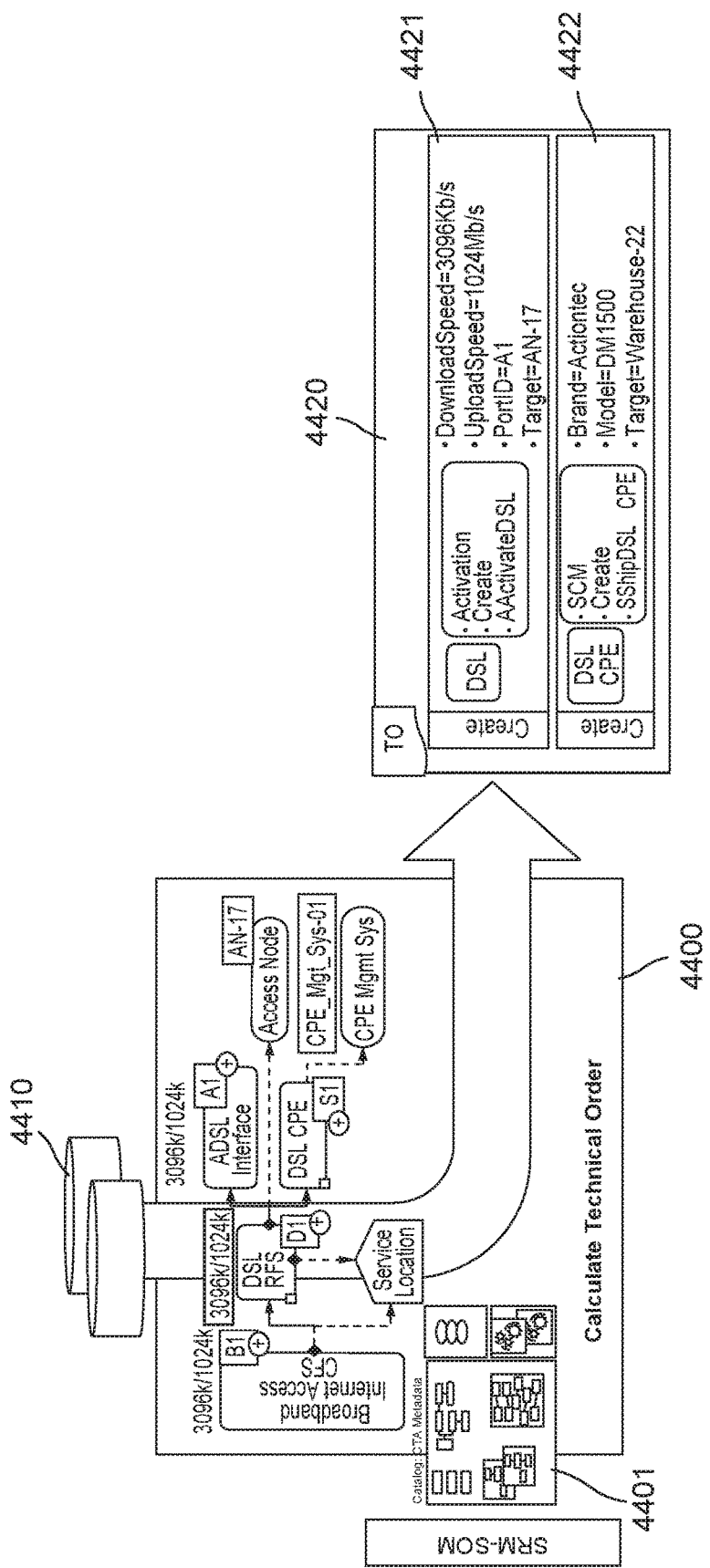
FIG. 44 illustrates an example technical order calculation provider function that generates a technical order, according to an embodiment of the invention.

FIG. 44 illustrates an example technical order calculation provider function 4400 that generates a technical order 4420, according to an embodiment of the invention. According to the embodiment, technical order calculation provider function 4400 can use metadata, where the metadata can be retrieved from technical catalog 4401. The metadata can include one or more customer-facing service specifications, one or more resource-facing service specifications, one or more resources, one or more relationships, one or more mappings, and one or more actions.

Further, according to the embodiment, technical order calculation provider function 4400 can receive service configuration 4410, where service configuration 4410 can include a configuration of one or more resource-facing services and/or one or more resources. In certain embodiments, the configuration of one or more resource-facing services and/or one or more resources can be based on an upstream service order. More specifically, a design and assign provider function can receive a service order and generate a service instance, where the service instance can include a configuration of one or more resource-facing services and/or one or more resources. In certain embodiments, the configuration of one or more resource-facing services and/or one or more resources can represent a future state of a service according to the service order. In these embodiments, technical order calculation provider function 4400 can compare the configuration of one or more resource-facing services and/or one or more resources that represents a future state of a service with a configuration of one or more resource-facing services and/or one or more resources that represents a present state of the service. In certain embodiments, the service can be a customer-facing service.

Technical order calculation provider function 4400 can further generate a configuration delta that represents a change in the configuration of one or more resource-facing services and/or one or more resources, where the change in the configuration realizes the configuration of one or more resource-facing services and/or one or more resources that represents the future state of the service. Technical order calculation provider function 4400 can further generate one or more technical actions that can effectuate the configuration delta (i.e., change the configuration of one or more resource-facing services and/or one or more resources that represents a present state of the service into the configuration of one or more resource-facing services and/or one or more resources that represents a future state of the service). In certain embodiments, at least a portion of the configuration delta can be represented using one or more parameters of a technical action. In other words, in certain embodiments, at least a portion of the change in the configuration of one or more resource-facing services and/or one or more resources is represented by a change in one or more parameter values of one or more technical actions.

According to the embodiment, technical order calculation provider function 4400 can further generate technical order 4420, generate technical order lines 4421 and 4422 based on the one or more technical actions, and package technical order lines 4421 and 4422 within technical order 4420. While two technical order lines are generated in the illustrated embodiment, in other alternate embodiments, any number of technical order lines can be generated. According to the illustrated embodiment, technical order line 4421 includes a plurality of actions on a resource-facing service that is based on resource-facing service specification 530 of FIG. 5 ("DSL"), and technical order line 4422 includes a plurality of actions on a resource that is based on resource specification 532 of FIG. 5 ("DSL CPE").

Figure 45:
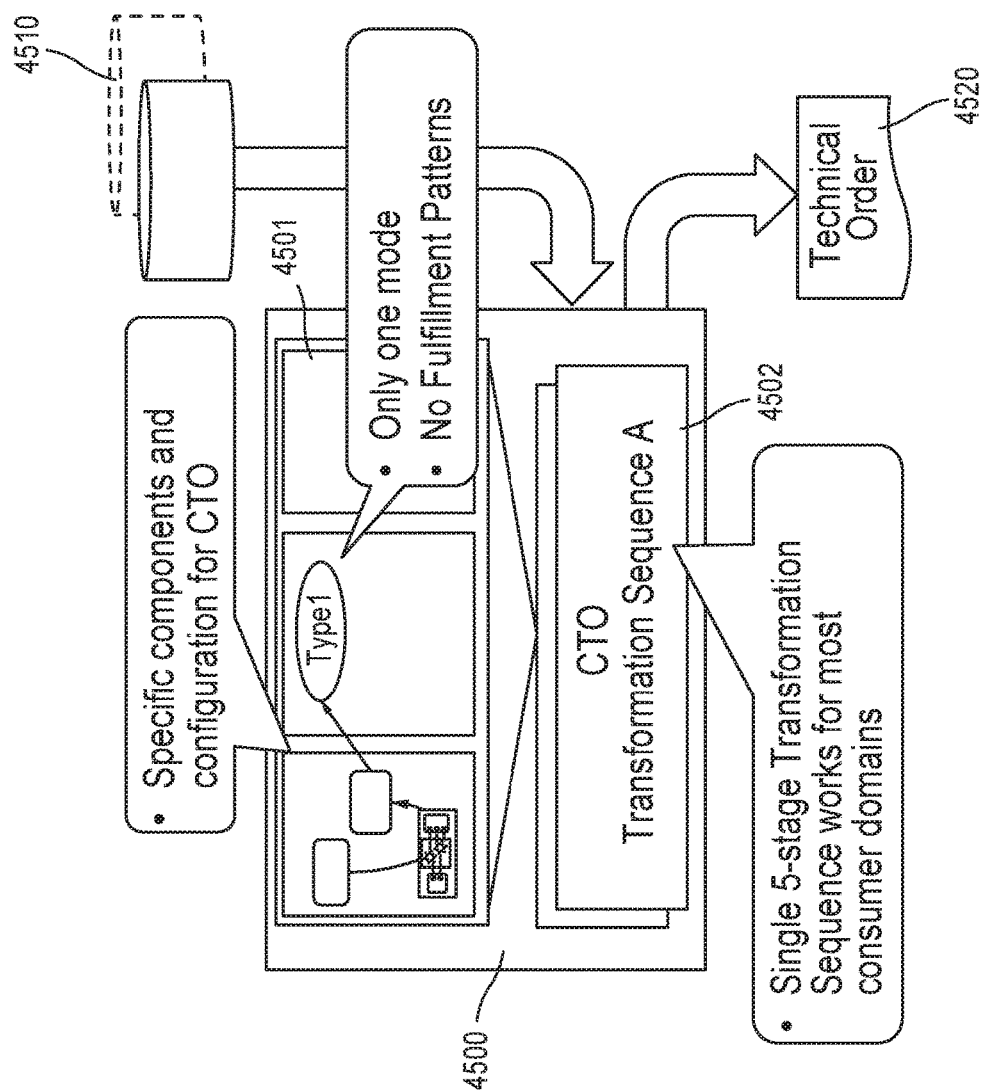
FIG. 45 illustrates an example technical order calculation provider function, according to an embodiment of the invention.

FIG. 45 illustrates an example technical order calculation provider function 4500, according to an embodiment of the invention. Technical order calculation provider function 4500 is a logical component of a fulfillment solution that offers a capability of generating a technical order, where technical order calculation provider function 4000 acts upon a service configuration 4510 to generate technical order 4520. In certain embodiments, technical order calculation provider function 4500 follows a pattern-driven fulfillment model.

According to the embodiment, technical order calculation provider function 4500 uses metadata 4501 and a transformation sequence 4502. Metadata 4501 includes a structured set of metadata, and transformation sequence 4502 includes a set of customizable process logic that is designed to be customized by metadata 4501, where the customizable process logic is structured within one or more stages. In certain embodiments, metadata 4501 includes a plurality of structured sets of metadata, where a set of metadata can be selected. Further, in certain embodiments, transformation sequence 4502 includes a plurality of sets of customizable process logic, where a set of customizable process logic can be selected. Additionally, in certain embodiments, technical order calculation provider function 4500 includes a base application (not illustrated in FIG. 45), where the base application includes base process logic that can be configured by metadata 4501, and that can select transformation sequence 4502 to generate a technical order.

In certain embodiments, metadata 4501 can be defined to include a specifically structured set of specific metadata that is configured for generating a technical order. Such metadata can include one or more resource-facing service specifications, one or more resource specifications, one or more relationships between a customer-facing service specification and either a resource-facing service specification or a resource, one or more relationships between a resource-facing service specification and a resource specification, one or more mappings between one or more attributes of a resource-facing service specification and one or more attributes of a customer-facing service specification, a resource-facing service specification or a resource specification, one or more mappings between one or more attributes of a resource specification, and one or more attributes of a customer-facing service specification, a resource-facing service specification or a resource specification, one or more technical actions on a resource-facing service specification (which can include a parameter set associated with each technical action), one or more technical actions on a resource specification (which can include a parameter set associated with each technical action), one or more parameter mappings (where a parameter mapping is a mapping from a configuration delta to a parameter of a parameter set associated with a technical action), one or more technical action recognition patterns (where a technical action recognition pattern is expressed in terms of changes to one or more parameters of a technical action that are associated with a resource-facing service specification or a resource specification through a technical action definition), one or more technical order definitions, and one or more parameter set structures (where a parameter set structure is a structure within a technical order of a parameter set of a technical action). According to the embodiment, such metadata can be used to interpret a configuration delta. Further, such metadata can be used to determine how the configuration delta can be represented within one or more technical actions. Such metadata can also be used to determine how the one or more technical actions can be formatted within one or more technical order lines of a technical order (such as technical order 4520). Further, such metadata can also be used to determine to format the one or more technical order lines of a technical order (such as technical order 4520) can be used to determine an overall format of a technical order (such as technical order 4520).

In some of these embodiments, the metadata of metadata 4501 can further include a single discriminator, and may not include any fulfillment patterns. Further, in embodiments where technical order calculation provider function 4500 includes a base application, the base application can configure its base process logic based on the aforementioned metadata. The aforementioned metadata is further described below in greater detail in conjunction with FIG. 46.

Further, in certain embodiments, transformation sequence 4502 can include a single five-stage transformation sequence configured to generate a technical order. In embodiments where technical order calculation provider function 4500 includes a base application, the base application can configure its base process logic to select the aforementioned transformation sequence. The aforementioned transformation sequence is further described below in greater detail in conjunction with FIG. 46.

Figure 46:
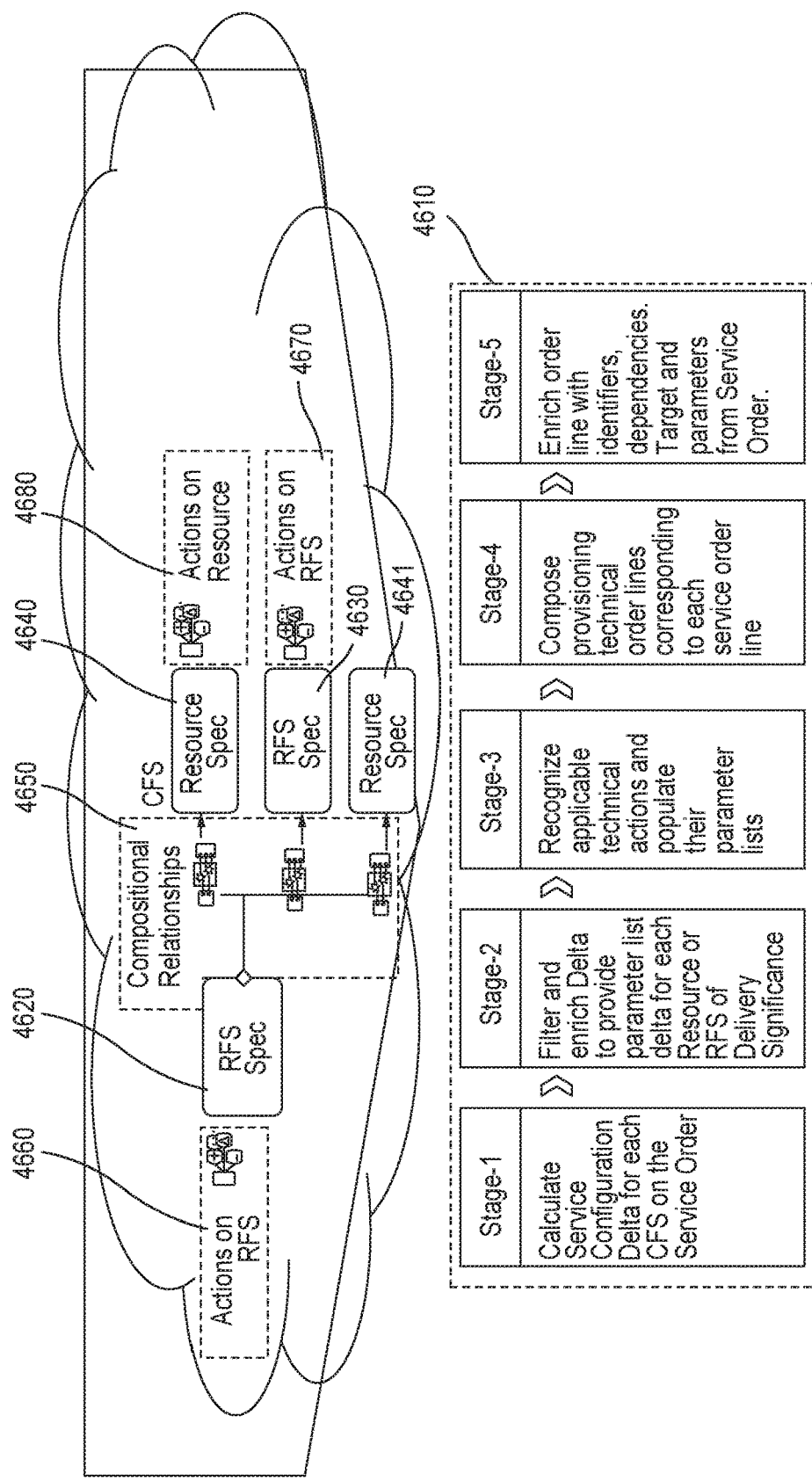
FIG. 46 illustrates an example transformation sequence that generates a technical order, according to an embodiment of the invention.

FIG. 46 illustrates an example transformation sequence that generates a technical order, according to an embodiment of the invention. As previously described, a transformation sequence (such as transformation sequence 4610) can break down a complex transformation (such as generating a technical order) into a sequence of one or more stages. Each stage can receive an input, can process the input, and can generate an output. Further, the processing the input can include at least a portion of the transformation, and a final stage can generate the final output (such as a technical order). Even further, each stage can be identified as a transformation stage.

In the illustrated embodiment, transformation sequence 4610 is a single five-stage transformation sequence configured to generate a technical order including one or more technical order lines. However, this is an example embodiment, and in alternate embodiments, a transformation sequence that can be used to generate a technical order can have any number of stages.

According to the illustrated embodiment, transformation sequence 4610 can utilize metadata that includes one or more resource-facing service specifications (identified in FIG. 46 as resource-facing service specifications 4620 and 4630), one or more resource specifications (identified in FIG. 46 as resource specifications 4640 and 4641), one or more relationships and mappings between resource-facing service specification 4620 and resource-facing service specification 4630, one or more relationships and mappings between resource-facing service specification 4620 and resource specification 4640, and one or more relationships and mappings between resource-facing service specification 4620 and resource specification 4641 (collectively identified in FIG. 46 as compositional relationships 4650), one or more actions on resource-facing service specification 4620 (identified in FIG. 46 as actions 4660), one or more actions on resource-facing service specification 4630 (identified in FIG. 46 as actions 4670), and one or more actions on resource specification 4640 (identified in FIG. 46 as actions 4680). In certain embodiments, transformation sequence 4610 can further utilize metadata that includes one or more parameter mappings, one or more technical action recognition patterns, one or more technical order definitions, and one or more parameter set structures (not illustrated in FIG. 46).

According to the illustrated embodiment, in a first stage of transformation sequence 4610 (illustrated in FIG. 46 as "Stage-1"), a configuration delta can be calculated that represents a change in a configuration of one or more resource-facing services and/or one or more resources. In certain embodiments, the configuration delta can be calculated by comparing a configuration of one or more resource-facing services and/or one or more resources that represents a future state of a service with a configuration of one or more resource-facing services and/or one or more resources that represents a present state of the service. In certain embodiments, the service can be a customer-facing service.

In some of these embodiments, the configuration of one or more resource-facing services and/or one or more resources that represents a future state of the customer-facing service is generated based on a service order that includes one or more service order lines, where each service order line includes a service action and a customer-facing service based on a customer-facing service specification. More specifically, one or more resource-facing services and/or one or more resources that are within a scope of the customer facing service are identified, and a configuration of the identified one or more resource-facing services and/or one or more resources that represents a future state of the customer-facing service (as described by the corresponding service order line of the service order) is determined. The aforementioned configuration is compared to a configuration the identified one or more resource-facing services and/or one or more resources that represents a present state of the customer-facing service, and a configuration delta is calculated, where the configuration delta represents a change in the configuration of the identified one or more resource-facing services and/or one or more resources.

In certain alternate embodiments, the configuration delta is simply received from an external source, as opposed to being calculated. In these embodiments, the configuration delta can be based on a service order that includes one or more service order lines, where each service order line includes a service action and a customer-facing service based on a customer-facing service specification.

In a second stage of transformation sequence 4610 (illustrated in FIG. 46 as "Stage-2"), the configuration delta is analyzed, and a resource parameters list delta is generated for each resource specification or resource-facing service specification for which one or more technical actions are defined. The resource parameters list delta can include one or more parameters of one or more technical actions that have changed. In certain embodiments, where the configuration delta does not include any changes to any parameters of any technical actions, no resource parameters list is generated.

In a third stage of transformation sequence 4610 (illustrated in FIG. 46 as "Stage-3"), one or more technical actions are identified based on the changes to the parameter set associated with the one or more resource specifications or one or more resource-facing services for which one or more technical actions are defined, and the one or more technical actions are generated, where each technical action is an action on either a resource-facing service specification or a resource. In embodiments where a resource parameters list delta has been generated, the parameter set for each technical action can be populated with appropriate parameters from the resource parameters list delta and the overall configuration delta.

In a fourth stage of transformation sequence 4610 (illustrated in FIG. 46 as "Stage-4"), one or more technical order lines are generated. The generated technical actions are then packaged within the one or more technical order lines. In certain embodiments where the configuration delta is based on a service order, the one or more technical order lines correspond to the one or more service order lines of the service order.

In a fifth stage of transformation sequence 4610 (illustrated in FIG. 46 as "Stage-5"), a technical order is generated, and the one or more generated technical order lines are packaged within the technical order. Further, in certain embodiments, supplementary information can be included within the one or more generated technical order lines of the technical order, such as identifiers used for correlation, dependencies, and targets. In addition, supplemental information may be retrieved from the service order and populated within the technical order. Subsequently, the generated technical order can be sent to a technical order activation provider function configured to receive the technical order and translate the technical order into one or more command sequences delivered to one or more infrastructure elements.

In an example, a user of a communications service can call a communications service provider and request to update bandwidth from 20 MB/sec to 100 MB/sec. The user's request can be expressed in a customer order as changing the user's service from "Gold service" to "Diamond service." The user's request can further be expressed in a service order changing a broadband service from a first speed to a second speed. A service order design and assign provider function can receive the service order and determine that the user needs to be disconnected from a cable network and connected to a fiber network. A technical order calculation provider function can then determine all the technical actions that are required to be done to achieve this future state of the network. Such technical actions could include activation (activating a user account for the fiber network), work management (sending a technician to the user's house to activate a device), etc.

Thus, according to certain embodiments, the technical order calculation provider function can determine actual work that is to be performed on a network (or other infrastructure element). More specifically, the technical order calculation provider function can determine what is going to change on the infrastructure element, and can determine one or more technical actions to effectuate the change. In these embodiments, the technical order calculation provider function can interpret the service order (including the one or more service order lines, where each service order line includes a service action on a customer-facing service based on customer-facing service specification) in order to generate a configuration of one or more resource-facing services and/or one or more resources that represent a future state of the infrastructure element. In other words, the technical order calculation provider function can generate a configuration of one or more resource-facing services and/or one or more resources that represent a future state of the infrastructure element based on the service order. Subsequently, as previously described, the technical order calculation provider function can compare a configuration of one or more resource-facing services and/or one or more resources that represent a future state of the infrastructure element with a configuration of one or more resource-facing services and/or one or more resources that represent a present state of the infrastructure element, and can generate a configuration delta based on the comparison. Thus, rather than generating the technical order based on the service order, the technical order calculation provider function can generate the technical order based on the configuration delta (i.e., the comparison of the configuration of one or more resource-facing services and/or one or more resources that represent a future state of the infrastructure element with the configuration of one or more resource-facing services and/or one or more resources that represent a present state of the infrastructure element.

Figure 47:
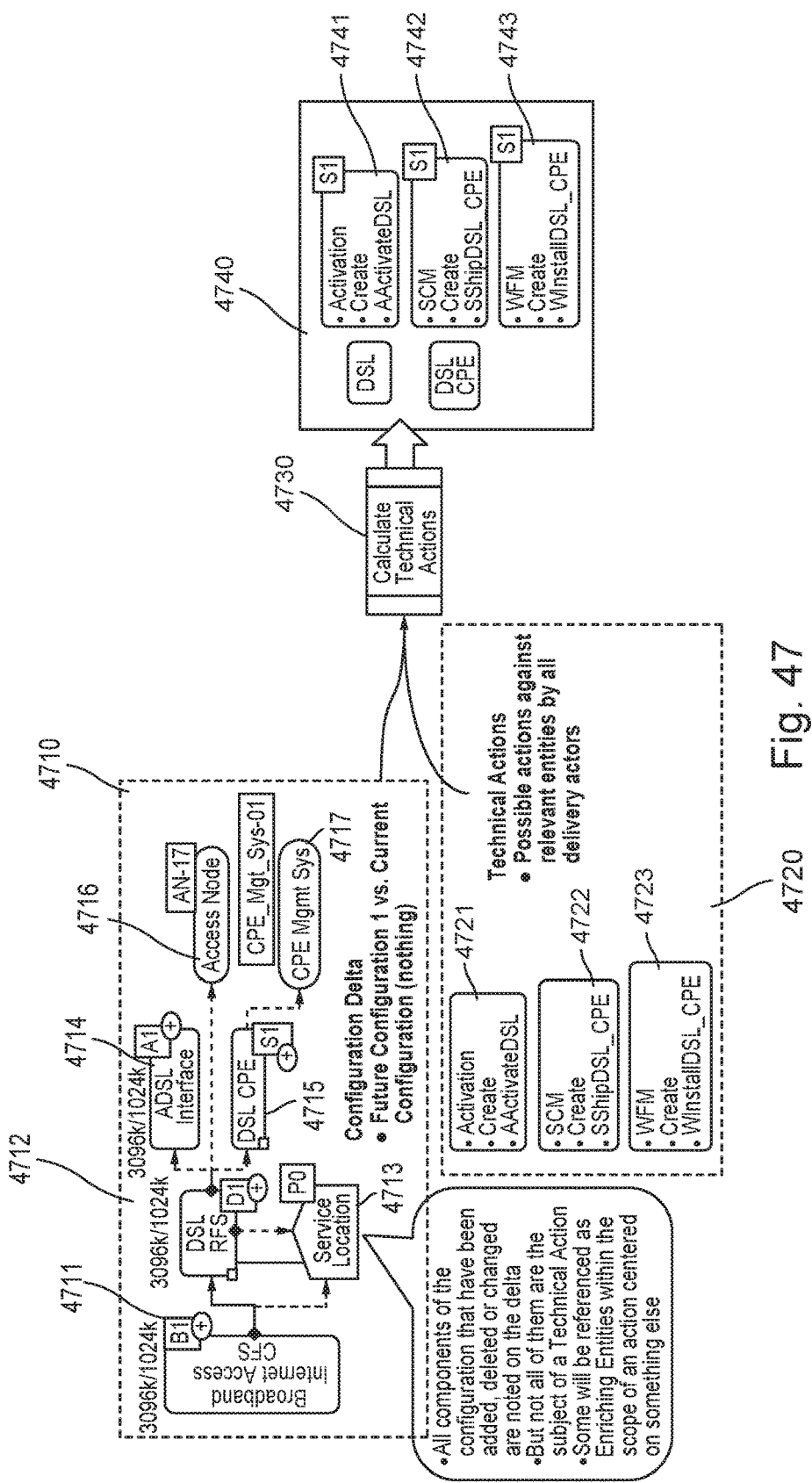
FIG. 47 illustrates an example generation of a technical order based on a configuration delta, according to an embodiment of the invention.

FIG. 47 illustrates an example generation of a technical order based on a configuration delta, according to an embodiment of the invention. FIG. 47 includes a configuration delta 4710, where configuration delta 4710 can be associated with a service action that adds customer-facing service specification 4711. According to the embodiment, configuration delta 4710 represents a change between a future configuration of one or more resource-facing services and/or one or more resources (identified as "Future Configuration 1" in FIG. 47) and a current configuration of one or more resource-facing services and/or one or more resources (identified as "Current Configuration" in FIG. 47). Thus, because the current configuration does not include any resource-facing services or resources, configuration delta 4710 includes resource-facing service specification 4712, and resource specifications 4713, 4714, 4715, 4716, and 4717, where configuration delta 4710 indicates that the aforementioned entities are to be added. According to the embodiment, while all entities of the future configuration that are to be added are included within configuration delta 4710, not all of the entities are the subject of a technical action. Instead, some entities can be referenced as enriching entities within a scope of an action centered on another component.

FIG. 47 further includes technical action list 4720. Technical action list 4720 includes all possible technical actions against all relevant entities (i.e., resource-facing service specification 4712 and resource specification 4715). In the illustrated embodiment, technical action list 4720 includes technical actions 4721, 4722, and 4723.

FIG. 47 further includes calculate technical actions function 4730. Calculate technical actions function 4730 retrieves technical actions 4721, 4722, and 4723 from technical action list 4720, and identifies the most appropriate technical action which will achieve the intended future configuration of the resource specification or resource-facing service specification.

FIG. 47 further includes technical order line list 4740. Technical order line list 4740 includes one or more technical order lines that correspond to a set of technical actions identified to achieve an intended configuration change. In the illustrated embodiment, technical order line list 4740 includes technical order line 4741 (which is generated by identifying technical action 4721 as the appropriate technical action to achieve the intended configuration change, populating the relevant technical action parameters of technical action 4721, and formatting technical action 4721 into technical order line 4741), technical order line 4742 (which is generated by identifying technical action 4722 as the appropriate technical action to achieve the intended configuration change, populating the relevant technical action parameters of technical action 4722, and formatting technical action 4722 into technical order line 4742), and technical order line 4743 (which is generated by identifying technical action 4723 as the appropriate technical action to achieve the intended configuration change, populating the relevant technical action parameters of technical action 4723, and formatting technical action 4723 into technical order line 4743).

Figure 48:
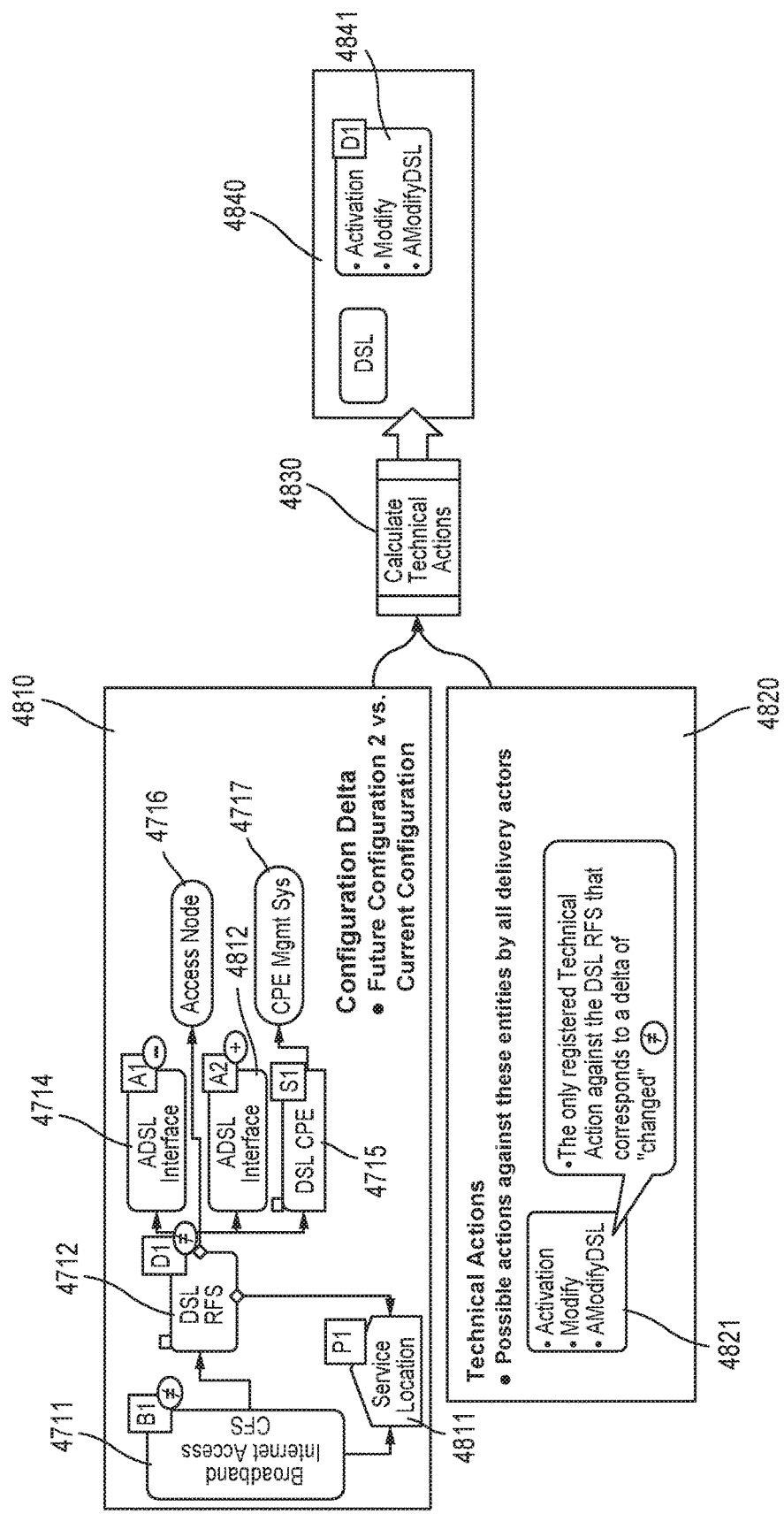
FIG. 48 illustrates another example generation of a technical order based on a configuration delta, according to an embodiment of the invention.

FIG. 48 illustrates another example generation of a technical order based on a configuration delta, according to an embodiment of the invention. FIG. 48 includes a configuration delta 4810, where configuration delta 4810 can be associated with a service action that moves customer-facing service specification 4711 to a new service location. According to the embodiment, configuration delta 4810 represents a change between a future configuration of one or more resource-facing services and/or one or more resources (identified as "Future Configuration 2" in FIG. 48) and a current configuration of one or more resource-facing services and/or one or more resources (identified as "Current Configuration" in FIG. 48). Thus, configuration delta 4810 includes resource 4811 (where resource 4811 is being added), resource-facing service specification 4712 (where resource-facing service specification 4712 is unchanged), resource 4714 (where resource 4714 is being deleted), resource 4812 (where resource 4812 is being added), and resources 4715, 4716, and 4717 (where resources 4715, 4716, and 4717 are unchanged). Configuration delta 4810 further indicates that a relationship between customer-facing service specification 4711 and resource-facing service specification 4712 is being changed, and further indicates that a relationship between resource-facing service specification 4712 and resources 4714 and 4812 is also being changed.

FIG. 48 further includes technical action list 4820. Technical action list 4820 includes all possible technical actions against all relevant entities (i.e., resource-facing service specification 4712). In the illustrated embodiment, technical action list 4820 includes technical action 4821.

FIG. 48 further includes calculate technical actions function 4830. Calculate technical actions function 4830 identifies technical action 4821 as being the most appropriate technical action to achieve an intended configuration change, and uses technical action 4821 to create a technical order line.

FIG. 48 further includes technical order line list 4840. Technical order line list 4840 includes a technical order line that can be generated by identifying a technical action as the appropriate technical action to achieve the intended configuration change, populating the relevant technical action parameters of the technical action, and formatting the technical action into the technical order line. In the illustrated embodiment, technical order line list 4840 includes technical order line 4841, which is generated identifying technical action 4821 as the appropriate technical action to achieve the intended configuration change, populating the relevant technical action parameters of technical action 4821, and formatting technical action 4821 into technical order line 4841.

Figure 49:
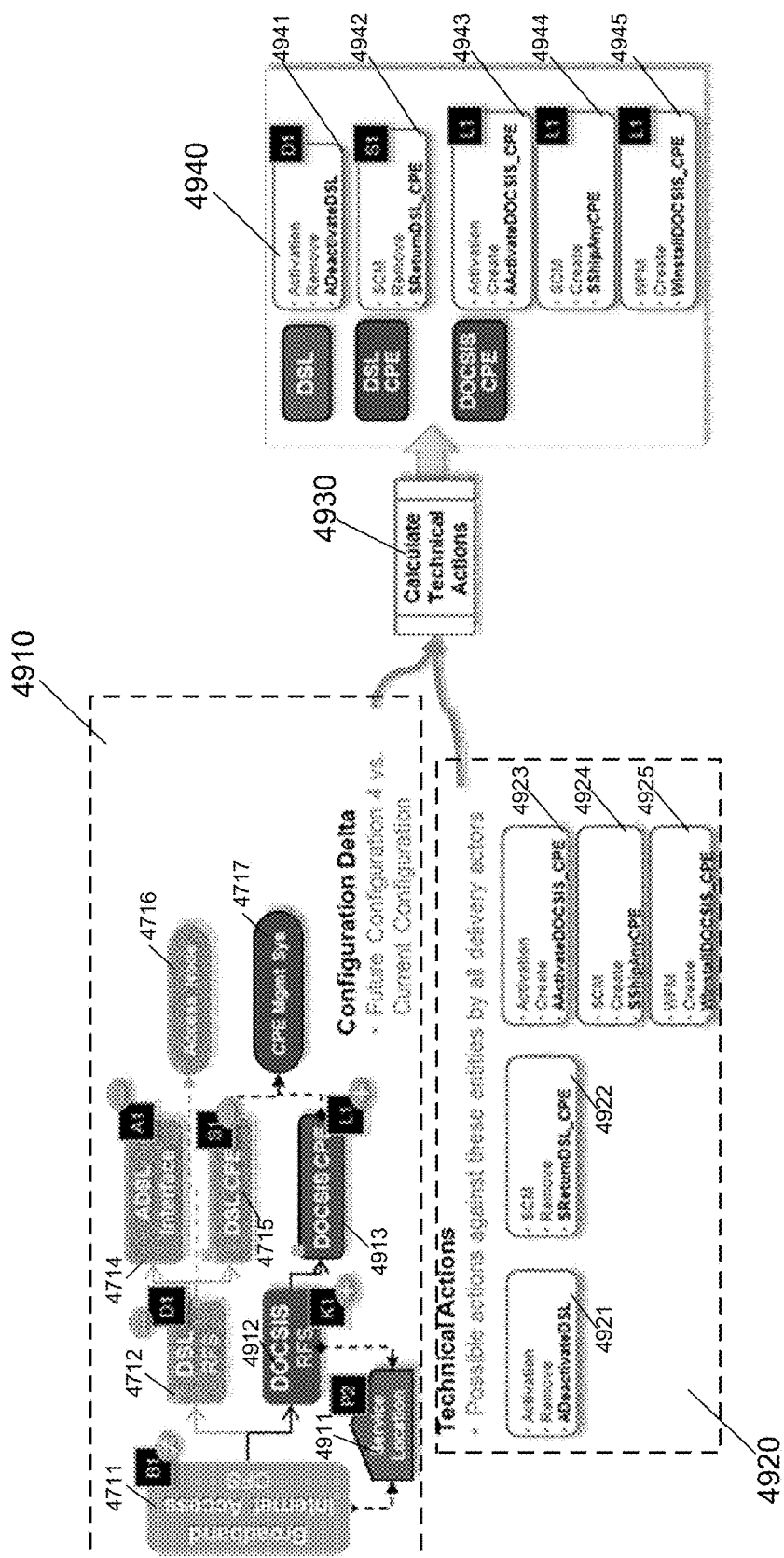
FIG. 49 illustrates another example generation of a technical order based on a configuration delta, according to an embodiment of the invention.

FIG. 49 illustrates another example generation of a technical order based on a configuration delta, according to an embodiment of the invention. FIG. 49 includes a configuration delta 4910, where configuration delta 4910 can be associated with a service action that moves customer-facing service specification 4711 to a new service location. According to the embodiment, configuration delta 4910 represents a change between a future configuration of one or more resource-facing services and/or one or more resources (identified as "Future Configuration 3" in FIG. 49) and a current configuration of one or more resource-facing services and/or one or more resources (identified as "Current Configuration" in FIG. 49). Thus, configuration delta 4910 includes resource 4911 (where resource 4911 is being added), resource-facing service specification 4712 (where resource-facing service specification 4712 is being deleted), resources 4714, 4715, and 4716 (where resources 4714, 4715, and 4716 are being deleted), resources 4912 and 4913 (where resources 4912 and 4913 are being added), and resource 4717 (where resource 4717 is unchanged). Configuration delta 4810 further indicates that a relationship between customer-facing service specification 4711 and resource-facing service specifications 4712 and 4912 is being changed.

FIG. 49 further includes technical action list 4920. Technical action list 4920 includes all possible technical actions against all relevant entities (i.e., resource-facing service specification 4712, resource 4715, and resource 4923). In the illustrated embodiment, technical action list 4920 includes technical actions 4921, 4922, 4923, 4924, and 4925.

FIG. 49 further includes calculate technical actions function 4930. Calculate technical actions function 4930 identifies technical actions 4921, 4922, 4923, 4924, and 4925 as being the most appropriate technical actions to achieve an intended change and uses these technical actions to create a technical order line.

FIG. 49 further includes technical order line list 4940. Technical order line list 4940 includes one or more technical order lines that can be generated by identifying a technical action as the appropriate technical action to achieve the intended configuration change, populating the relevant technical action parameters of the technical action, and formatting the technical action into a technical order line. In the illustrated embodiment, technical order line list 4940 includes technical order line 4941 (which is generated by identifying technical action 4921 as the appropriate technical action to achieve the intended configuration change, populating the relevant technical action parameters of technical action 4921, and formatting technical action 4921 into technical order line 4941), technical order line 4942 (which is generated by identifying technical action 4922 as the appropriate technical action to achieve the intended configuration change, populating the relevant technical action parameters of technical action 4922, and formatting technical action 4922 into technical order line 4942), technical order line 4943 (which is generated by identifying technical action 4923 as the appropriate technical action to achieve the intended configuration change, populating the relevant technical action parameters of technical action 4923, and formatting technical action 4923 into technical order line 4943), technical order line 4944 (which is generated by identifying technical action 4924 as the appropriate technical action to achieve the intended configuration change, populating the relevant technical action parameters of technical action 4924, and formatting technical action 4924 into technical order line 4944), and technical order line 4945 (which is generated by identifying technical action 4925 as the appropriate technical action to achieve the intended configuration change, populating the relevant technical action parameters of technical action 4925, and formatting technical action 4925 into technical order line 4945).

Thus, in the illustrated embodiment, moving the same customer-facing service specification (i.e., customer-facing service specification 4711) to a different service location results in a different configuration delta, and thus, results in very different technical order lines.

Figure 50:
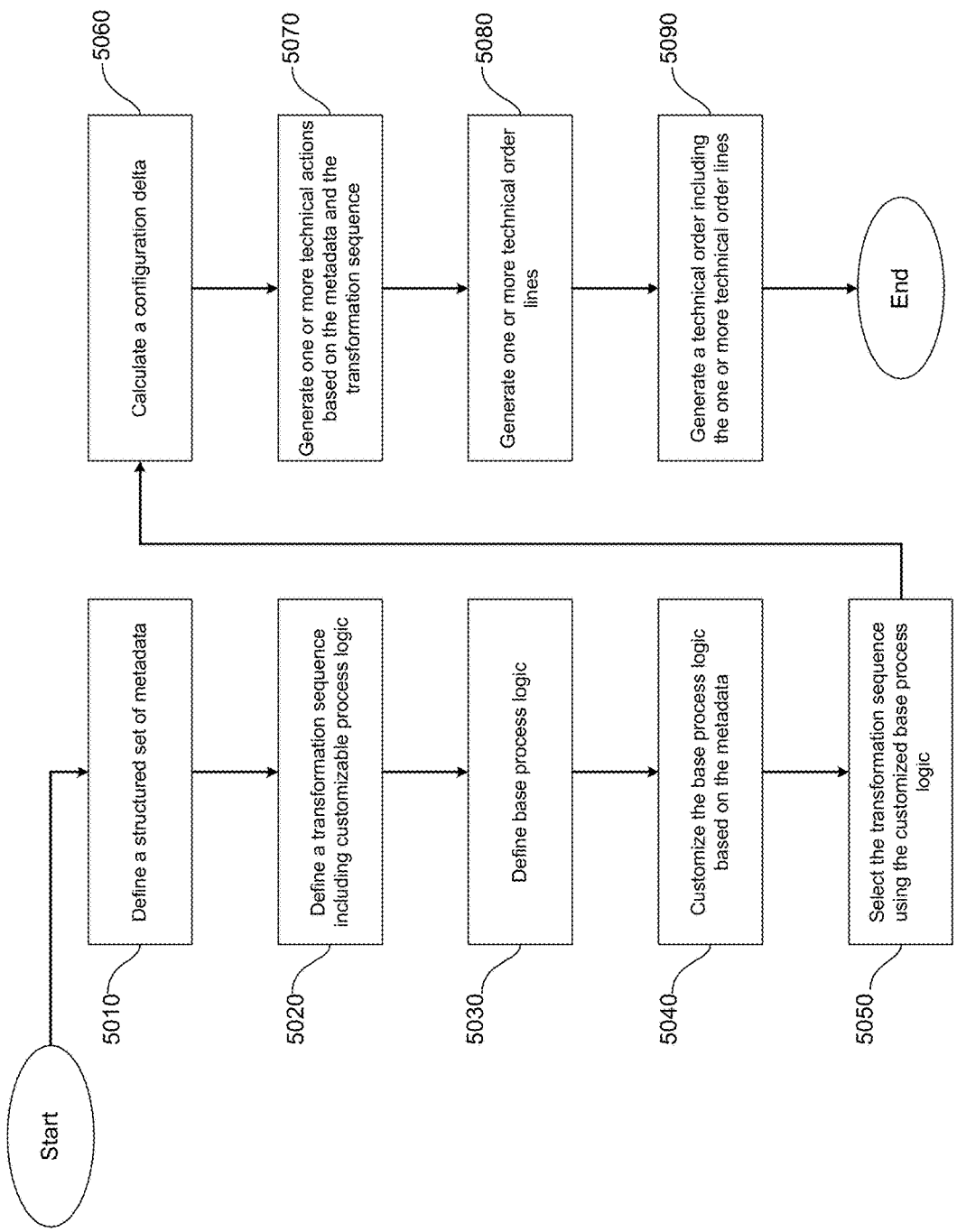
FIG. 50 illustrates another flow diagram of the functionality of a service design and order fulfillment module, according to another embodiment of the invention.

FIG. 50 illustrates another flow diagram of the functionality of a service design and order fulfillment module, according to another embodiment of the invention. The flow begins, and proceeds to 5010. At 5010, a structured set of metadata can be defined. The structured set of metadata includes one or more resource-facing service specifications, one or more resource specifications, one or more relationships, one or more mappings, one or more technical actions, one or more parameter sets; one or more parameter mappings, one or more technical action recognition patterns, one or more technical order definitions, and one or more parameter set structures. In certain embodiments, each resource-facing service specification can include metadata that defines a resource-facing service that is provided, and each resource specification can include metadata that defines a resource that is provided.

Further, each relationship can include metadata that defines at least one of: an association between a customer-facing service specification and either a resource-facing service specification or a resource specification, or an association between a resource-facing service specification and a resource specification. Each mapping can include metadata that defines at least one of: an association between a customer-facing service specification, one or more attributes of the customer-facing service specification, or one or more attribute values of the customer-facing service specification, and resource-facing service specification or resource specification, one or more attributes of the resource-facing service specification or resource specification, or one or more attribute values of the resource-facing service specification or resource specification, or an association between a resource-facing service specification, one or more attributes of the resource-facing service specification, or one or more attribute values of the resource-facing service specification, and a resource specification, one or more attributes of the resource specification, or one or more attribute values of the resource specification Each technical action can include metadata that defines a pattern of a structured request to perform work on either a resource-facing service based on a resource-facing service specification or a resource based on a resource specification. The flow then proceeds to 5020.

At 5020, a transformation sequence including customizable process logic is defined. The customizable process logic is structured within one or more stages. The flow then proceeds to 5030.

At 5030, base process logic is defined. The flow then proceeds to 5040.

At 5040, the base process logic is customized based on the metadata. The flow then proceeds to 5050.

At 5050, the transformation sequence is selected using the customized based process logic. The flow then proceeds to 5060.

At 5060, a configuration delta is calculated, where a configuration delta includes a change in a configuration of one or more resource-facing services or one or more resources. In certain embodiments, the configuration delta is received. In other embodiments, rather than receiving the configuration delta, a configuration of one or more resource-facing services or one or more resources that represents a future state of a customer-facing service can be compared with a configuration of one or more resource-facing services or one or more resources that represent a current state of the customer-facing service. The configuration delta can then be generated based on the comparison. Further, in certain embodiments, the configuration delta can be based on a service order that includes one or more service order lines, where each service order line includes a service action and a customer-facing service based on a customer-facing service specification. The flow then proceeds to 5070.

At 5070, one or more technical actions that effectuate the configuration delta are generated. Each technical action includes metadata that defines a pattern of a structured request to perform work on a resource-facing service based on a resource-facing service specification or a resource based on a resource specification. The pattern includes an action identifier and a parameter set including one or more parameters for the technical action. Each parameter includes one or more mappings that populates the parameter from the configuration delta. In certain embodiments, the generating the one or more technical actions can be based on the metadata and the transformation sequence. The flow then proceeds to 5080.

At 5080, one or more technical order lines are generated. Each technical order line includes a technical action and a resource-facing service that is based on a resource-facing service specification or a resource that is based on a resource specification. In certain embodiments, the generating the one or more technical order lines can be based on the metadata and the transformation sequence. The flow then proceeds to 5090.

At 5090, a technical order is generated, where the technical order includes the one or more technical order lines. In certain embodiments, the technical order is an order for communication services.

In certain embodiments, the transformation sequence includes five stages, and the generating the technical order involves the following. In a first stage of the transformation sequence, the configuration delta is received. In a second stage of the transformation sequence, a resource parameters list delta is generated, where the resource parameters list delta includes one or more parameters of one or more technical actions that have changed. In a third stage of the transformation sequence, the one or more technical actions are generated. In a fourth stage of the transformation sequence, the one or more technical order lines are generated. In a fifth stage of the transformation sequence, supplementary information is inserted within the one or more technical order lines, where the supplementary information includes one or more identifiers, dependencies, targets, or parameters. The flow then ends.

Thus, in one embodiment, a service design and order fulfillment system can provide a technical order calculation provider function, that can generate a technical order based on a service order. This can allow the service design and order fulfillment system to optimize work required to deliver an order. For example, the service design and order fulfillment system can pinpoint the most optimal technical action to use to achieve a certain change in a way that is agnostic to the service and product models. It is possible that a service action does not provide a configuration delta for one customer, a simple configuration delta for another customer, and a complex configuration delta for yet another customer. Further, the transformation sequence approach utilized by the technical order calculation provider function allows for a breakdown of complex process logic into a series of steps that are not specific to a service, technology, or action. Adding a new domain only requires adding new definitions of catalog entities and technical actions, and does not require the addition of new process logic. This can provide businesses with unprecedented agility to stay viable in changing markets.

According to another embodiment, a service design and order fulfillment system can define process logic for a service order design and assign provider function that designs communications/information services by selecting and assembling supporting components. The service order design and assign provider function can be encapsulated within a SRM system, and the service order design and assign provider function can be modularized around a standardized set of entities. The service order design and assign provider function can receive input in the form of a service order, where a service order is previously described. The service order design and assign provider function can further include one or more entities, actions, and/or relationships that are defined within a technical catalog, where a technical catalog is also previously described.

According to the embodiment, a service order design and assign provider function can create process logic, where the process logic can create a service instance based on a service order. A service instance can be created based on one or more components or building blocks, where each component can be associated with one or more modules, where each module includes process logic for that component. Such components can one or more entities, where the entities can be retrieved from a technical catalog. Further, such components can include one or more customer-facing service specifications, one or more resource-facing service specifications, and/or one or more resource specifications.

Figure 51:
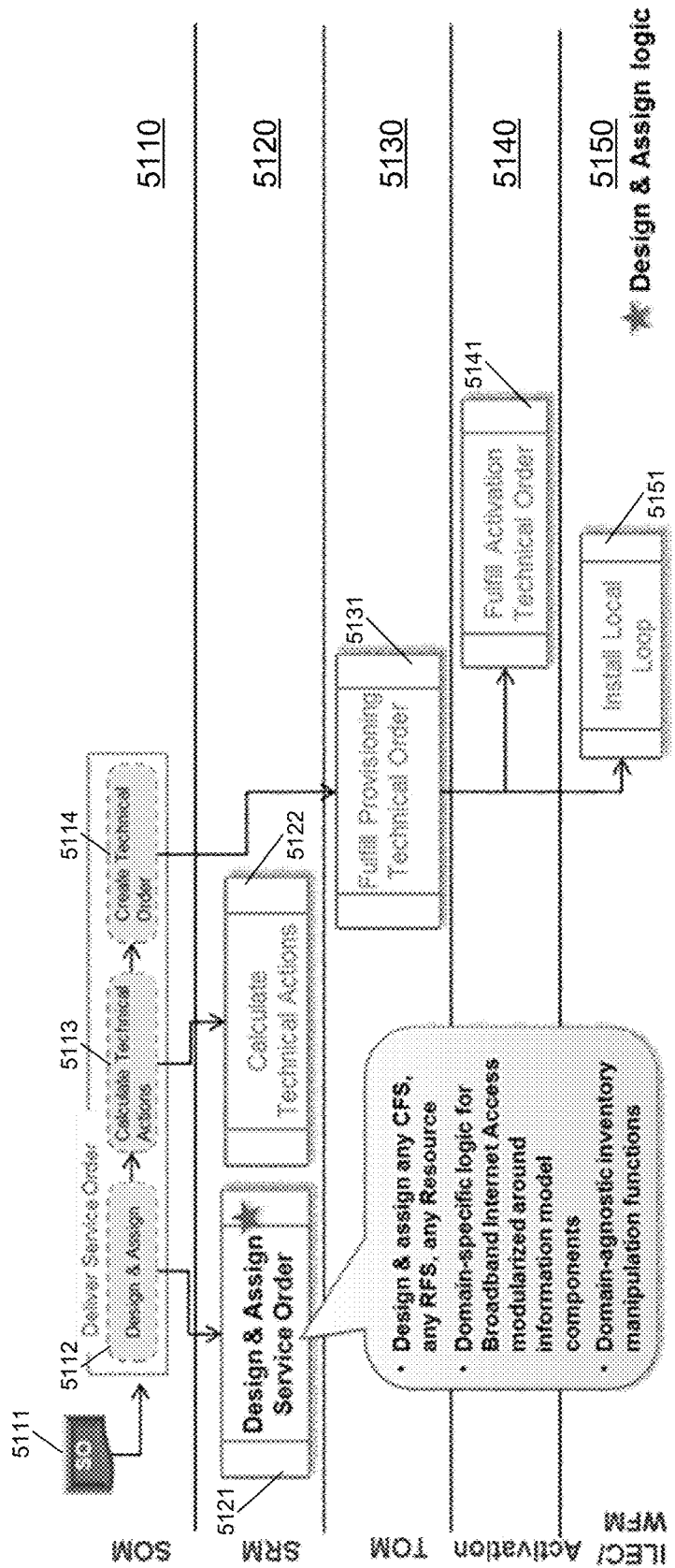
FIG. 51 illustrates an order management workflow for a service design and order fulfillment system, according to an embodiment of the invention.

FIG. 51 illustrates an order management workflow for a service design and order fulfillment system, according to an embodiment of the invention. According to the illustrated embodiment, the service design and order fulfillment system includes an SOM component 5110, a SRM component 5120, a TOM component 5130, an activation component 5140, and an ILEC/WFM component 5150.

SOM component 5110 can support service order decomposition, orchestration, and order lifecycle management. SOM component 5110 can further orchestrate fulfillment of a service order (such as service order 5111) across SRM component 5120, TOM component 5130, activation component 5140, and ILEC/WFM component 5150. More specifically, SOM component 5110 can receive service order 5111 and generate a technical order based on service order 5111. SOM component 5110 can generate the technical order via design and assign function 5112 ("Design and Assign"), calculate technical actions function 5113 ("Calculate Technical Actions), and technical order creation function 5114 ("Create Technical Order"). Design and assign function 5112 can invoke service order design and assign provider function 5121 ("Design and Assign Service Order") of SRM component 5120. Further, calculate technical actions function 5113 can invoke technical action calculation provider function 5122 ("Calculate Technical Action") of SRM component 5120. Even further, technical order creation function 5114 can invoke technical order fulfillment provider function 5131 ("Fulfill Provisioning Technical Order") of TOM component 5130.

SRM component 5120 can perform a service order design and assign function via service order design and assign provider function 5121 ("Design and Assign Service Order"). As is described below in greater detail, service order design and assign provider function 5121 can design an instance of any service, such as a customer-facing service. SRM component 5120 can further perform a technical action calculation function via technical action calculation provider function 5122 ("Calculate Technical Action"), as part of creating a technical order, where the technical order can be based on the service instance designed by service order design and assign provider function 5121.

TOM component 5130 can receive a technical order from SOM component 5130 and can orchestrate the technical order among various service design and order fulfillment system components, such as activation component 5140 and ILEC/WFM component 5150, via technical order fulfillment provider function 5131 ("Fulfill Provisioning Technical Order").

Activation component 5140 can receive a technical order line of a technical order and perform a technical order activation fulfillment function via technical order activation provider function 5141 ("Fulfill Activation Technical Order").

ILEC/WFM component 5150 is an example of a technical layer component that can perform one or more technical actions (such as an install local loop technical action) via technical action function 5151 ("Install Local Loop").

According to the embodiment, SOM component 5110 can invoke multiple SRM components via design and assign function 5112, where each SRM component can perform a complete design and assign activity for a portion of work to be performed. Thus, SOM component 5110 only requires knowledge of which SRM component is responsible for which portion of work, and SOM component 5110 is more independent of any particular domain. Thus, design and assign function 5112 can remain domain-agnostic.

Figure 52:
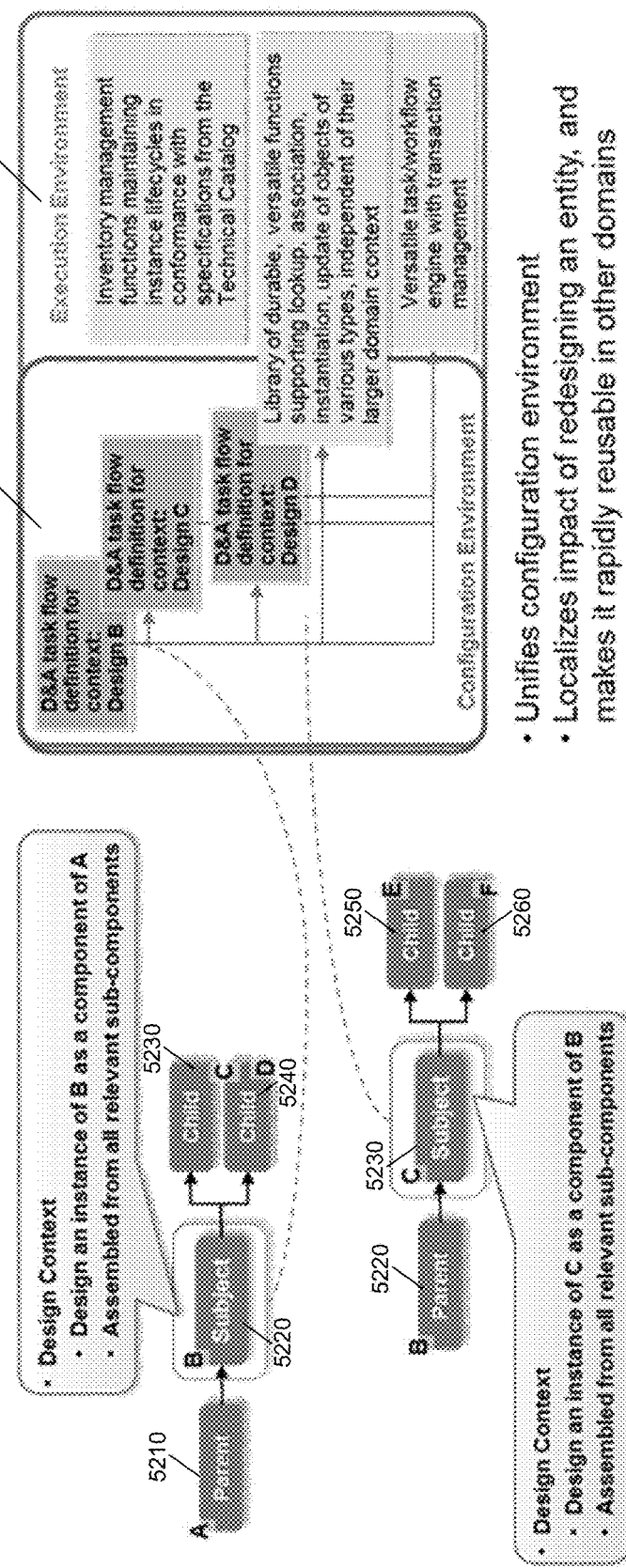
FIG. 52 illustrates an example design of an entity, according to an embodiment of the invention.

FIG. 52 illustrates an example design of an entity, where instances of the entity are designed using the specification of the entity as a pattern, according to an embodiment of the invention. According to the embodiment, a subject entity can be designed as a configuration that includes one or more entities, where two or more entities can have a parent-child relationship. According to the embodiment, an instance of the subject entity can be designed such that the subject's component instances conform to the parent-child relationship between their specifications. In embodiments where a service is a customer-facing service, the entities can include at least one of: a customer-facing service (patterned by a customer-facing service specification), a resource-facing service (patterned by a resource-facing service specification), or a resource (patterned by a resource specification). In the illustrated embodiment, the arrangement of entities includes entities 5210, 5220, 5230, 5240, 5250, and 5260. Entity 5210 can be a parent of entity 5220, and thus, entity 5220 can be a child of entity 5210. Entity 5220 can be a parent of entities 5230 and 5240, and thus, entities 5230 and 5240 can be children of entity 5220. Entity 5230 can be a parent of entities 5250 and 5260, and thus, entities 5250 and 5260 can be children of entity 5230. In certain embodiments, entity 5210 can be a customer-facing service specification, entity 5220 can be a resource-facing service specification, and entities 5230, 5240, 5250, and 5260 can either be a resource-facing service specification or a resource specification.

According to the embodiment, each entity of entities 5210, 5220, 5230, 5240, 5250, and 5260 can be treated as a subject of a design. More specifically, a design context can be established for each entity, and an instance of each entity can be designed within the design context. The designing of each entity can be performed modularly and/or recursively. For example, an instance of entity 5210 can first be designed. An instance of entity 5220 as a component of entity 5210 can subsequently be designed. An instance of entity 5230 as a component of entity 5220 can subsequently be designed. An instance of entity 5240 as a component of entity 5220 can subsequently be designed.

For example, as illustrated in FIG. 52, a first design context can be established for entity 5220 within configuration environment 5270, where entity 5220 is the subject of the first design context. An instance of entity 5220 can be designed as a component of an instance of entity 5210, where the instance of entity 5220 can be assembled from all relevant sub-components (i.e., instances of entities 5230 and 5240). As part of designing the instance of entity 5220, a second design context can be established for entity 5230 within configuration environment 5270, where entity 5230 is the subject of the second design context. An instance of entity 5230 can be designed as a component of entity 5220, where the instance of entity 5230 can be assembled from all relevant sub-components (i.e., instances of entities 5250 and 5260). This can be repeated for each of entities 5210, 5220, 5230, 5240, 5250, and 5260. All of the design contexts can be created within a single configuration environment (i.e., configuration environment 5270). Further, all of the design contexts can have access to a library of one or more durable versatile functions, supporting functionality that designs an instance of an entity, such as lookup, association, instantiation, update of objects, etc. Further, each design context has access to the library independent of their domain context. Further, each instance of each entity of entities 5210, 5220, 5230, 5240, 5250, and 5260 can be executed within a single execution environment (i.e., execution environment 5280) using a versatile task/workflow engine.

Figure 53:
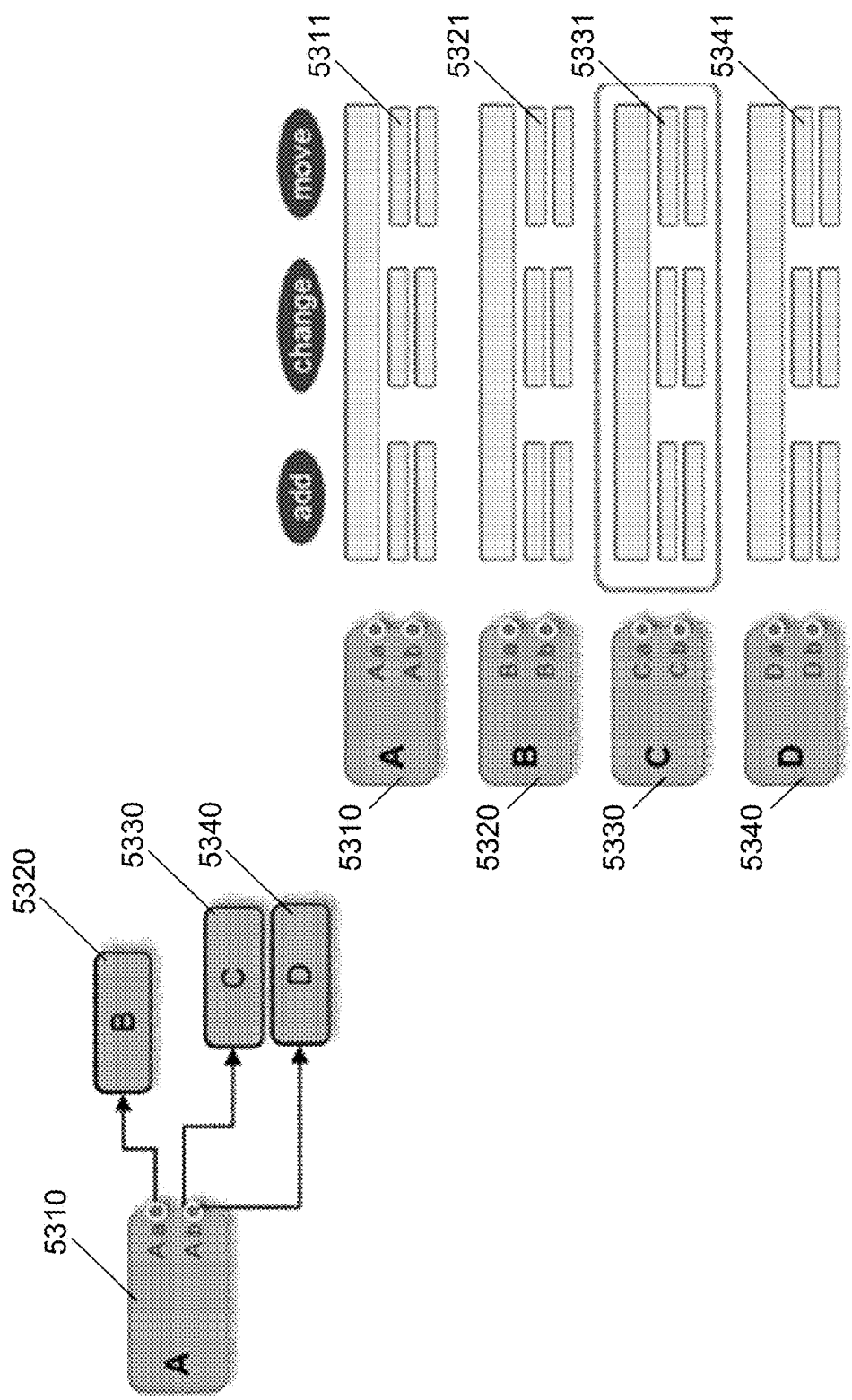
FIG. 53 illustrates example process logic structured around an example domain entity model, according to an embodiment of the invention.

FIG. 53 illustrates example process logic structured around an example domain entity model, according to an embodiment of the invention. According to the embodiment, designing an instance of an entity can include creating process logic for the entity that creates or updates an instance of the entity, where the process logic can be encapsulated within a module. The illustrated embodiment of FIG. 53 includes entities 5310, 5320, 5330, and 5340. Entity 5310 is associated with process logic module family 5311, where process logic module family 5311 includes a set of one or more process logic modules, and where each process logic module of process logic module family 5311 includes process logic that creates or updates an instance of entity 5310. Entity 5320 is associated with process logic module family 5321, where process logic module family 5321 includes a set of one or more process logic modules, and where each process logic module of process logic module family 5321 includes process logic that creates or updates an instance of entity 5320. Entity 5330 is associated with process logic module family 5331, where process logic module family 5331 includes a set of one or more process logic modules, and where each process logic module of process logic module family 5331 includes process logic that creates an instance of entity 5330. Entity 5340 is associated with process logic module family 5341, where process logic module family 5341 includes a set of one or more process logic modules, and where each process logic module of process logic module family 5341 includes process logic that creates or updates an instance of entity 5340.

According to the embodiment, the process logic contained within each module of process logic module family 5311 is specific to entity 5310. Similarly, the process logic contained within each module of process logic module family 5321 is specific to entity 5320, the process logic contained within each module of process logic module family 5331 is specific to entity 5330, and the process logic contained within each module of process logic module family 5341 is specific to entity 5340. Thus, an instance of a service can be designed by assembling entities 5310, 5320, 5330, and 5340, and the instance of the service can be instantiated by invoking the process logic contained within the one or more modules of process logic module families 5311, 5321, 5331, and 5341. Further, an instance of a service can be re-designed by restructuring a configuration of entities 5310, 5320, 5330, and 5340, without requiring changes to the process logic contained within the one or more modules of process logic module families 5311, 5321, 5331, and 5341. Further, the process logic contained within the one or more modules of module families 5311, 5321, 5331, and 5341 can be structured using a uniform format, regardless of where entities 5310, 5320, 5330, and 5340 appear in a domain model. Thus, a service can be modeled from a set of entities (such as entities 5310, 5320, 5330, and 5340), where the process logic for each entity can be expressed using the same uniform format.

In the illustrated embodiment, entity 5310 is defined to have two components (identified as "A.a" and "A.b"). Entity 5310 can be designed so that A.a references entity 5320, and A.b references either entity 5330 or 5340. One of ordinary skill in the art would readily appreciate that this is an example configuration of entities 5310, 5320, 5330, and 5340, and that an instance of an entity can be designed according to any configuration of one or more entities. Thus, a framework for modular and reusable process logic is provided to design an instance of a service, such as a customer-facing service, where an instance of a service can include a configuration of one or more entities, where the one or more entities can include at least one of a customer-facing service specification, a resource-facing service specification, or a resource.

Figure 54:
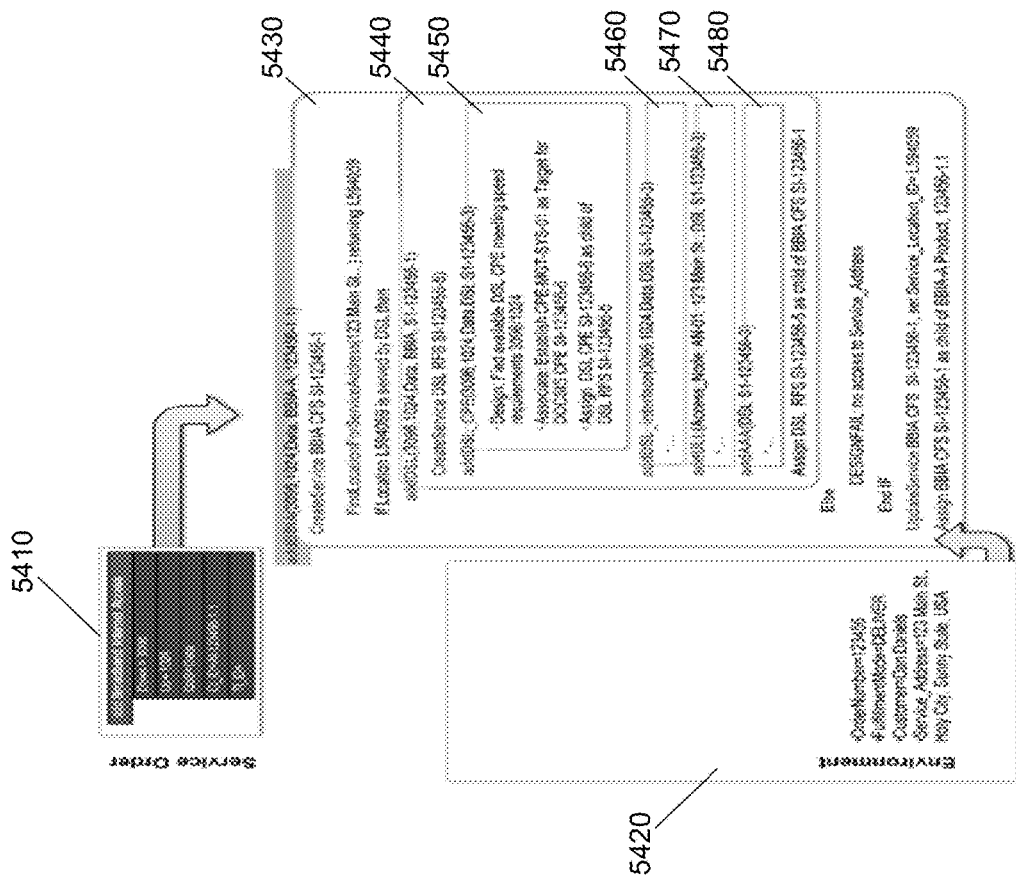
FIG. 54 illustrates an example creation of process logic for an instance of a customer-facing service, according to an embodiment of the invention.

FIG. 54 illustrates an example creation of process logic for an instance of a customer-facing service, according to an embodiment of the invention. According to the embodiment, service order 5410 is received, where service order 5410 includes a service action to add a customer-facing service entitled "Broadband Internet Access." According to the embodiment, a configuration for the customer-facing service is defined within environment 5420, where the configuration includes a resource-facing service entitled "DSL," a resource entitled "DSL_CPE" a resource entitled "DSL_Interface," a resource entitled "ULL," and a resource entitled "AAA."

Furthermore, in accordance with the embodiment, module 5430 is created, where module 5430 includes process logic that creates an instance of the customer-facing service entitled "Broadband Internet Access" (i.e., a customer-facing service specification). Module 5440 is further recursively created within module 5430, where module 5440 includes process logic that creates an instance of the resource-facing service entitled "DSL" (i.e., a resource-facing service specification). Module 5450 is further recursively created within module 5440, where module 5450 includes process logic that creates an instance of the resource entitled "DSL_CPE" (i.e., a resource specification). Module 5460 is further recursively created within module 5440, where module 5460 includes process logic that creates an instance of the resource entitled "DSL_Interface" (i.e., a resource specification). Module 5470 is further recursively created within module 5440, where module 5470 includes process logic that creates an instance of the resource entitled "ULL" (i.e., a resource specification). Module 5480 is further recursively created within module 5440, where module 5480 includes process logic that creates an instance of the resource entitled "AAA" (i.e., a resource specification). Thus, the modules that include the process logic that creates instances of the various entities are created modularly and recursively.

Figure 55:
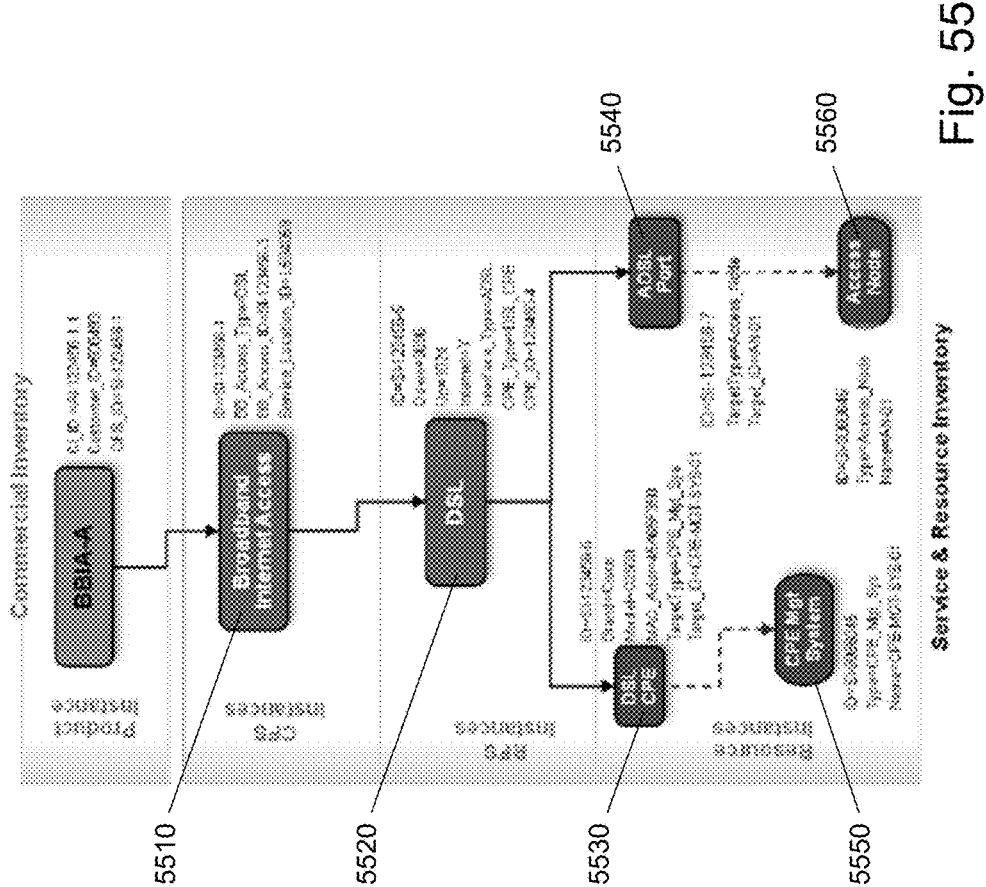
FIG. 55 illustrates an example instance of a customer-facing service, according to an embodiment of the invention.

FIG. 55 illustrates an example instance of a customer-facing service, according to an embodiment of the invention. The instance of the customer-facing service includes customer-facing service specification 5510. The instance further includes a configuration of one or more resource-facing service specifications and one or more resource specifications. More specifically, the instance of the customer-facing service includes a configuration that includes resource-facing service specification 5520, resource specification 5530, resource specification 5540, resource specification 5550, and resource specification 5560. Such a configuration can be created by process logic contained within one or more modules that are associated with each entity, as previously described.

Figure 56:
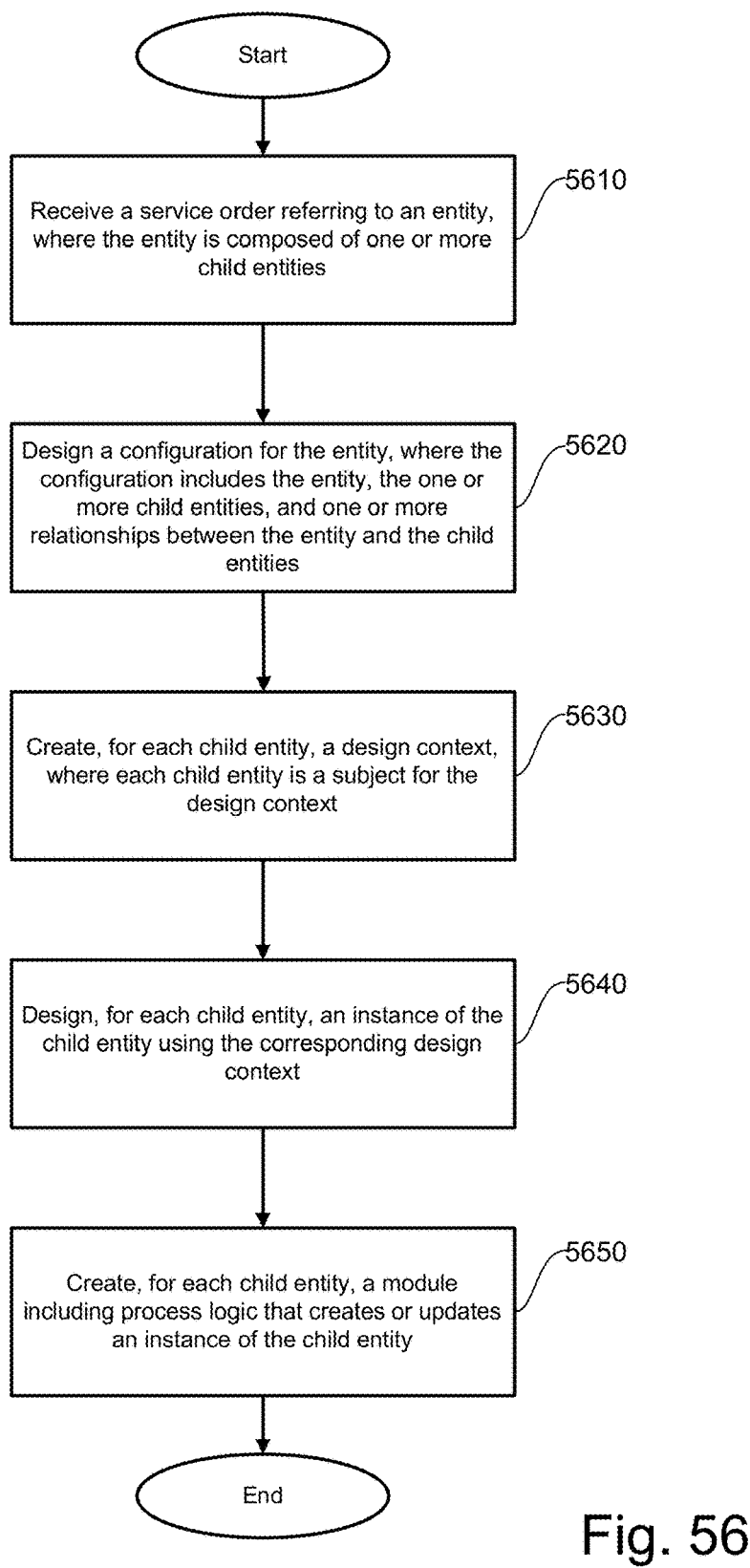
FIG. 56 illustrates another flow diagram of the functionality of a service design and order fulfillment module, according to another embodiment of the invention.

FIG. 56 illustrates another flow diagram of the functionality of a service design and order fulfillment module, according to another embodiment of the invention. The flow begins and proceeds to 5610. At 5610, a service order is received, where the service order refers to an entity as its subject, where the entity includes metadata that defines a capability that is provided, and where the entity is composed of one or more child entities. In certain embodiments, the subject entity is a customer-facing service whose specification includes metadata that defines a service that is provided. Further, in some of these embodiments, the one or more child entities include at least one of: a resource-facing service specification that includes metadata that defines a resource-facing service that is provided, or a resource specification that includes metadata that defines a resource that is provided.

In certain embodiments, the service order includes at least one service order line. In these embodiments, the at least one service order line includes at least one service action on the entity. Further, in certain embodiments, at least one child entity of the one or more child entities is a parent of another child entity of the one or more child entities. Additionally, in certain embodiments, the service order is an order for communication services. The flow then proceeds to 5620.

At 5620, a configuration is designed for the entity, where the configuration includes the entity, the one or more child entities, and one or more relationships between the entity and the one or more child entities. The flow then proceeds to 5630.

At 5630, for each child entity, a design context is created, where each child entity is a subject for the corresponding design context. In certain embodiments, each design context includes a library of one or more functions that support creation of one or more modules including process logic that creates an instance of an entity. The flow then proceeds to 5640.

At 5640, for each child entity, an instance of child entity is designed using the corresponding design context. In certain embodiments, the designing the instance of the child entity is performed recursively for each child entity. Further, in certain embodiments, the designing the instance of the child entity is performed within a single configuration environment for each child entity. The flow then proceeds to 5650.

At 5650, for each child entity, a module is created that includes process logic that creates or updates an instance of the child entity. In certain embodiments, the process logic of each child entity is structured using a uniform format. Further, in certain embodiments, the creation of the module that includes process logic is performed recursively for each child entity. The flow then ends.

Thus, in one embodiment, a service design and order fulfillment system can design a service instance by selecting and assembling one or more entities that act as supporting components of the service instance. This can support business agility be enabling rapid and low-risk redefinition of products and services in both superficial and fundamental ways. This can also simply the introduction of new services, as additions and changes to the design logic can be kept to a minimum, and can follow comprehensible, repeatable, and predictable patterns.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to create a service instance based on a provider function for calculating a service order, the creating comprising:
    defining a structured set of metadata for the provider function, the structured set of metadata defining one or more variants that select a fulfillment pattern, the fulfillment pattern comprising a process flow declaration that includes one or more fulfillment functions of the fulfillment pattern and sets dependencies between pairs of fulfillment functions that impose an ordered priority of execution of the one or more fulfillment functions, and including metadata retrieved from a technical catalog;
    defining a transformation sequence, based on the metadata for the provider function, comprising customizable process logic for the provider function, wherein the customizable process logic is structured within one or more stages configured to generate the service order;
    dynamically generating a runtime process flow for the provider function based on the metadata and the transformation sequence, the dynamically generating including
        selecting at least one fulfillment pattern from the one or more fulfillment patterns based on at least one entity from one or more entities comprised in the metadata and at least one discriminator from one or more discriminators comprised in the metadata; and
        generating a fulfillment flow based on the at least one selected fulfillment pattern;
    calculating the service order with customer-facing service order line objects and referring to an entity as its subject based on the fulfillment flow, wherein the metadata comprises the entity that defines a capability that is provided, and wherein the entity comprises one or more child entities;
    designing a configuration for the entity, wherein the configuration comprises the entity, the one or more child entities, and one or more relationships between the entity and the one or more child entities;
    creating, for each child entity, a design context comprising a reference to both a parent entity and one or more sub-components, wherein each child entity is a subject for the design context and wherein each subject comprises either a customer order, service order or a technical order; and
    designing, for each child entity, an instance of the child entity using a corresponding design context.

2. The non-transitory computer-readable medium of claim 1, wherein
    the creating further includes generating a technical order based on the service instance, and
    the designing the instance of the child entity further comprises creating a module comprising process logic that creates or updates an instance of the child entity, and
    the metadata further comprises one or more relationships comprising metadata that defines an association between a first entity and a second entity, and
    the metadata further comprises one or more mappings comprising metadata that defines
        a first entity,
        one or more attributes of the first entity, or
        one or more attribute values of the first entity and a second entity,
        one or more attributes of the second entity, or
        one or more attribute values of the second entity.

3. The non-transitory computer-readable medium of claim 2, wherein the process logic of each child entity is structured using a uniform format.

4. The non-transitory computer-readable medium of claim 1, wherein the entity comprises a customer-facing service specification comprising metadata that defines a customer-facing service that is provided; and
    wherein the one or more child entities comprise at least one of: a resource-facing service specification comprising metadata that defines a resource-facing service that is provided, or a resource specification comprising metadata that defines a resource that is provided.

5. The non-transitory computer-readable medium of claim 1, wherein the designing the instance of the child entity is performed recursively for each child entity.

6. The non-transitory computer-readable medium of claim 1, wherein each design context comprises a library of one or more functions that support creation of one or more modules comprising process logic that creates an instance of an entity.

7. The non-transitory computer-readable medium of claim 1, wherein the designing the instance of the child entity for each child entity is performed within a single configuration environment.

8. The non-transitory computer-readable medium of claim 1,
    wherein the service order comprises at least one service order line; and
    wherein the at least one service order line comprises at least one service action on the entity.

9. The non-transitory computer-readable medium of claim 1, wherein at least one child entity of the one or more child entities is a parent of another child entity of the one or more child entities.

10. The non-transitory computer-readable medium of claim 1, wherein the service order comprises an order for communication services.

11. A computer-implemented method for creating a service instance, the computer-implemented method comprising:
    defining a structured set of metadata for a provider function for calculating a service order, the structured set of metadata defining one or more variants that select a fulfillment pattern, the fulfillment pattern comprising a process flow declaration that includes one or more fulfillment functions of the fulfillment pattern and sets dependencies between pairs of fulfillment functions that impose an ordered priority of execution of the one or more fulfillment functions, and including metadata retrieved from a technical catalog;
    defining a transformation sequence, based on the metadata for the provider function, comprising customizable process logic for the provider function, wherein the customizable process logic is structured within one or more stages configured to generate the service order;
    dynamically generating a runtime process flow for the provider function based on the metadata and the transformation sequence, the dynamically generating including
        selecting at least one fulfillment pattern from the one or more fulfillment patterns based on at least one entity from one or more entities comprised in the metadata and at least one discriminator from one or more discriminators comprised in the metadata; and generating a fulfillment flow based on the at least one selected fulfillment pattern;

calculating the service order with customer-facing service order line objects and referring to an entity as its subject based on the fulfillment flow, wherein the metadata comprises the entity that defines a capability that is provided, and wherein the entity comprises one or more child entities;

designing a configuration for the entity, wherein the configuration comprises the entity, the one or more child entities, and one or more relationships between the entity and the one or more child entities;

creating, for each child entity, a design context comprising a reference to both a parent entity and one or more sub-components, wherein each child entity is a subject for the design context and wherein each subject comprises either a customer order, service order or a technical order; and designing, for each child entity, an instance of the child entity using a corresponding design context.

12. The computer-implemented method of claim 11, wherein the creating further includes generating a technical order based on the service instance, and the designing the instance of the child entity further comprises creating a module comprising process logic that creates or updates an instance of the child entity, and the metadata further comprises one or more relationships comprising metadata that defines an association between a first entity and a second entity, and the metadata further comprises one or more mappings comprising metadata that defines a first entity, one or more attributes of the first entity, or one or more attribute values of the first entity and a second entity, one or more attributes of the second entity, or one or more attribute values of the second entity.

13. The computer-implemented method of claim 11, wherein the entity comprises a customer-facing service specification comprising metadata that defines a customer-facing service that is provided; and wherein the one or more child entities comprise at least one of: a resource-facing service specification comprising metadata that defines a resource-facing service that is provided, or a resource specification comprising metadata that defines a resource that is provided.

14. The computer-implemented method of claim 11, wherein the designing the instance of the child entity is performed recursively for each child entity.

15. The computer-implemented method of claim 11, wherein at least one child entity of the one or more child entities is a parent of another child entity of the one or more child entities.

16. A system, comprising:

a hardware processor configured to:

define a structured set of metadata for a provider function for calculating a service order, the structured set of metadata defining one or more variants that select a fulfillment pattern, the fulfillment pattern comprising a process flow declaration that includes one or more fulfillment functions of the fulfillment pattern and sets dependencies between pairs of fulfillment functions that impose an ordered priority of execution of the one or more fulfillment functions, and including metadata retrieved from a technical catalog;

define a transformation sequence, based on the metadata for the provider function, comprising customizable process logic for the provider function, wherein the customizable process logic is structured within one or more stages configured to generate the service order;

dynamically generate a runtime process flow for the provider function based on the metadata and the transformation sequence, the dynamically generating including selecting at least one fulfillment pattern from the one or more fulfillment patterns based on at least one entity from one or more entities comprised in the metadata and at least one discriminator from one or more discriminators comprised in the metadata; and generate a fulfillment flow based on the at least one selected fulfillment pattern;

calculate the service order with customer-facing service order line objects and referring to an entity as its subject based on the fulfillment flow, wherein the metadata comprises the entity that defines a capability that is provided, and wherein the entity comprises one or more child entities;

design a configuration for the entity, wherein the configuration comprises the entity, the one or more child entities, and one or more relationships between the entity and the one or more child entities;

create, for each child entity, a design context comprising a reference to both a parent entity and one or more sub-components, wherein each child entity is a subject for the design context and wherein each subject comprises either a customer order, service order or a technical order; and design, for each child entity, an instance of the child entity using a corresponding design context.

17. The system of claim 16, further comprising process logic that creates or updates an instance of the child entity.

18. The system of claim 16, wherein the entity comprises a customer-facing service specification comprising metadata that defines a customer-facing service that is provided; and wherein the one or more child entities comprise at least one of: a resource-facing service specification comprising metadata that defines a resource-facing service that is provided, or a resource specification comprising metadata that defines a resource that is provided.

19. The system of claim 16, wherein the designing the instance of the child entity is performed recursively for each child entity.

20. The system of claim 16, wherein at least one child entity of the one or more child entities is a parent of another child entity of the one or more child entities.

* * * * *